US012125367B2

(12) United States Patent
Wittrup

(10) Patent No.: US 12,125,367 B2
(45) Date of Patent: *Oct. 22, 2024

(54) HAND CLEANLINESS MONITORING

(71) Applicant: BioVigil Hygiene Technologies, LLC, Ann Arbor, MI (US)

(72) Inventor: Kevin Wittrup, Ann Arbor, MI (US)

(73) Assignee: BioVigil Hygiene Technologies, LLC, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/325,363

(22) Filed: May 30, 2023

(65) Prior Publication Data

US 2023/0401951 A1 Dec. 14, 2023

Related U.S. Application Data

(63) Continuation of application No. 17/379,526, filed on Jul. 19, 2021, now Pat. No. 11,704,992, which is a continuation of application No. 16/031,067, filed on Jul. 10, 2018, now Pat. No. 11,069,220.

(60) Provisional application No. 62/530,649, filed on Jul. 10, 2017.

(51) Int. Cl.
*G08B 21/24* (2006.01)
*G10L 25/51* (2013.01)

(52) U.S. Cl.
CPC ............ *G08B 21/245* (2013.01); *G10L 25/51* (2013.01)

(58) Field of Classification Search
CPC ..... G08B 21/245; G10L 25/51; H04R 29/007; H04R 29/004
USPC ........................................ 381/56, 57, 26, 58
See application file for complete search history.

(56) References Cited

U.S. PATENT DOCUMENTS

| | | | |
|---|---|---|---|
| 4,354,292 | A | 10/1982 | Telestad et al. |
| 4,370,983 | A | 2/1983 | Lichtenstein |
| 4,606,085 | A | 8/1986 | Davies |
| 4,706,493 | A | 11/1987 | Chang et al. |
| 4,782,334 | A | 11/1988 | Meaney |
| 5,202,666 | A | 4/1993 | Knippscheer |
| 5,366,896 | A | 11/1994 | Margrey et al. |
| 5,373,852 | A | 12/1994 | Harrison et al. |
| 5,412,816 | A | 5/1995 | Paterson et al. |
| 5,428,213 | A | 6/1995 | Kurihara |
| 5,441,047 | A | 8/1995 | David et al. |
| 5,544,649 | A | 8/1996 | David et al. |
| 5,606,159 | A | 2/1997 | Kurihara |
| 5,610,589 | A | 3/1997 | Evans et al. |
| 5,670,945 | A | 9/1997 | Applonie |

(Continued)

FOREIGN PATENT DOCUMENTS

| | | |
|---|---|---|
| EP | 0 429 414 | 5/1991 |
| EP | 1 455 177 | 9/2004 |

(Continued)

OTHER PUBLICATIONS

Berry et al., "The Business Case for Better Buildings," *Front Health Service Management*, 1-29 (2004).

(Continued)

*Primary Examiner* — Thjuan K Addy
(74) *Attorney, Agent, or Firm* — Fish & Richardson P.C.

(57) ABSTRACT

Among other things, systems and methods include a first sensor configured to detect operation of the sink; a second sensor configured to detect personal characteristics of a person operating the sink.

18 Claims, 36 Drawing Sheets

(56) References Cited

U.S. PATENT DOCUMENTS 5,685,262 A 11/1997 Stevenson
5,771,925 A 6/1998 Lewandowski
5,793,653 A 8/1998 Segal
5,808,553 A 9/1998 Cunningham
5,812,059 A 9/1998 Shaw et al.
5,870,015 A 2/1999 Hinkel
5,900,067 A 5/1999 Jones
5,945,910 A 8/1999 Gorra
5,952,924 A 9/1999 Evans et al.
5,954,069 A 9/1999 Foster
5,966,753 A 10/1999 Gauthier et al.
5,992,430 A 11/1999 Chardack et al.
6,001,127 A 12/1999 Schoon et al.
6,009,333 A 12/1999 Chaco
6,029,293 A 2/2000 Patterson et al.
6,029,600 A 2/2000 Davis
6,032,071 A 2/2000 Binder
6,038,331 A 3/2000 Johnson
6,125,482 A 10/2000 Foster
6,131,587 A 10/2000 Chardack et al.
6,190,326 B1 2/2001 McKinnon et al.
6,206,340 B1 3/2001 Paese et al.
6,236,317 B1 5/2001 Cohen et al.
6,236,953 B1 5/2001 Segal
6,245,206 B1 6/2001 Anderson et al.
6,246,330 B1 6/2001 Nielsen
6,278,372 B1 8/2001 Velasco et al.
6,347,724 B1 2/2002 Chen et al.
6,355,030 B1 3/2002 Aldrich et al.
6,375,038 B1 4/2002 Daansen et al.
6,392,546 B1 5/2002 Smith
6,404,837 B1 6/2002 Thompson et al.
6,417,773 B1 7/2002 Vlahos et al.
6,426,225 B1 7/2002 Lewis et al.
6,426,701 B1 7/2002 Levy et al.
6,431,400 B1 8/2002 O'Maley et al.
6,468,800 B1 10/2002 Stylli et al.
6,471,087 B1 10/2002 Shusterman
6,542,568 B1 4/2003 Howes, Jr. et al.
6,547,130 B1 4/2003 Shen
6,572,564 B2 6/2003 Ito et al.
6,592,822 B1 7/2003 Chandler
6,605,038 B1 8/2003 Teller et al.
6,633,772 B2 10/2003 Ford et al.
6,687,190 B2 2/2004 Momich et al.
6,702,826 B2 3/2004 Liddicoat et al.
6,727,818 B1 4/2004 Wildman et al.
6,748,281 B2 6/2004 Alsio
6,757,898 B1 6/2004 Ilsen et al.
6,776,791 B1 8/2004 Stallings et al.
6,790,231 B2 9/2004 Liddicoat et al.
6,814,816 B2 11/2004 Achar et al.
6,847,913 B2 1/2005 Wigley et al.
6,867,698 B2 3/2005 Herbert et al.
6,882,273 B2 4/2005 Kano
6,882,278 B2 4/2005 Winings et al.
6,883,563 B2 4/2005 Smith
6,895,338 B2 5/2005 Hsuing et al.
6,913,608 B2 7/2005 Liddicoat et al.
6,929,607 B2 8/2005 Lipman
6,942,694 B2 9/2005 Liddicoat et al.
6,943,678 B2 9/2005 Muirhead
6,964,638 B2 11/2005 Theodoracopulos et al.
6,965,312 B2 11/2005 Lerg
6,967,576 B2 11/2005 Hayes et al.
6,975,231 B2 12/2005 Lane et al.
7,007,698 B2 3/2006 Thornton
7,015,816 B2 3/2006 Wildman et al.
7,020,508 B2 3/2006 Stivoric et al.
7,024,236 B2 4/2006 Ford et al.
7,034,677 B2 4/2006 Steinthal et al.
7,034,691 B1 4/2006 Rapaport et al.
7,045,673 B1 5/2006 Batich et al.
7,063,722 B2 6/2006 Marquez
7,069,444 B2 6/2006 Lowensohn et al.
7,074,183 B2 7/2006 Castellanos
7,081,131 B2 7/2006 Thornton
7,087,015 B1 8/2006 Comrie et al.
7,095,501 B2 8/2006 Lambert et al.
7,098,793 B2 8/2006 Chung
7,107,631 B2 9/2006 Lang et al.
7,122,005 B2 10/2006 Shusterman
7,132,940 B2 11/2006 Ehben et al.
7,191,097 B1 3/2007 Lee et al.
7,228,874 B2 6/2007 Bolderheij et al.
7,236,097 B1 6/2007 Cunningham
7,242,306 B2 7/2007 Wildman et al.
7,242,307 B1 7/2007 LeBlond et al.
7,267,798 B2 9/2007 Chandler
7,271,728 B2 9/2007 Taylor et al.
7,286,057 B2 10/2007 Bolling
7,293,645 B2 11/2007 Harper et al.
7,482,936 B2 1/2009 Bolling
7,616,122 B2 11/2009 Bolling
7,936,275 B2 5/2011 Bolling
7,982,619 B2 7/2011 Bolling
8,502,681 B2 8/2013 Bolling et al.
2002/0000449 A1 1/2002 Armstrong
2002/0019586 A1 2/2002 Teller et al.
2002/0082177 A1 6/2002 Tabaac
2002/0095073 A1 7/2002 Jacobs et al.
2002/0132214 A1 9/2002 Mattson et al.
2002/0135486 A1 9/2002 Brohagen et al.
2002/0180605 A1 12/2002 Ozguz et al.
2003/0019536 A1 1/2003 Smith
2003/0026549 A1 2/2003 Ellis et al.
2003/0030562 A1 2/2003 Lane et al.
2003/0130567 A1 7/2003 Mault et al.
2003/0147925 A1 8/2003 Sawan et al.
2003/0164456 A1 9/2003 Petrich et al.
2003/0179224 A1 9/2003 Alsio
2003/0220215 A1 11/2003 Manske
2004/0034289 A1 2/2004 Teller et al.
2004/0067544 A1 4/2004 Vogel et al.
2004/0090333 A1 5/2004 Wildman et al.
2004/0092965 A1 5/2004 Parihar
2004/0148019 A1 7/2004 Vidlund et al.
2004/0148020 A1 7/2004 Vidlund et al.
2004/0150527 A1 8/2004 Harper et al.
2004/0155772 A1 8/2004 Medema et al.
2004/0172063 A1 9/2004 Li et al.
2004/0186565 A1 9/2004 Schreck
2004/0193261 A1 9/2004 Berreklouw
2004/0230809 A1 11/2004 Lowensohn et al.
2004/0243104 A1 12/2004 Seddon
2004/0243230 A1 12/2004 Navia et al.
2005/0004665 A1 1/2005 Aklog
2005/0004668 A1 1/2005 Aklog et al.
2005/0006559 A1 1/2005 Smith
2005/0035862 A1 2/2005 Wildman et al.
2005/0038741 A1 2/2005 Bonalle et al.
2005/0049157 A1 3/2005 MacDonald et al.
2005/0079637 A1 4/2005 Wilhelm et al.
2005/0088299 A1 4/2005 Bandy et al.
2005/0090414 A1 4/2005 Rich
2005/0134465 A1 6/2005 Rice et al.
2005/0191326 A1 9/2005 Melker
2005/0227880 A1 10/2005 Shiloach et al.
2005/0231373 A1 10/2005 Lynn et al.
2005/0233918 A1 10/2005 Rich
2005/0233919 A1 10/2005 Rich
2006/0025855 A1 2/2006 Lashinski et al.
2006/0067545 A1 3/2006 Lewis et al.
2006/0071799 A1 4/2006 Verdiramo
2006/0111620 A1 5/2006 Squilla et al.
2006/0132316 A1 6/2006 Wildman et al.
2006/0184240 A1 8/2006 Jimenez et al.
2006/0184241 A1 8/2006 Marquez
2006/0214000 A1 9/2006 Lapstun et al.
2006/0231568 A1 10/2006 Lynn et al.
2006/0240397 A1 10/2006 Lynn et al.
2006/0272361 A1 12/2006 Snodgrass
2006/0273915 A1 12/2006 Snodgrass
2007/0005129 A1 1/2007 Damm et al.

(56) References Cited

U.S. PATENT DOCUMENTS

| | | | |
|---|---|---|---|
| 2007/0008146 A1 | 1/2007 | Taylor et al. | |
| 2007/0080801 A1 | 4/2007 | Weismiller et al. | |
| 2008/0031838 A1 | 2/2008 | Bolling | |
| 2011/0169646 A1 | 7/2011 | Raichman | |
| 2012/0062378 A1 | 3/2012 | Bolling | |
| 2012/0068843 A1 | 3/2012 | Bolling | |
| 2015/0077258 A1* | 3/2015 | Nelson | G06Q 30/0207 705/14.1 |
| 2018/0033037 A1 | 2/2018 | Becker et al. | |

FOREIGN PATENT DOCUMENTS

| | | |
|---|---|---|
| EP | 1 480 413 | 11/2004 |
| EP | 1 510 987 | 3/2005 |
| EP | 1 095 190 | 4/2005 |
| EP | 1 555 351 | 7/2005 |
| FR | 2 805 162 | 8/2001 |
| GB | 2 324 397 A | 10/1998 |
| JP | 2000-505576 | 5/2000 |
| JP | 2002-511923 | 4/2002 |
| JP | 2003-525655 | 9/2003 |
| JP | 3497079 | 11/2003 |
| WO | WO 93/15690 | 8/1993 |
| WO | WO 97/12565 | 4/1997 |
| WO | WO 97/20524 | 6/1997 |
| WO | WO 98/24386 | 6/1998 |
| WO | WO 98/36258 | 8/1998 |
| WO | WO 99/29269 | 6/1999 |
| WO | WO 99/49816 | 10/1999 |
| WO | WO 99/66138 | 12/1999 |
| WO | WO 00/44311 | 8/2000 |
| WO | WO 00/62715 | 10/2000 |
| WO | WO 00/67805 | 11/2000 |
| WO | WO 01/89440 | 11/2001 |
| WO | WO 02/059701 A1 | 1/2002 |
| WO | WO 03/080150 | 10/2003 |
| WO | WO 03/105670 | 12/2003 |
| WO | WO 03/105730 | 12/2003 |
| WO | WO 04/014282 | 2/2004 |
| WO | WO 04/030569 | 4/2004 |
| WO | WO 04/031717 | 4/2004 |
| WO | WO 04/073498 | 9/2004 |
| WO | WO 04/090760 | 10/2004 |
| WO | WO 04/090761 | 10/2004 |
| WO | WO 04/090796 | 10/2004 |
| WO | WO 04/090798 | 10/2004 |
| WO | WO 04/090803 | 10/2004 |
| WO | WO 04/103223 | 12/2004 |
| WO | WO 05/002424 | 1/2005 |
| WO | WO 05/007037 | 1/2005 |
| WO | WO 05/025963 | 3/2005 |
| WO | WO 05/046488 | 5/2005 |
| WO | WO 05/055046 | 6/2005 |
| WO | WO 06/086434 | 8/2006 |
| WO | WO 2007/001866 | 1/2007 |
| WO | WO 2011/031774 | 3/2011 |

OTHER PUBLICATIONS

Buergy et al., "Wearable Computers: An Interface between Humans and Smart Infrastructure Systems," *Carnegie Mellon University*, 1-13 (2002).

Dunn et al., "Recommended Standards for Newborn ICU Design," *Report of the Sixth Census Conference on Newborn ICU Design*, Clearwater Beach, Florida, (Feb. 1, 2007).

Dunn et al., "Recommended Standards for Newborn ICU Design," *Report of the Sixth Census Conference on Newborn ICU Design*, Orlando, Florida (Jan. 25-27, 2006).

Echt et al., "Automated Abrasive Blasting Equipment for Use on Steel Structures," Taylor and Francis Ltd. Pub., *Applied Occupation and Environmental Hygiene*, 15(10) (Oct. 2000).

Figaro USA Inc., Technical Information for TGS2620, pp. 1-11 (Rev. 10/00).

Katz, "Hand Washing And Hand Disinfection: More Than Your Mother Taught You," *Anesthesiology Clinics of North America*, 22:457-471 (2004).

* cited by examiner

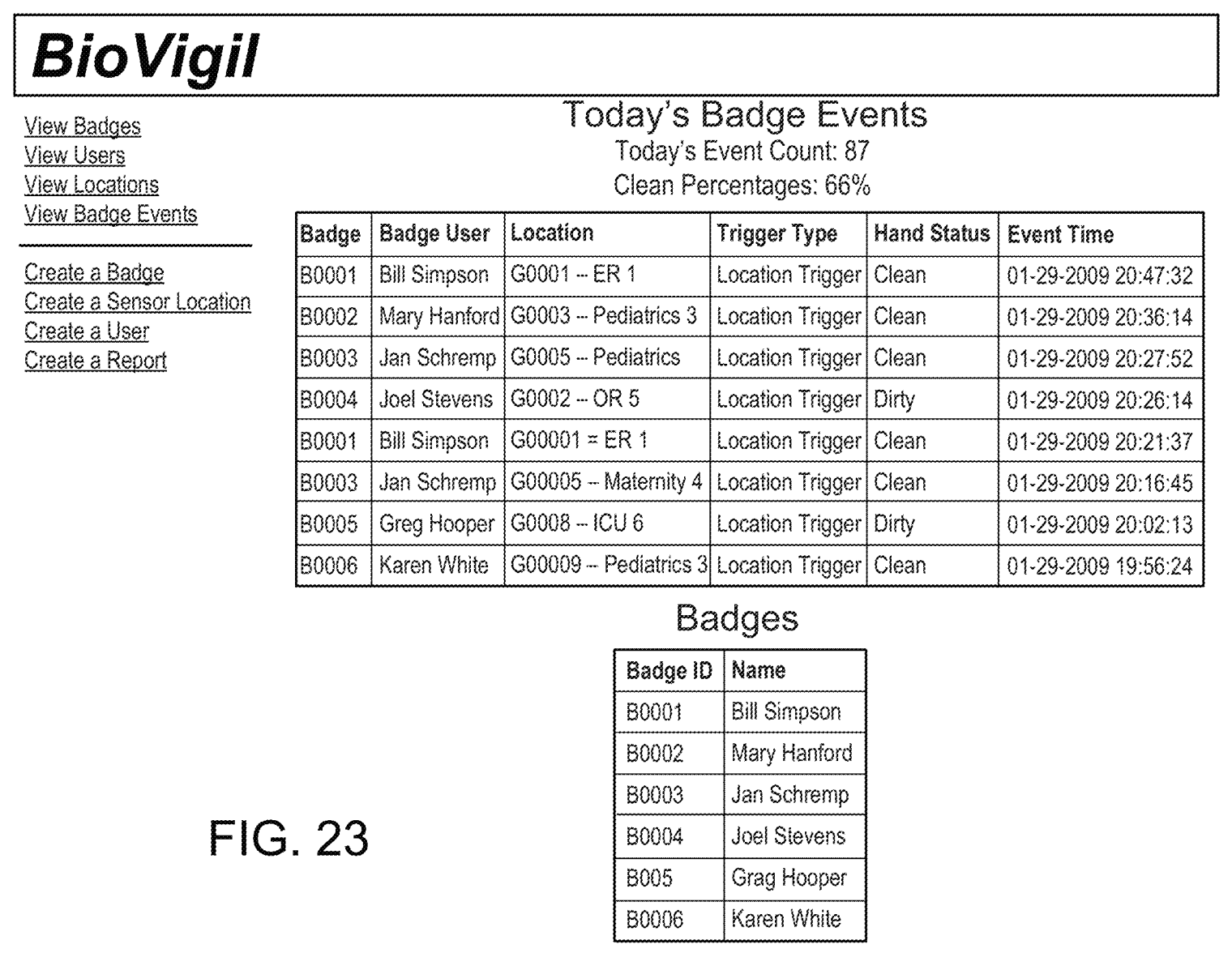

BioVigil

View Badges
View Users
View Locations
View Badge Events

Create a Badge
Create a Sensor Location
Create a User
Create a Report

Today's Badge Events

Today's Event Count: 87
Clean Percentages: 66%

| Badge | Badge User | Location | Trigger Type | Hand Status | Event Time |
|---|---|---|---|---|---|
| B0001 | Bill Simpson | G0001 -- ER 1 | Location Trigger | Clean | 01-29-2009 20:47:32 |
| B0002 | Mary Hanford | G0003 -- Pediatrics 3 | Location Trigger | Clean | 01-29-2009 20:36:14 |
| B0003 | Jan Schremp | G0005 -- Pediatrics | Location Trigger | Clean | 01-29-2009 20:27:52 |
| B0004 | Joel Stevens | G0002 -- OR 5 | Location Trigger | Dirty | 01-29-2009 20:26:14 |
| B0001 | Bill Simpson | G00001 = ER 1 | Location Trigger | Clean | 01-29-2009 20:21:37 |
| B0003 | Jan Schremp | G00005 -- Maternity 4 | Location Trigger | Clean | 01-29-2009 20:16:45 |
| B0005 | Greg Hooper | G0008 -- ICU 6 | Location Trigger | Dirty | 01-29-2009 20:02:13 |
| B0006 | Karen White | G00009 -- Pediatrics 3 | Location Trigger | Clean | 01-29-2009 19:56:24 |

Badges

| Badge ID | Name |
|---|---|
| B0001 | Bill Simpson |
| B0002 | Mary Hanford |
| B0003 | Jan Schremp |
| B0004 | Joel Stevens |
| B005 | Grag Hooper |
| B0006 | Karen White |

FIG. 23

HAND CLEANLINESS MONITORING

CROSS-REFERENCE TO RELATED APPLICATIONS

This application is a continuation application of and claims priority to U.S. application Ser. No. 17/379,526, filed on Jul. 19, 2021, which is a continuation of U.S. application Ser. No. 16/031,067, filed on Jul. 10, 2018, which claims priority to U.S. Provisional Application No. 62/530,649, filed Jul. 10, 2017. The entire contents of each application is hereby incorporated by reference.

BACKGROUND

This description relates to boundary identification and hand cleanliness.

Health care workers, food handlers, and others ought to clean their hands frequently and thoroughly, but they often don't. Better hand cleaning habits can be promoted by governmental regulations, company rules, social pressure, and technology. Techniques that have been proposed for improving cleaning habits include the use of special cleaning agents as well as mechanisms and electronic devices to regulate, monitor, and report on how frequently and how effectively people clean their hands.

SUMMARY

In general, the systems and methods described can be used for monitoring hand cleanliness. For example, badges worn by individuals can include sensors that detect certain substances (e.g., sanitizing agents (e.g., alcohol), or other substances indicative of hand cleanliness).

Wearable badges can be in the form of a two piece badge having a base portion and an attachable personal portion. The base portion can include the sensors and the associated circuitry including a power source, and the personal portion can include specific information, such as identifying information for the individual carrying and using the badge. Dividing the badge into a base portion and a personal portion enables interchangeability (e.g., a badge personal portion can be used with different badge base portions). When a specific base portion, which contains the sensors, associated circuitry, and power source, needs to be maintained (e.g., charged), a user can switch their personal badge portion to another base portion. One of the badge portions can include a visual indicator that presents information relating to the hand cleanliness state of the user's hands. For example, a display (e.g., an LCD, or another type of display) or signaling lights (e.g., LEDs) can be used on the badge to indicate if the user's hands are in a clean or unclean state.

Some systems include sinks (e.g., a hand washing sink in a hospital room) with sensors that can be used to determine or detect that an individual has washed their hands in the sinks. For example, sensors can be arranged in the drain of a sink and can be configured to analyze substances passing through the drain. In some embodiments, the sensors are tuned to detect certain combinations of substances, such as water and a cleaning agent (e.g., soap or an alcohol substance) that would indicate if a user was washing their hands. For example, in some cases, the sensors are tuned to detect a certain signature of substances passing through the drain (e.g., a certain level of "sudsiness" of the soapy water passing through the drain) which are expected to occur when a user washes their hands.

In some embodiments, sinks can alternatively or additionally include sensors that are configured to detect airborne substances that indicate that a user's hands have been washed properly. For example, the sensors can be used to detect substances (e.g., volatile substances) that are present in cleaning substances that are likely to be released and emitted into the air during hand washing.

In some embodiments, a user's badge is in communication with the sensors arranged in proximity to the sink. For example, the badge can send signals to the sink sensors or receive signals from the sink sensors to indicate that a user has or has not washed their hands.

Systems and methods can be implemented using infrared (IR) emitters. In some cases, the devices (e.g., wearable badges, equipment tags) being used to track movement, for example, of people and/or equipment can include onboard emitters used to transmit information from the devices to external receiving equipment. The onboard emitters can be switched from a default inactive state to an active state to transmit information upon receipt of a specific signal associated with the external receiving equipment. This approach can limit emissions (e.g., radio frequency emissions) from the devices except when devices are triggered to download information to the external receiving equipment. For example, it can be desirable to limit emissions in the patient care portion of a hospital room.

Some apparatuses to be carried or worn by a person include: electronics to determine a cleanliness state of the person's hands; and an element separate from the electronics to communicate information associated with the person to the electronics. Embodiments may include one or more of the following features.

In some embodiments, the electronics comprise an electronic sensor configured to be used by the person to detect a cleanliness state of the person's hands based on whether the person's hands bear a disinfecting material at a level that indicates cleanliness.

In some embodiments, wherein the information associated with the person is stored on a memory device disposed in the element separate from the electronics.

In some embodiments, the electronics and the element separate from the electronics are configured to be temporarily coupled to one another. In some cases, wherein the electronics are disposed in a housing and the housing comprises a receptacle that is configured to receive the element separate from the electronics.

In some embodiments, the information associated with the person comprises information identifying the person.

In some embodiments, wherein the electronics comprise substantially all electrical power consuming devices of the apparatus.

In some embodiments, the electronics are configured to be connected to a source of electricity to be electrically charged.

In some embodiments, electrical power to operate the apparatus is provided by the electronics.

In some embodiments, the electronics comprise a biometric detection device.

Some apparatuses to be carried or worn by a person include: electronics to determine a cleanliness state of the person's hands, to be temporarily connected to an element that is also to be carried or worn by the person, and to obtain from the element information associated with the person. Embodiments may include one or more of the following features.

In some embodiments, apparatuses also include a receptacle configured to receive the element and place the apparatus and the element in communication with one another.

In some embodiments, the apparatus comprises an electrical power source that provides substantially all electrical power needed by the element.

In some embodiments, wherein the electronics comprise an electronic sensor configured to be used by the person to detect a cleanliness state of the person's hands based on whether the person's hands bear a disinfecting material at a level that indicates cleanliness.

In some embodiments, the information associated with the person is stored on a memory device disposed in the element.

In some embodiments, the information associated with the person comprises information identifying the person.

In some embodiments, the electronics are configured to be connected to a source of electricity to be electrically charged.

In some embodiments, electrical power to operate the element is provided by the electronics.

In some embodiments, the electronics comprise a biometric detection device.

Some apparatuses to be carried or worn by a person include: electronics to determine a cleanliness state of the person's hands and to biometrically determine information associated with the person; and an element separate from the electronics to communicate to the electronics information associated with the person for comparison by the electronics with the biometrically determined information. Embodiments can include one or more of the following features.

In some embodiments, the electronics are configured to be used by the person to detect a cleanliness state of the person's hands based on whether the person's hands bear a disinfecting material at a level that indicates cleanliness.

In some embodiments, the electronics comprise an electronic sensor configured to detect a cleanliness state of the person's hands based on whether the person's hands bear a disinfecting material at a level that indicates cleanliness.

In some embodiments, the information associated with the person for comparison is stored on a memory device disposed in the element separate from the electronics.

In some embodiments, the electronics and the element separate from the electronics are configured to be temporarily coupled to one another.

In some embodiments, the electronics are disposed in a housing and the housing comprises a receptacle that is configured to receive the element separate from the electronics.

In some embodiments, the information associated with the person comprises information identifying the person.

In some embodiments, the electronics comprise substantially all electrical power consuming devices of the apparatus.

In some embodiments, the electronics are configured to be connected to a source of electricity to be electrically charged.

In some embodiments, electrical power to operate the apparatus is provided by the electronics.

In some embodiments, the electronics comprise a biometric detection device.

Some apparatuses to be carried or worn by a person include: a device to biometrically determine information associated with the person and to compare the biometrically determined information with corresponding information associated with a person to which the apparatus is assigned; and a device to transmit information relating to the person to a device separate from the apparatus. Embodiments can include one or more of the following features.

In some embodiments, the device to biometrically determine information associated with the person comprises a fingerprint reading device.

In some embodiments, apparatuses also include a control unit that is configured to receive a request from the device separate from the apparatus, responsive to the request, operate the device to biometrically determine information, and instruct the device to transmit information relating to the person to transmit the signals relating to the person.

In some embodiments, apparatuses also include electronics to determine a cleanliness state of the person's hands.

In some embodiments, the electronics are configured to be used by the person to detect a cleanliness state of the person's hands based on whether the person's hands bear a disinfecting material at a level that indicates cleanliness.

In some embodiments, the electronics comprise an electronic sensor configured to detect a cleanliness state of the person's hands based on whether the person's hands bear a disinfecting material at a level that indicates cleanliness.

In some embodiments, the information associated with the person to which the apparatus is assigned is stored on the apparatus. In some cases, the information associated with the person to which the apparatus is assigned is stored on a memory device disposed in the apparatus.

Some apparatuses include a sensor associated with a sink to detect a presence of a physical signature while or after a person has washed his hands at the sink, the physical signature confirming that the person has washed his hands at the sink. Embodiments can include one or more of the following features.

In some embodiments, the sensor is configured to be disposed in the proximity of a drain of the sink. In some cases, the physical signature comprises a mixture of a cleansing substance and liquid that results from the person washing their hands as the mixture passes through the drain. In some cases, the mixture comprises a soapy lather.

In some embodiments, the sensor is configured to be disposed in an area above the sink.

In some embodiments, the physical signature comprises an airborne mixture of a cleansing substance and liquid that results from the person washing their hands.

In some embodiments, the sensor is configured to detect a cleansing compound. In some cases, the cleansing compound comprises alcohol.

Some apparatuses include a sensor to determine whether a person has washed his hands at a sink by analyzing byproducts of hand washing and, responsive to analyzing the byproducts, sending a signal to an apparatus that tracks hand washing by the person. Embodiments can include one or more of the following features.

In some embodiments, the sensor comprises an electronic sensor configured to be used to detect a cleanliness state of the person's hands based on whether byproducts comprising a cleansing compound are emitted into the air in the proximity of the sensor at a level that indicates cleanliness.

In some embodiments, the byproducts are airborne and produced when the person washes their hands.

In some embodiments, the byproducts comprise a cleansing compound. In some cases, the cleansing compound comprises alcohol.

Some methods include: accumulating data about sequences of activities and events associated with hand washing by people who are using a sink, generating information that correlates the sequences data with information about actual thoroughness of the hand washing associated with the respective sequences, and inferring from a sequence of activities and events that occur when a person is using a sink for putative hand washing, and from the correlation information, a thoroughness of the hand washing by the person.

Some systems for verifying the cleanliness of a user's hand include: a sensor configured to detect a marker positioned on the user's hand, wherein the marker presents one of a spectral signature and a periodic pattern; and a processor in electrical communication with the sensor, wherein the processor is configured for comparing one of the detected spectral signature and the detected periodic pattern to an expected result to thereby detect whether the detected spectral signature or periodic pattern sufficiently corresponds to the expected result. Embodiments can include one or more of the following features.

In some embodiments, the marker is a material deposited on the hand via a dispensing of volatile hand-sanitizing agent, and wherein the sensor is configured to detect the marker without detecting vapor of the volatile hand sanitizing agent.

In some embodiments, the marker presents the periodic pattern and is located on a surface of a glove worn on the user's hand.

In some embodiments, systems also include an indicator and a server, wherein the server includes a database of previously-recorded patterns for the user, selectively activates the indicator in one manner when the detected periodic pattern does not match one of the previously-recorded patterns, and selectively activates the indicator in another manner when the detected periodic pattern matches one of the previously-recorded patterns.

In some embodiments, the sensor detects the spectral signature from one of the visible light, ultraviolet light, and infrared energy bands of the electromagnetic spectrum.

In some embodiments, the sensor and the processor are mounted with respect to a badge worn by the user.

In some embodiments, the sensor is wall-mounted.

In some embodiments, systems also include an indicator which is selectively activated by the CPU to indicate, using light or sound, whether the non-volatile compound was detected.

Some methods for verifying the cleanliness of a user's hand include: providing a marker on the user's hand; using a sensor to detect one of a spectral signature of the user's hand with the marker in position on the hand and a pattern of the marker; comparing the corresponding detected spectral signature or pattern to an expected result to determine the presence of an expected result; and visibly or audibly indicating whether the expected result is present.

Embodiments can include one or more of the following features.

In some embodiments, providing the marker includes providing an inventory of gloves each bearing a substantially unique variant of the marking.

In some embodiments, methods also include recording, via a server in communication with the sensor, whether the expected result is present or not present.

Embodiments of these systems and methods can provide one or more of the following advantages.

In some embodiments, the systems and methods described can increase the likelihood that workers (e.g., medical personnel) wear and use badges that monitor hand cleanliness by using badges that are easier to maintain (e.g., keep charged). The systems and methods can verify that the badges are being worn and used by the appropriate intended user by including biometric sensors, such as thumbprint readers.

In some embodiments, the systems and methods described can help provide a high level of reliability while monitoring hand washing practices of a user at a sink by sensing substances generated during hand washing.

In some embodiments, the systems and methods described can provide a high-level of reliability in indicating when devices (e.g., wearable badges, equipment tags) cross monitored boundary while limiting emissions in areas spaced apart from the boundary (e.g., the patient care portion of a hospital room). In some cases, selective activation of onboard emitters (e.g., upon receipt of a specific signal associated with external receiving equipment) can further limit emissions (e.g., radio frequency emissions) from the devices except when devices are triggered to download information to the external receiving equipment at locations spaced apart from, for example, the patient care portion of a hospital room.

Other advantages and features will become apparent from the following description and from the claims.

DESCRIPTION

FIG. 1 is a perspective view of a badge.

FIGS. 2, 3, and 4 are schematic plan views of three layers of the badge.

FIG. 23 illustrates a graphical user interface.

The system described here can be used for monitoring, encouraging, and managing the hand cleanliness of people who work or are otherwise present in places where hand cleanliness is important, for example, to reduce the spread of disease or to reduce contamination of products that are being manufactured or for other purposes. Important purposes of the system include encouraging or even enforcing hand cleanliness, reporting compliance with institutional or governmental requirements for hand cleanliness, and permitting the central and institutional control and management of hand cleanliness enforcement and reporting.

In some embodiments, badges that are made of two pieces which can be removed from one another can increase the likelihood that a worker will properly use the disinfection determining feature of the badge. For example, a base portion of the badge containing the disinfection determining features can be maintained (e.g., electrically charged) while a worker specific, personal portion of the badge containing personal information of the worker is switched to another base portion. This interchangeability can reduce operating and maintenance costs for the badges for institutions such as, for example, hospitals. For example, a hospital where workers work in shifts can implement a cleanliness monitoring system without needing to purchase enough base portions to provide one to each worker. Each worker will have their own personal badge portion. The sensors, memory, and power source are the most expensive components of the badges. It is anticipated that hand cleanliness systems implemented with two-piece badges will be less expensive than hand cleanliness systems implemented with one-piece badges because fewer sensors, memory, and power source modules will be required.

Hand cleanliness systems implemented with two-piece badges can also centralize maintenance and charging of the base portions of the badges. When a worker begins her shift, she connects her personal portion to a charged base portion checked out from storage and maintenance center. This approach is anticipated to provide increased equipment reliability relative to systems in which individual users are responsible for maintaining and/or charging their badges.

Figure 1:
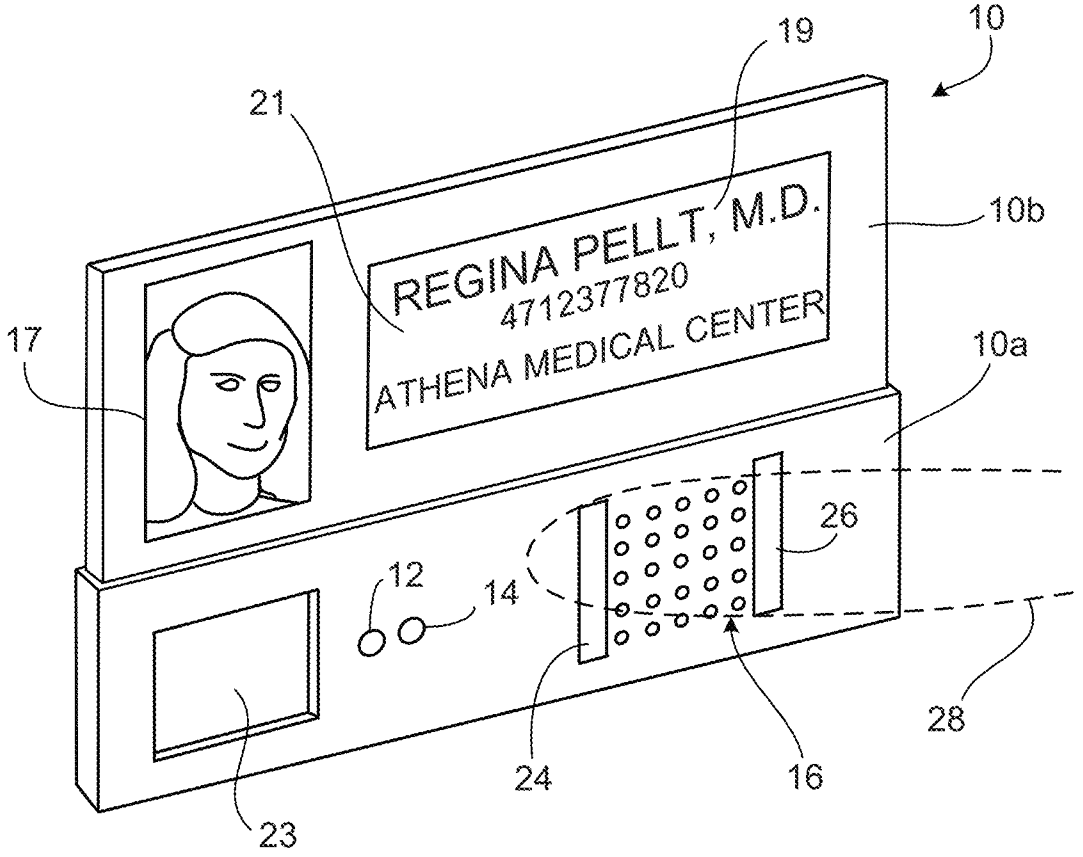

FIG. 1 shows an identification badge 10 worn by a doctor that includes a base portion 10*a* and a personal portion 10*b* that can be releasably connected to one another. As shown, the badge 10 can be of a shape and form and can display information sufficient to serve a conventional function of complying with government and institution regulations that require health care workers to carry visible identification. For example, the personalized portion 10*b* includes a photograph 17 of the doctor, and other information including the doctor's name 19 and identification number 21. A typical badge 10 could be approximately credit-card size.

While the personal portion 10*b* can include the information specific to the doctor, the base portion 10*a* can include hardware that used to detect and monitor hand cleanliness of the doctor. The exemplary base portion 10*a* has red and green lights 12, 14, that indicate that her hands are likely to be respectively in a clean (e.g., disinfected, green light) condition or in a not-clean (e.g., not disinfected, red light) condition. The two lights are controlled by a control circuit (not shown in FIG. 1) based on (a) information derived from an alcohol (e.g., ethanol) sensor 16 in the badge, (b) signals from a timer (also not shown in FIG. 1) that tracks the passage of time after the circuit has determined that the hands are likely to be in a disinfected condition, and (c) the state of the logic implemented by the control circuit (also not shown). An LCD display 23 displays information that can include the status of the badge, the control circuit, or the sensor; the time; the status of the cleanliness of the doctor's hands; and other information.

Because health care workers are required to carry such badges for other reasons, providing the disinfection determining function within the same badge makes it more likely that the worker will use that function than if the function were provided in a separate device that the worker was expected to carry separately. In addition, because the badge worn by a worker must be visible to others in the health care environment, the feature of the badge that indicates whether the user's hands are clean or unclean will naturally be visible to others. Thus, the worker, merely by having to wear the badge, will be subjected to social pressure of peers, patients, and managers with respect to the cleanliness of the worker's hands. This makes the use of the disinfection determining feature of the badge and the improvement of cleanliness habits self-enforcing. The institution employing the worker need only provide badges that include those features without directly managing or monitoring their use.

A pair of electrodes 24, 26 on either side of the sensor is used to determine when a finger 28 or other part of the hand or other skin has been placed against or near the sensor. When skin of a finger or other part of the hand touches both electrodes, the resistance between them will decline. By measuring that resistance, the control circuit can detect the presence of a finger.

The badge is used by the doctor in conjunction with disinfecting her hands using cleaners of the kind that include ethanol (for example, the liquid known by the name Purell available from GOJO Industries, Akron, Ohio, and which contains 62% ethyl alcohol). Such cleaners are considered to be more effective than soaps and detergents in killing bacteria and viruses and are widely used in health care and other environments. When the ethanol-based cleaner is rubbed on the skin of the hands, the ethanol kills the bacteria and viruses. The effect will last for several hours but eventually wears off. Ethanol is volatile and eventually evaporates from the skin, leaving the possibility (which increases over time) that live bacteria and viruses will again contaminate the skin from the air and from objects that are touched, for example.

The concentration of ethanol on the skin and the decay of that concentration from evaporation tend to determine the onset of subsequent contamination. In turn, the concentration of ethanol on the skin can be inferred by the concentration of ethanol vapor near the skin. By placing the skin near an ethanol detector for a short period of time, it is possible to determine the vapor concentration of ethanol and thus to infer the ethanol concentration on the skin and the disinfected state of the skin. When the current inferred concentration is above a threshold, it is possible to make an assumption about how long the hands will remain disinfected.

The sensors can detect cleansers other than alcohol.

Some sensors do not require the user to touch the badge or close electrodes and the sensing time is less than 1 second. Systems can be implemented in which the sensor is "on" the entire time that the badge is in use.

The badge can be used in the following way to improve the hand cleaning habits of the user.

In some simple examples, the badge can be configured to determine and display two different states: disinfected and not disinfected.

Except when the badge has recently enough (say within two or three hours) entered the disinfected state due to a measurement cycle in which an adequate concentration of ethanol vapor had been sensed, the badge will assume a default state of the user's skin of not disinfected. Thus, when the badge is first powered on, or reset, or the permitted time since a prior successful measurement has elapsed, the state becomes not disinfected. When the state is not disinfected the red light is lit and the word re-test is displayed on the LCD.

In some implementations, the badge can be made to switch from the not disinfected state to the disinfected state only by a successful ethanol measurement cycle. A successful cycle is one in which a finger or other part of the body is held in position over the sensor (touching both of the electrodes) for a period that is at least as long as a required measurement cycle (e.g., 30 seconds or 45 seconds or 60 seconds depending on the design of the circuit), and the concentration of ethanol vapor that passes from the skin into a measurement chamber of the sensor is high enough to permit an inference that the skin is disinfected.

Thus, when the doctor wipes her hands with the cleaner to disinfect them, she can then press one of her clean fingers against the sensor 16 and the two electrodes 24, 26, for, say, 60 seconds.

Touching of both of the electrodes simultaneously by the finger is detected by the control circuit which then begins the measurement cycle. The control circuit could start the red and green lamps to flash alternately and to continue to do so as an indication to the user that the electrodes are both being touched and that the measurement cycle is proceeding. At the end of the sensing cycle, the control circuit determines a level of concentration of ethanol and uses the level to determine whether the finger, and by inference, the hand of the doctor is disinfected. Each time a measurement cycle has been fully completed, the red and green lights may both be flashed briefly to signal that the cycle has ended and the finger may be removed.

The control circuit continually monitors the electrodes to determine when a finger or other skin is touching both of the electrodes. When that event is detected, a measurement cycle count down timer (which is initialized for the number of seconds needed to complete a measurement) is started. At the beginning of a cycle, a voltage is applied to the heater to begin to heat the sensor element. Initially the heater voltage may be set to a higher than normal value in order to shorten the initial action period described below. Then the heater voltage is reduced. At the end of the measurement cycle, a measurement voltage is applied across the series connection of the measurement cell and the series resistor, and the voltage across the series resistor is detected and compared to a threshold to determine whether the state should be set to disinfected or not disinfected.

When the control circuit determines that the hand is disinfected, the control circuit switches to the disinfected state, lights the green lamp (and turns off the red lamp), and displays the word clean on the LCD. In addition, upon the initiation of the disinfected state, the control circuit starts a re-test count down timer that is initially set to the period during which the skin is expected to remain disinfected (for example two hours).

If the control circuit is in the disinfected state and the user voluntarily performs another successful measurement cycle (for example, if, during the two hours after the prior successful measurement, she disinfects her hands again), the re-test count down timer is reset.

Anyone in the vicinity of the doctor who can see the lights or LCD is made aware of whether, according to the doctor's use of the badge, the doctor's hands are disinfected or not. People who find troubling the indication that a person's hands are not disinfected can complain to the person or to the employer, for example.

During the sensing cycle the doctor must keep her finger against the sensor for at least a certain period of time, say 60 seconds, to give the sensor and the control circuit time to obtain a good reading. If the doctor removes her finger before the end of the period, the control circuit remains in or switches to the not disinfected state and displays the word re-test on the LCD display.

If the doctor holds her finger against the sensor long enough to complete the sensing cycle, the results of the sensing cycle are displayed on the LCD and by lighting either the red light or the green light.

If the sensing cycle ends with a determination that the finger is not disinfected, the doctor can try again to apply enough of the cleaner to her hands to satisfy the circuit and can test the ethanol concentration again. The cycle can be repeated until the disinfected state is determined.

In addition to causing the green light to be illuminated and the LCD to show clean, successfully completing an ethanol test also causes the control circuit to reset a count down timer (not shown in FIG. 1) to a predetermined period (say, two hours) after which it is assumed that the benefit of the ethanol treatment has worn off and the doctor's hands are no longer disinfected. When the timer times out at the end of the predetermined period, the control circuit turns off the green light, lights the red light, and changes the displayed word from clean to re-test. The red light stays on and the word re-test continues to be displayed until a successful ethanol test is performed by the doctor.

Figure 2:
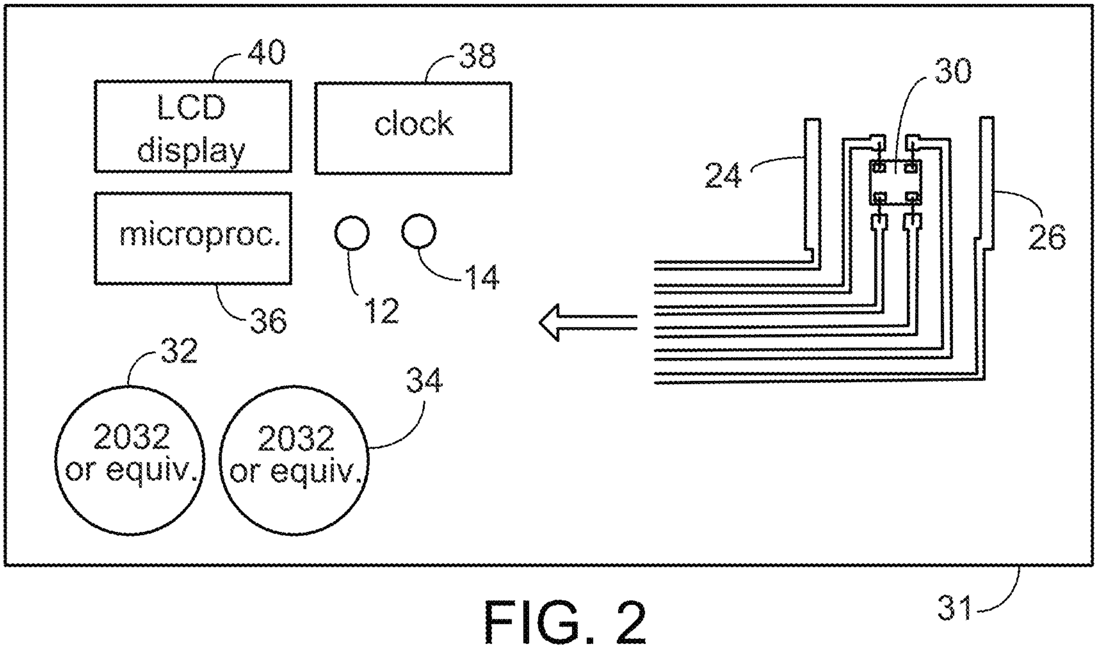
Figure 3:
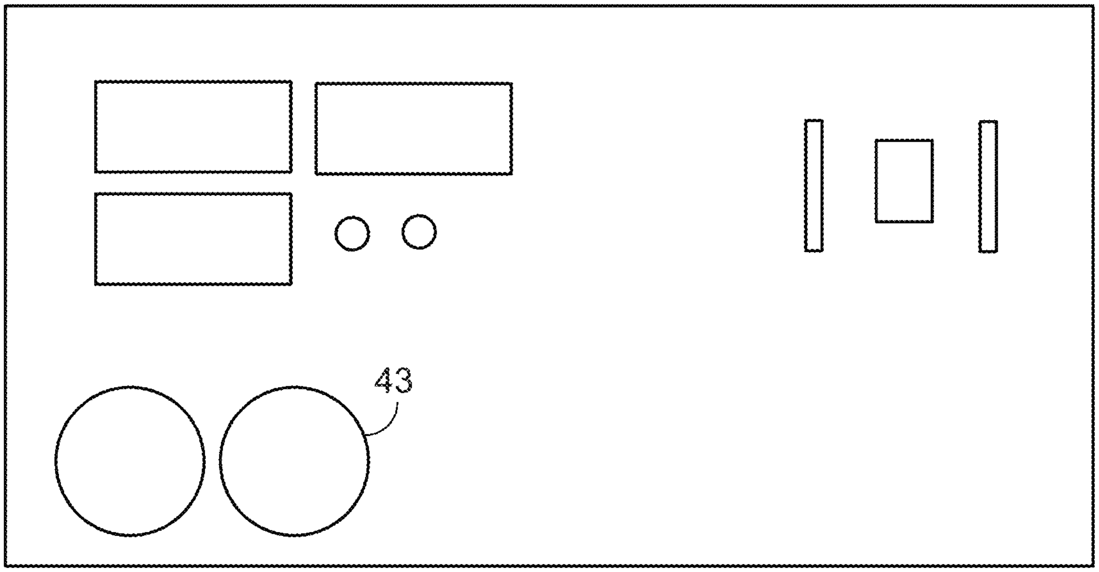
Figure 4:
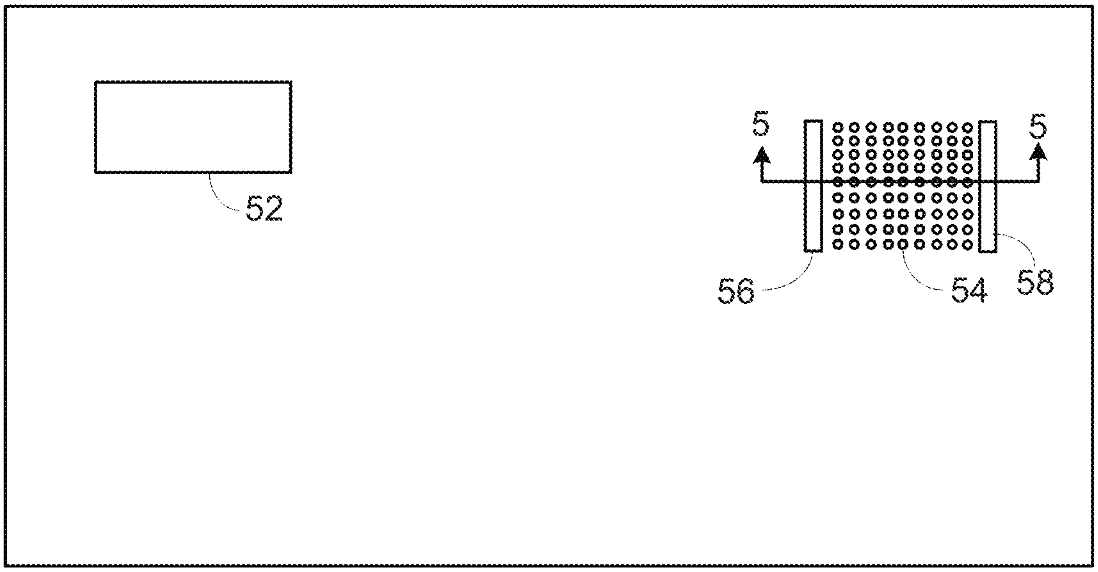

Badges can also be made as one piece having unitary personal and base portions. As shown in FIGS. 2, 3, and 4, a one piece badge can be fabricated by assembling three layers.

A bottom layer 29 (shown schematically in FIG. 2) contains a printed circuit 31 and components mounted on the circuit. The components include the sensor element 30 of the sensor, two thin batteries 32, 34, a microprocessor 36 (an example of the control circuit mentioned earlier), a clock 38 (an example of the timer circuit mentioned earlier that can be used both for the measurement count-down timer and for the re-test count-down timer), the two LED lamps 12, 14, and an LCD display device 40. The detailed interconnections of the devices mounted on the bottom layer are not shown in FIG. 2. The control circuit could be, for example, a PIC microcontroller available from Microchip Technology, Inc. of Chandler, Arizona.

A middle layer (shown schematically in FIG. 3) is thicker than the bottom and top layer and provides physical relief for the components mounted on the bottom layer. The patterns shown in FIG. 3 represent cutouts 43 or perforations in the middle layer.

A top layer 50 (shown schematically in FIG. 4) includes a non-perforated and non-printed clear region 52 to permit viewing of the LCD display. Space is left for adding a photograph and other information as show in FIG. 1. A perforated region 54 provides openings for passage of ethanol vapors into the badge and two perforations 56, 58 on opposite sides of the perforated region 54 accept the conductive electrodes that are used to detect the presence of a finger.

Figure 5:
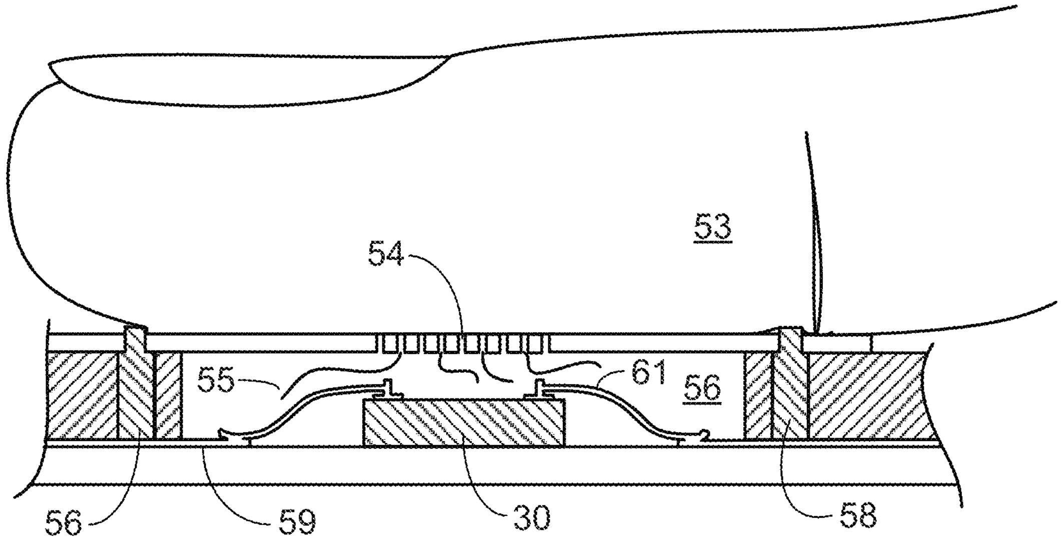
FIG. 5 is a sectional side view of a chamber at 5-5 in FIG. 4.
Figure 6:
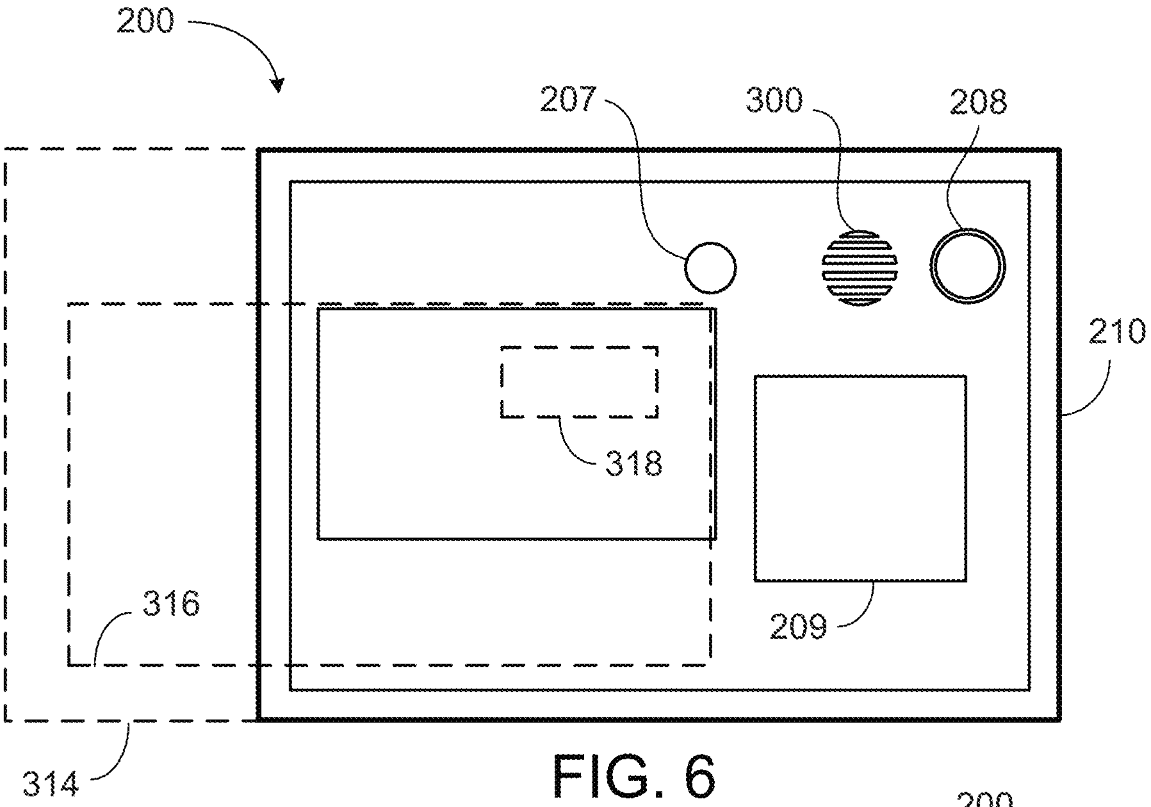
FIGS. 6 through 9 are outside front, inside front, outside back, and inside back views of a badge.
Figure 7:
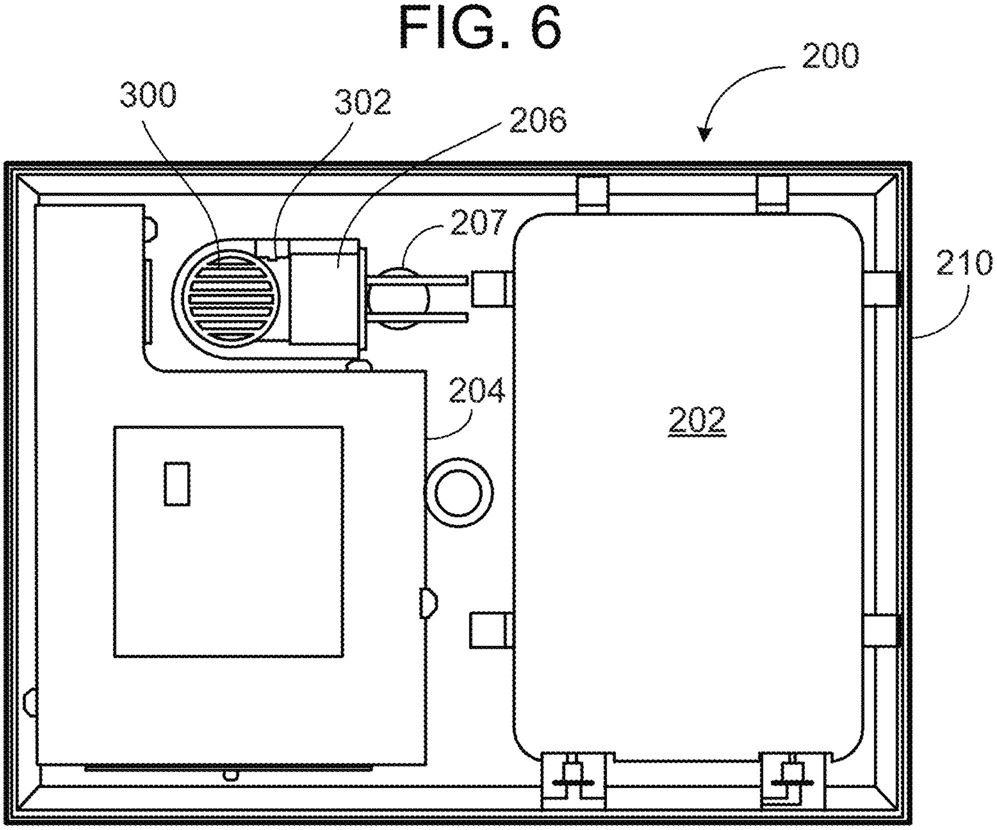
Figure 8:
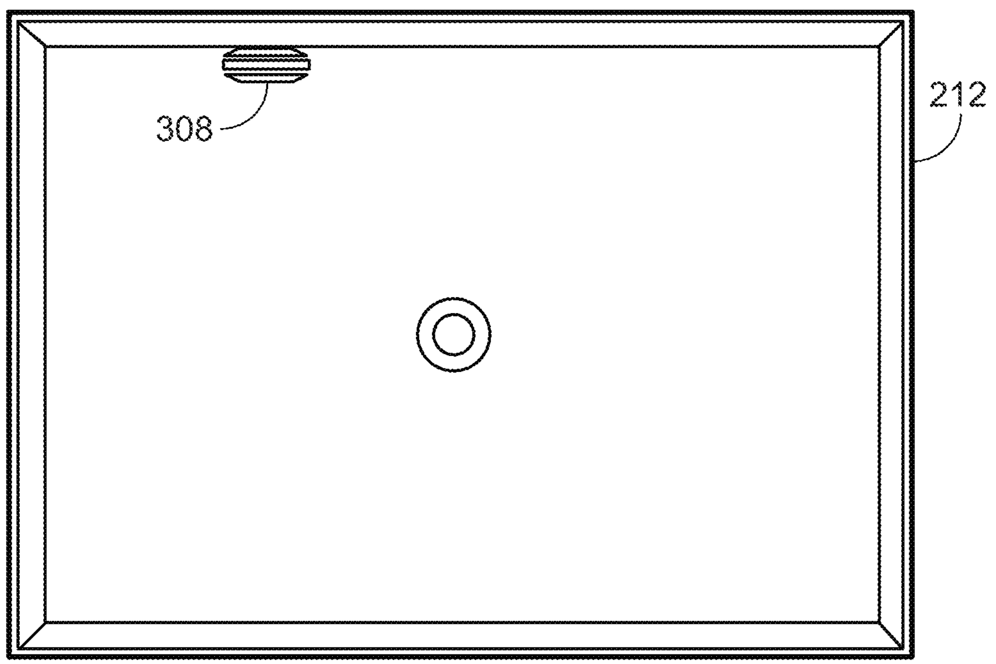
Figure 9:
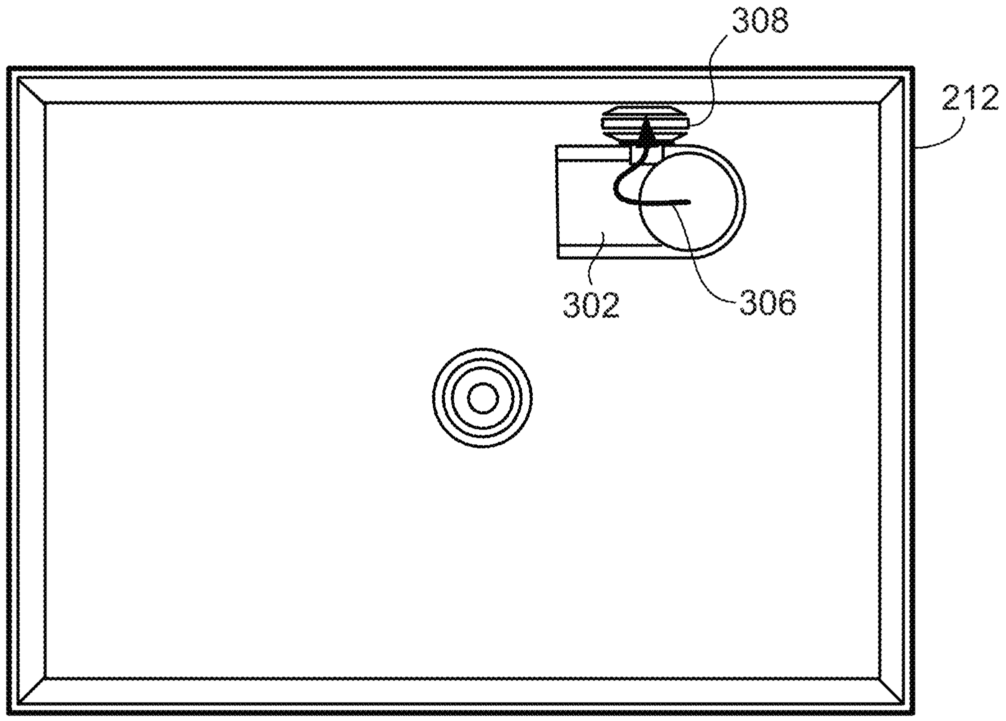

As shown in FIG. 5, the arrangement of the three layers in the vicinity of the sensor provides a sensing chamber 56. Ethanol vapors 55 pass from the finger 53 through the holes in perforated region 54 (which is shown as narrower than in FIG. 4) and into the chamber. Within the chamber is a tin oxide sensor element 30 (which includes an integral heater). The sensor element is connected by wire bonded connections 61 to circuit runs 59 on the bottom layer of the badge. The heater heats the vapors within the chamber and sensor element measures the concentration of ethanol.

Tin oxide sensors are small, low cost, and relatively low in power requirements. An example of a tin oxide ethanol sensor is the Model TGS 2620-M available from Figaro USA Inc. of Glenview, Illinois, although other sensors available from other vendors could be used.

The sensor includes an integral heater and four connections, two for the sensor element, and two for the heater. By wiring a resistor in series with the element and measuring the voltage drop across the resistor, the control circuit can determine the amount of current flowing in the element and hence the resistance of the element which will vary with ethanol concentration.

Tin oxide sensors with heaters are subject to a so-called initial action that occurs when the sensors are not energized for a period and then are energized. The resistance of the sensor drops sharply during an initial period of energization, whether gases are present in the surrounding air or not. The longer the period of unenergized storage (up to about 30 days), the longer the period of the initial action. Therefore using tin oxide sensors in the badges requires a trade off between powering their operation for a period longer than the initial action but not so long that the energy drain caused by measurement cycles reduces the lifetime of the battery to an unacceptably short period. Experiments suggest that if the user keeps her finger in contact with the sensor for at least 20 or 30 seconds, the sensing of ethanol then begins to dominate the initial action and permits detection of the ethanol concentration. Other approaches may provide a shorter initial action (such as applying a larger voltage for the first few seconds of operation and then the normal voltage after that).

The badge provides a simple, effective, portable, and inexpensive way to confirm that the ethanol treatment has occurred no longer than, say, two hours ago, which likely means that the hands remain disinfected. No other external equipment is needed. The disinfection condition is apparent to anyone in the vicinity of the doctor, including patients, supervisors, regulators, and peers. The social pressure associated with being identified easily as not having disinfected hands is an effective way to improve the frequency and thoroughness of cleaning. The system does not force the doctor to comply. Compliance with cleaning rules and policies may remain less than perfect using the badges, yet it is likely that the compliance will improve significantly. Any degree of improvement translates into reduced costs and injuries now associated with hands that have not been disinfected.

The internal modules of a two piece badge can be implemented in a similar fashion to the internal modules of the one-piece badge described above with reference to FIGS. 2, 3, and 4. The base and personal portions of a two-piece badge include connections providing communication between the base and personal portions. For example, prototype two-piece badges were implemented using a standard type A USB interface between the two pieces. The badge portions can also be configured to communicate with each other wirelessly. For example, a base portion located in the user's pocket could communicate wirelessly with a badge personal portion worn as a traditional badge on a worker's lapel. Although we sometimes have referred to use of the system by a doctor, it is also useful for a wide variety of other people, including other health care workers, clean room workers, and guests, consumers, vendors, employees, and other parties involved in any kind activity in which cleanliness of the hands or other parts of the body is important.

For example, although a simple matching of a measured ethanol concentration against a threshold can be used to determine simply whether the state should be disinfected or not disinfected, it is also possible to provide a more complicated analysis of measured concentration over time and a comparison of the measured concentration against dynamically selected thresholds.

More than two states would be possible, for example, to denote different levels of disinfection or to denote that longer periods of time may elapse before another measurement is required.

The length of time before a first measurement is considered stale and another measurement is required need not be based on an estimate of how long the ethanol on the skin will be effective, but can be based on an arbitrary period such as every hour.

The degree of accuracy and repeatability of the measurement of ethanol concentration may be traded with the cost and complexity of the circuitry needed to do the measurements. In some examples, the goal need not be to assure that the user's hands are thoroughly disinfected at all times. Rather, if the system encourages more frequent and more thorough cleaning to any noticeable degree, great benefits will result. Thus a very simple system may be quite useful and effective even though it may allow some users to cheat and may fail to determine the state accurately at all times.

Additional lights and displayed words may be used for a variety of purposes. The approach of the end of the disinfected period could be indicated by a yellow light to alert the user that a cleaning would soon be needed.

The lights and LCD display could be supplemented with or replaced by audible alerts for all functions or some of them.

Although ethanol and an ethanol sensor form the basis of some of the examples described here, other disinfectants (for example, trichlosan) may also be used provided that effective sensors are available for them. For example, the cleaning agent that is being measured need not be limited to ethanol but could include combinations of ethanol with other materials or other materials in the absence of ethanol; an appropriate sensor for the other materials would be used. For example, a dual mode volatile organic compound (VOC) sensor could be used. Such a VOC sensor could include two unique and separately tuned sensor elements integrated into a single sensor to facilitate detection of specific marker chemicals in addition to alcohol. Detection of such marker chemicals could be used to validate hygiene compliance with non-alcohol based sanitizers or soaps. Each sensor element can designed and optimized independent of the other to detect different substances. Each sensor element may be tuned to detect the active sanitizing chemical or a different trace chemical generally present with the active sanitizing chemical but not the sanitizing chemical itself.

The badge could include clips, hook and loop fasteners, chains, pins, ribbons, and belt loops, and other devices to hold the badge on the user.

The device need not take the form of a badge but could be an ID device that attaches to a belt, a lapel, any other article of clothing, and other parts of the body including an arm, a leg, or a neck.

The badge could be powered by photovoltaic cells using ambient light instead of a battery.

Although two different lights could be used to indicate the disinfected and not disinfected conditions, a single light that can change color could also be used, saving cost and space.

Because the ethanol sensor has a lifetime that is limited by the number of test cycles, the badge can include a circuit that counts the number of tests performed and illuminates a warning light or provides some other indicator when the sensor is reaching the end of its useful life.

Other types of ethanol sensors can be used. One such sensor comprises a ceramic chip but is considerably more expensive than the sensors described earlier.

In general, in addition to triggering a change in state of the badge after a period elapses, it is also useful to maintain a count of the number of times a person has run a test (sometimes called the number of taps) using the sensor in a given period of time. The badge can contain a counter that keeps track of the number of taps and determines the count per 24 hours. This number can then be reported to the person's employer or to regulatory agencies as evidence of good cleanliness practices in an institution. For reporting purposes, the number of counts can be communicated to a reader by RFID technology, or any other communication technique.

The sensor and indicators need not be associated with identification information but could be provided in a device the sole purpose of which is to measure the concentration and provide an indication of it.

The device can be used in non-health care environments in which hand cleanliness is important or expected.

In a health-care environment, the device could be used by anyone who is providing services as well as by patients and their families or friends.

Information about the frequency, timing, and results of measurements performed historically by the user can be stored on the badge.

Many additional functions could be added to the badge by increasing the capacity of its processor, memory, displaying, communications ability, and user inputs features.

Another exemplary cleanliness sensing badge 200, as shown in FIGS. 6, 7, 8, 9, and 10, includes a battery 202, a circuit board 204, a sensor 206, a multi-color LED 207, a two-dimensional display 209, and a momentary on switch 208 mounted within two halves 210, 212 of a housing. To reduce the chance of contamination of or damage to the components on the inside of the housing, sealing elements can be provided along the seam between the two halves and at the openings in the two halves through which each of the LED, the switch, and the display are mounted.

Figure 10:
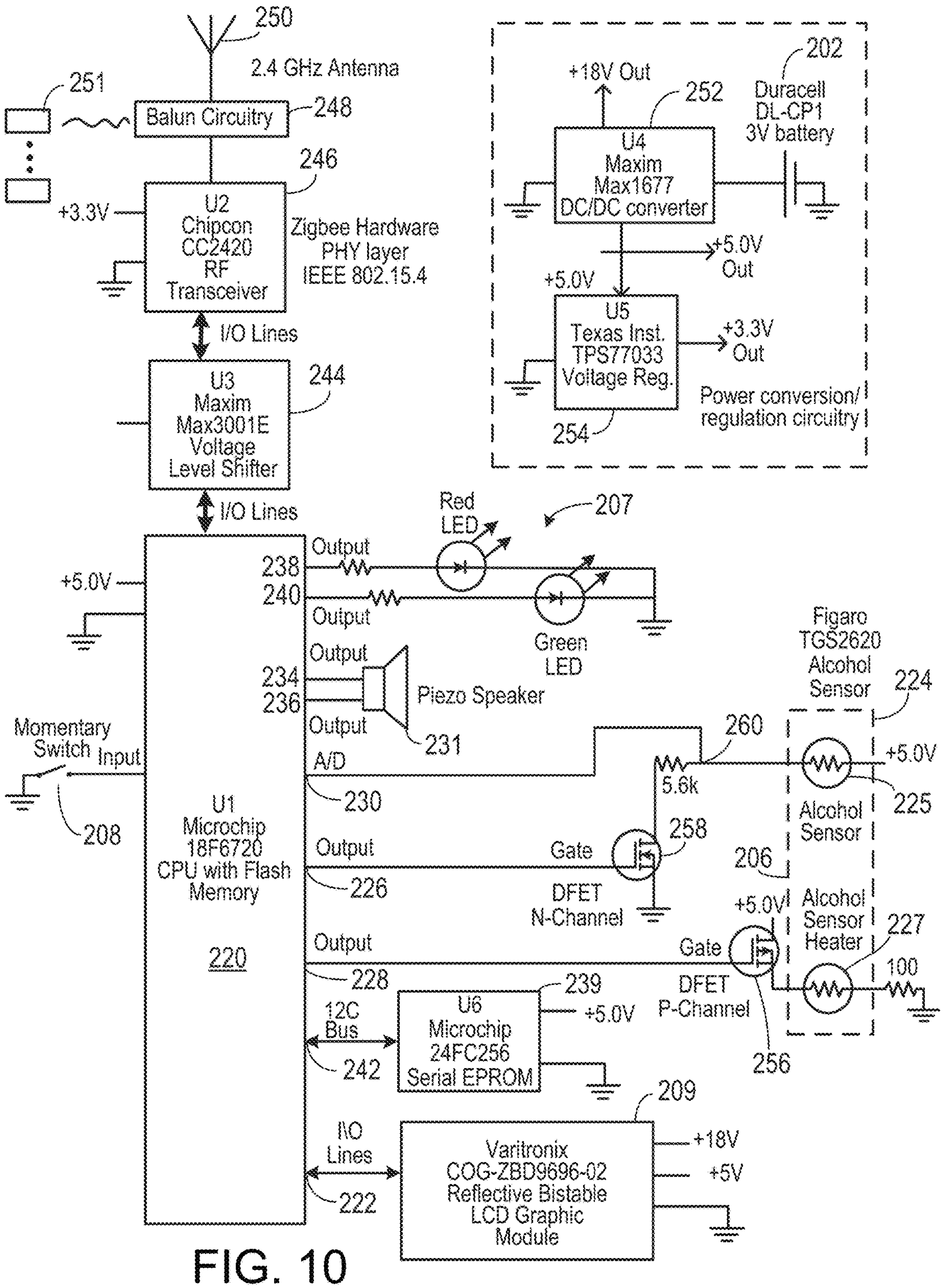
FIG. 10 is a schematic diagram of a badge.

As shown in FIG. 10, the components of the sensing badge include a CPU 220 having a flash memory (Microchip part 18F6720) to control (a) the display 209 (Varitronix part COG-ZBD9696-02) through I/O lines 222, (b) an alcohol sensor 224 (Figaro part TGS2620) through control outputs 226, 228, and A/D input 230, (c) a piezo speaker 231 through outputs 234, 236, (d) the two-color LED 207 through outputs 238, 240, and (e) an external EPROM (Microchip part 24FC256) 239 through an I/O bus 242. The CPU 220 also receives information from the switch 208 and communicates bidirectionally through a voltage level shifter 244 (Maxim part Max3001E), an RF transceiver 246 (Chipcon part CC2420), a balun circuit 248, and an antenna 250 with transponders, base stations, and possibly other external devices 251. The voltage level shifter shifts the DC voltage level of signals sent back and forth to the CPU from the 5.0 volts level used by the CPU to the 3.3 volts level used by the transceiver, saving power.

Power for the circuitry is provided by the battery 202 through a DC/DC converter 252 (Maxim part Max1677) and a voltage regulator 254 (Texas Instruments part TPS77033).

The alcohol sensor 224 includes a sensor element 225 and a heater 227. The resistance of the sensor element changes in the presence of alcohol vapor by an amount that relates to the concentration of the vapor. By permitting alcohol vapor from a person's finger to reach the sensor and by using an appropriate test protocol, the relationship of the concentration of the vapor to a threshold can be determined and used to establish a disinfected or not disinfected state of a user's hands. The resistance of the sensor element 225 is measured as an analog voltage at the A/D input of the CPU. If the sensor element remains dry, the resistance of the element in the absence of alcohol will be subject to very little drift. However, if the sensor element is exposed to water or water vapor, the resistance will change substantially. For this reason, in a typical use of the sensor element 225, the heater is energized for a period to dry the sensor element before a measurement is taken. Thus, a time delay must occur from the time when a measurement is desired until the time when the measurement is completed.

To eliminate the time required to heat the sensor element at the time when a test is to be started, the resistance of the sensor element is continually monitored. If the drift in the resistance of the element occurs more slowly than a background drift rate, indicating that the sensor element has remained dry, no action is taken and the sensor element is considered to be in a standby mode. Conversely, if the resistance drift is comparable to what would be expected when water vapor is present at the sensor element, the CPU drives the heater in a heating mode to dry out the sensor element. As soon as the resistance has returned to the expected dry value, the heater is turned off and the system returns to the standby mode.

When the sensor element is in the presence of alcohol vapor, such as when a person with disinfected hands places a finger near the monitor, the resistance of the dry sensor element shifts substantially, indicating a presence of alcohol vapor. This causes the CPU to enter a test mode in which a determination is made whether the concentration of the vapor exceeds a threshold that indicates disinfected hands. Once the test is completed and related actions are taken by the CPU in response to the result, the CPU returns to the dry mode. The heater is driven by the CPU output through the gate of a transistor 256. To detect the resistance of the sensor element, the CPU drives the sensor element through the gate of a transistor 258 and the voltage level at a node 260 is the analog input to the CPU.

In this way, the sensor is always available for a test measurement without requiring a heating cycle and the user can perform a test simply by putting her finger near the sensor element without requiring an on switch to be activated. Nevertheless, in some implementations, a switch can be provided that can be pressed by the user to initiate the test mode.

The program used by the CPU to operate in the standby mode, the heating mode, and the test mode, is stored in the CPUs flash memory, while data needed to operate in those modes, data derived from measurements of the resistance of the sensor element, and other information can reside in RAM or external non-volatile EPROM.

The data can be stored in and retrieved from the EPROM by the CPU on behalf of itself and on behalf of external transponders, base stations, and other devices for a wide variety of purposes. Data can be stored at the time of manufacture, at the time of registration of a user, during operation of the monitor, or at any later time.

The data in the EPROM can include calibration information about the empirical relationship of the resistance of the sensor element to the presence of different concentrations of water vapor, and of different concentrations of alcohol.

The data contained in the EPROM includes calibration data, threshold values, and other data useful in the operation of the alcohol sensor, data about a user of the badge, data used for the LCD display, data to drive the piezo speaker, data derived from measurements of the sensor resistance, historical data about the times and results of measurements, and information useful in communicating with external devices.

The calibration data for the alcohol sensor can include empirical data or tables that represent the expected resistance of the sensor element associated with various levels of water vapor or alcohol. The threshold values could include a threshold value for resistance that indicates the presence of water vapor, a threshold value that indicates the presence of alcohol vapor, and a threshold value that indicates that the concentration of alcohol vapor exceeds a value associated with disinfected hands. The data for the alcohol sensor can also include information about rates of change of resistance that may be associated with the introduction of water vapor or the introduction of alcohol vapor that will enable the CPU to determine when to switch modes among the standby mode, the heating mode, and the testing mode. The data stored in the EPROM may also include drift information that indicates an expected rate of drift of the resistance during standby mode over time, and expected rates of change of resistance when water vapor and alcohol vapor are present. The sensor element has a useful life that may be associated with the number of testing cycles for which it has been used. The EPROM may store information about the number of expected cycles and a counter that indicates the number of actual cycles.

During operation, data may be stored in the EPROM that includes a record for each test performed, including the starting and ending time, the starting resistance, the ending resistance, an indication of the result of the test (not disinfected, disinfected, inconclusive), whether the test result has been reported to an external device, and whether the test was initiated by pushing the on button or simply by touching the finger to the badge. The EPROM may also include data useful in perform a diagnostic test of the sensor element by applying a certain voltage and calculating the resulting resistance values over time.

The algorithm that is stored in the EPROM and run by the CPU with respect to the sensor element could include the following sequences. During initialization of the badge (e.g., when the badge is first powered up), the sensor heater may be powered up to heat the sensor element. Then the sensor element may be energized to +5 Volts and the voltage at the A/D input can be read by the CPU. The heater may be kept on until the voltage measurement from the sensor element becomes stable (slope is essentially flat), indicating that the heating mode is done, the sensor element is active and dry, and the badge may enter the standby mode. The heater and sensor element are then de-energized and the sensor element is allowed to cool to ambient temperature. Then the heater and sensor element are re-energized for a calibration test. After a predetermined test period has elapsed (say, two seconds), the voltage from the sensor element is measured and the value is saved as the calibration reference value indicative of the baseline dry state.

When the on button is pressed, the CPU energizes the heater and sensor element for a fixed test cycle period (say two seconds). If the measured voltage representing the resistance of the sensor element is a certain percentage (say 20%) higher than the baseline dry state reference value, the CPU determines the presence of enough alcohol to indicate disinfection. Otherwise the CPU determines no disinfection. In some examples, instead of de-energizing the alcohol sensor after the initial calibration, the CPU may power the sensor element continuously (or frequently but intermittently) and make continuous (or intermittent) measurements of resistance. As an alternative to pushing the on button, when a sharp shift in resistance is detected, the CPU may assume that the user has placed her finger near the sensor element and wants to initiate a test. In addition, if the resistance level changes sufficiently to indicate presence of water vapor, the CPU can initiate a heating mode.

To compensate for drift in the sensor, the CPU may periodically measure the voltage output from the sensor element using the steps described for a button press above. If the measurement reflects only a modest drift in the sensor resistance, then the CPU would substitute the current measurement for the previously stored one. If the drift were significant (perhaps more than one percent different from the previous measurement), the CPU would enter a recalibration mode using the steps described for the initial startup.

In addition to running the algorithm that controls calibration, heating, testing, and standby modes, the CPU may run a process, stored in the flash memory of the CPU, that controls communication of the badge with external devices.

The communication process may perform a wide variety of functions that are initiated either by the CPU itself or by the external device.

In one function of the communication process, the CPU continually watches for a signal from the transceiver indicating that the badge is within communication range of an external device, such as a transponder, a base station, or another device. If so, the CPU may execute a routine to fetch data from the EPROM and communicate it to the external device. The information to be fetched could include the identity of the user of the badge, the results of calibrations of the sensor, calibration values, battery life information, the number of tests performed since the prior upload, and the results of all of the tests performed in the interim, including all or selected portions of the data stored. As explained below, the CPU may have stored data in the EPROM indicating the successive locations in a building or a campus at which the badge had been recognized by external communicating devices, and the upload of data could include the data represent the successive locations. When a test has been performed at one of the locations, the association of the location with the test may also be uploaded.

The determination of what data is to be uploaded could be made by the CPU or by the external device to which the data is to be uploaded.

In addition to uploading data from the badge to the external device, in some examples, information and commands may also be downloaded from the external device to the badge. The data to be downloaded could include updated calibration values, updated threshold values, updated identifiers, information to be shown on the display of the badge, a refresh of prior test results and data, and other information. The commands could include instructions to turn the badge on, or off, to perform a test and return the results, to upload the test results from previous tests, to purge the EPROM of prior test results, to control the lighting of the LEDs or the information shown on the display, to trigger the speaker, to reconfigure the transceiver, to reboot the CPU, and other commands.

The CPU may continually maintain information about the cleanliness state of the user that is based on current and historical tests performed either on the badge or on another device (for example, the results of alcohol tests performed on a wall mounted tester could be communicated to the badge and used for that purpose). The badge will switch from the disinfected state to the non-disinfected state after a predetermined period that can be stored in the EPROM and updated based on empirical data about the duration of effectiveness of an alcohol cleaning of the hands.

In addition, the badge can be forced by a command from an external device to switch from a disinfected state to a not disinfected state when the badge is in communicating range of the external device. This feature can be used by a manager of a building, a space, or a campus, to enforce a fresh hand cleaning regimen on users at certain locations whether or not they are currently in a disinfected state.

For this purpose, external devices may be located in places where the hand cleaning regimen is to be enforced and may continually broadcast state changing commands to any badges that come within range. For example, a transponder may broadcast a "switch to not disinfected state" command constantly or at times when a badge is detected nearby. In response to receiving the command, the badge will switch states and accordingly, update whatever warning signals correspond to a disinfected state may be sent, including switching the LED from green to red, changing a message that is shown on the LCD display, and changing the sound delivered by the speaker. The change in state will strongly encourage the badge owner to wash his hands and test them in order to switch the state back to disinfected.

For example, the manager of a facility may want to enforce the cleanliness regimen at all bathrooms in the facility. External devices such as transponders can be posted at the entrances to all bathrooms (or to clean rooms in the facility, or to operating rooms), causing the badge of every person who enters the bathroom to be switched to a not disinfected state. In order to switch the badge back to disinfected, the user must wash with alcohol and successfully test her finger. The enforced regimen can be managed statically, simply by the placement of the transponders in desired locations that automatically broadcast state-switching commands. In some examples, the control of the regimen could be dynamically altered, if the external devices that cause the switching of the state are in communication with a central controller, for example, through an IP network. In such a system, the central controller could be configured at one time to cause certain selected transponders to flip states of badges and at another time to cause a different set of selected transponders to flip states of badges.

For example, a hospital administrator may wish to enforce the cleaning regimen in one wing of the hospital on one day and in another wing on another day. Or the regimen may be enforced during a night shift but not during a day shift. In some examples, the facility may decide to flip the states of all badges at all locations at one time.

The external devices may include stand alone devices such as transponders that are passive one-way transmitters of commands, do not receive any data in return and are not connected to any other devices. In some examples, the external devices could also have two-way data communications capabilities and/or could be connected to other devices that have additional capabilities. The external devices could be dedicated to functions associated with the badges or could be devices that have other functions for other purposes.

The external devices could include several kinds in one system including transponder, wall-mounted test devices, base stations that would serve multiple transponders, and central stations that would communicate multiple based stations and/or transponders. The communications among transponders, monitors, base stations, and central stations can occur wirelessly or by wired connections and by peer to peer communication or in a client server mode.

In addition to triggering state switches in the badges and communicating data about alcohol tests performed in the badges, the monitoring system can also track the locations and succession of locations of badge holders. In some examples, when badges communicate their identifier information to external devices the information is passed to a base station and/or to a central station. In this way, the central station can be aware of recent locations and the history of locations of all badge holders. The cleanliness state of the badge holders can then be associated with the locations and action can be taken if necessary. For example, if a badge holder repeatedly enters bathrooms in the course of a day but never washes, the administrator of the facility can confront the person directly. More generally, the badge state history of individuals or groups, or all badge holders can be stored and reported, and analyzed.

Studies of selected groups may be performed. For example, a study can focus on the cleanliness habits of surgeons as compared to nurses. For this purpose the party performing the study can control the flipping of states of the badges and record and study information about testing done by the badge holders over time.

The history of which badge holders were in which locations and in what cleanliness states when at those locations may be tracked and analyzed and be used to provide useful information associated with specific events. For example, suppose a patient or other person in a hospital contracts an infection that is normally thought to be transmitted by touching or close proximity. If the patient's room was a location protected, for example, by a state-switching transponder, the history of badge locations could indicate which health care workers were in proximity of the patient during a period considered to be when the infection was transmitted. This could enable identifying individuals who may be carriers of infection for corrective action, for example. Correlation of infections contracted by multiple patients with cleanliness states and locations of badge holders could facilitate identifying a carrier.

To control the operation of the monitor system, each base station and/or each central station can include a graphical user interface, for example, an interface presented in an Internet browser window.

Referring again to FIG. 10, the LCD display 209 can be of a kind that provides a stable display even when unpowered. In such a display, power is required to change the states of the pixels of the display, but once the pixels have reached a stable state, they will remain in that state even after the power has been removed. Such displays are available in as two-state "black and white" devices, and it is expected that gray scale and color LCD panels with the same unpowered stable state feature will soon be available. One advantage of such a display is that the social pressure aspect of the system can be brought to bear even if the user attempts to remove the battery or otherwise disable the device. Such a display also reduces the use of battery power significantly. Other features described here (for example, the use of a lower powered 3.3 volt transceiver and the ability to operate in a standby mode) also contribute to reduced battery load.

The information to be shown on the display could include the name, identifying number, and picture of the user of the badge (based on a stored image), the cleanliness state of the user, the history of the cleanliness state, and the state of the badge and its operation. The displayed information could be controlled by the CPU or in part by the user of the badge, or by the facilities manager.

The communication protocol in some examples is the Zigbee protocol (IEEE 802.15.4) which requires relatively low power, operates at 2.4 Gigahertz, is license-free, and operates at relatively low telemetry rates.

Referring again to FIGS. 6 through 9, the front of the badge includes a sensor access grid 300 in the form of a round configuration of linear slits that allow alcohol vapors to pass into an enclosed sensor chamber 302 formed within the housing. The sensor chamber includes a tubular channel 304 in which the cylindrical outer wall of the alcohol sensor can be held with the end face of the sensor aimed in a direction parallel to the front surface of the badge (rather than aimed in the direction of the sensor access grid). Alcohol vapors can follow the path of arrow 306 into the chamber 302 where it can touch the sensor element face of the sensor. Eventually the incoming vapor can exit at right angles through a vapor exhaust vent 308 on the back half of the housing. The intake grid and the exhaust vent are positioned and oriented so that foreign materials (water or other liquids, for example) that strike the outer faces of the housing cannot easily reach the surface of and contaminate the sensor element. Other features of the housing seal the perimeters of the two halves and the holes through which the on switch, the display, and the LED project.

In some examples, instead of (or in addition to) storing the user's identity information in the EPROM of the badge, the information (and other information about the user) can be derived using RFID technology from an RFID chip 318 that is part of an existing identification badge 316 issued by the facility to the user for other purposes. In these examples, the badge could be extended 314 at one end to accommodate the badge.

The piezo speaker can be used for a wide variety of functions. One function is to provide an audible indication of a cleanliness state of the user. By storing appropriate audio clips in the EPROM and playing them back through the speaker, a happy or upbeat sound could be played briefly when a successful test is completed and an unhappy or grumpy sound could be played when a test has failed. In the case of a failed test, the grumpy sound could be repeated at intervals (say several minutes) and the volume of the sound could be increased and the intervals decreased over time so that the social pressure to wash the hands and conduct a successful test becomes irresistible.

In addition to a display, an LED, and a speaker, the badge could include a vibration element to alert the user when the safe disinfected period is near an end or has ended, for example.

Figure 11:
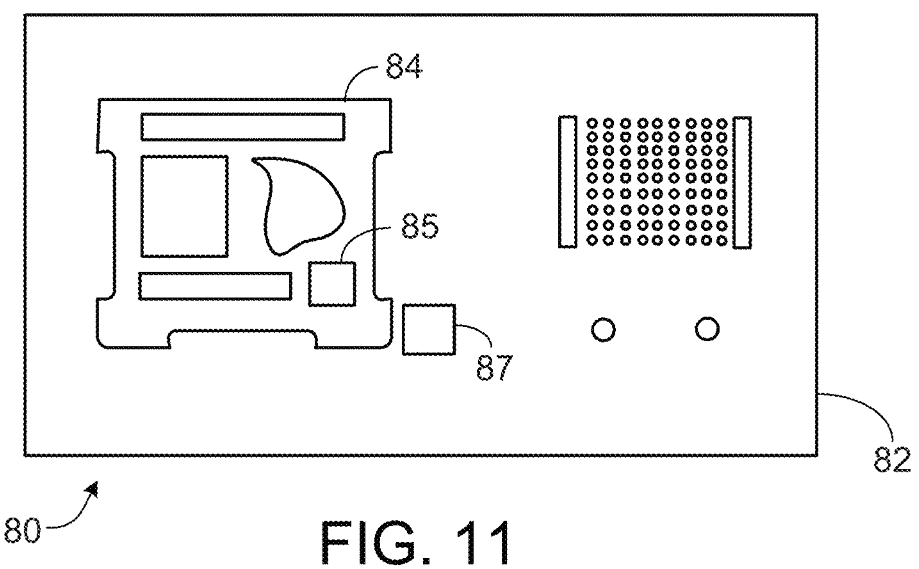
FIG. 11 shows a badge in a badge holder.

Instead of integrating the badge, sensor, and indicators in one unit or providing stand-alone two-piece badge, two-piece badge systems can incorporate already existing badges of the kind used in hospitals, for example, to identify employees. Such badges often include names, photographs, and magnetic stripes or bar codes that can be swiped on readers. As shown in FIG. 11, the device 80 could take the form of a holder 82 in which the existing badge 84 could be held. The device would then contain all of the other elements except those that appear on the badge. Arranging for a separate badge and badge holder has a number of advantages. The badge can be removed and used and swiped independently of the device. The badge can be replaced separately without requiring a replacement of the device electronics. Existing badge equipment and technology can continue to be used. In some examples, the badge could be designed to couple electronically to the holder using, for example, RFID technology with an RFID element 85 in the badge and an RFID transceiver 87 in the holder. When the badge is placed in the holder, the holder recognizes the identification of the user and other information.

In some examples, the badge, the holder, and the RFID transceiver 87 could be arranged differently. For example, the RFID transceiver could be located on a different device worn by the user while the badge could remain mounted on the holder.

As discussed above, in some examples, not all of the circuitry need be mounted in a single badge. Some of the circuitry could be located in a different piece of equipment. For example, a sensor used in common by many people may be mounted on a wall and convey (say by wireless communication) the measured concentration of ethanol to the badge, which would then determine the state and indicate that state through lights and on the LCD. By separating the two, the badge could be lower cost, the sensor could be more complex and accurate, and the sensor could be located at places where the disinfectant solution is dispensed. Fewer sensors would be needed.

Figure 12:
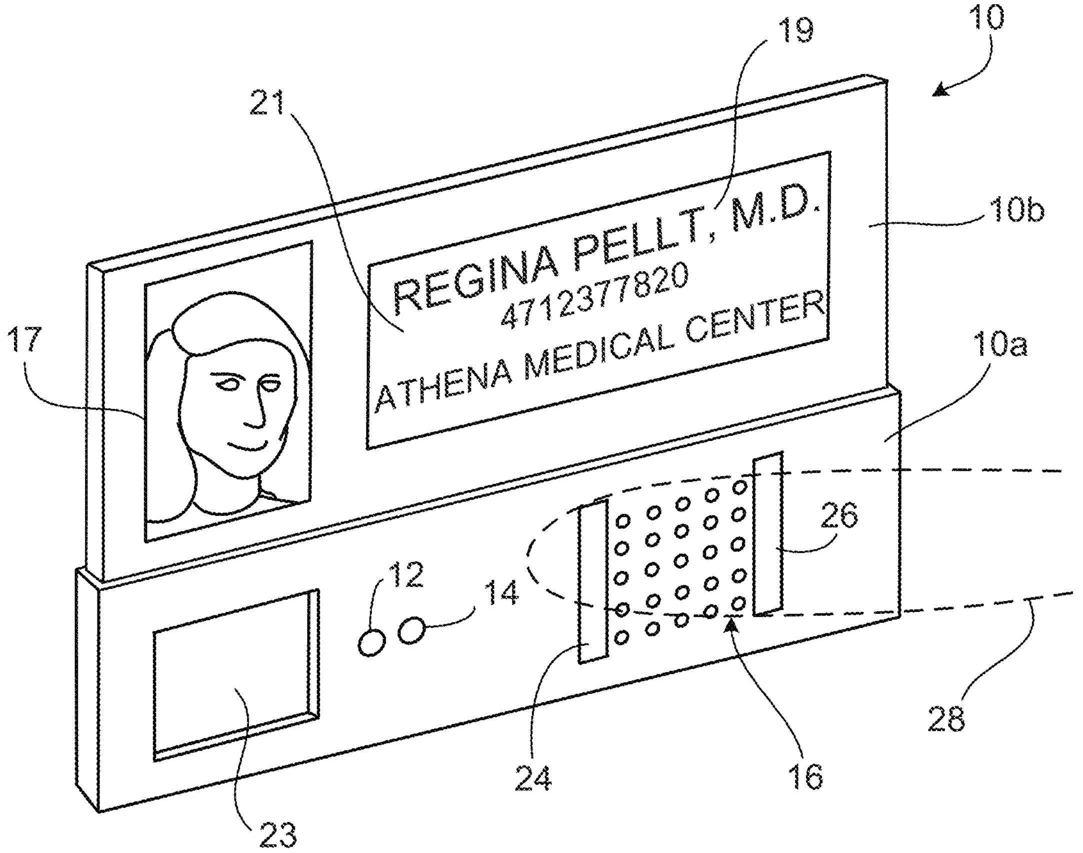
FIG. 12 shows a perspective view of a two piece badge.
Figure 13:
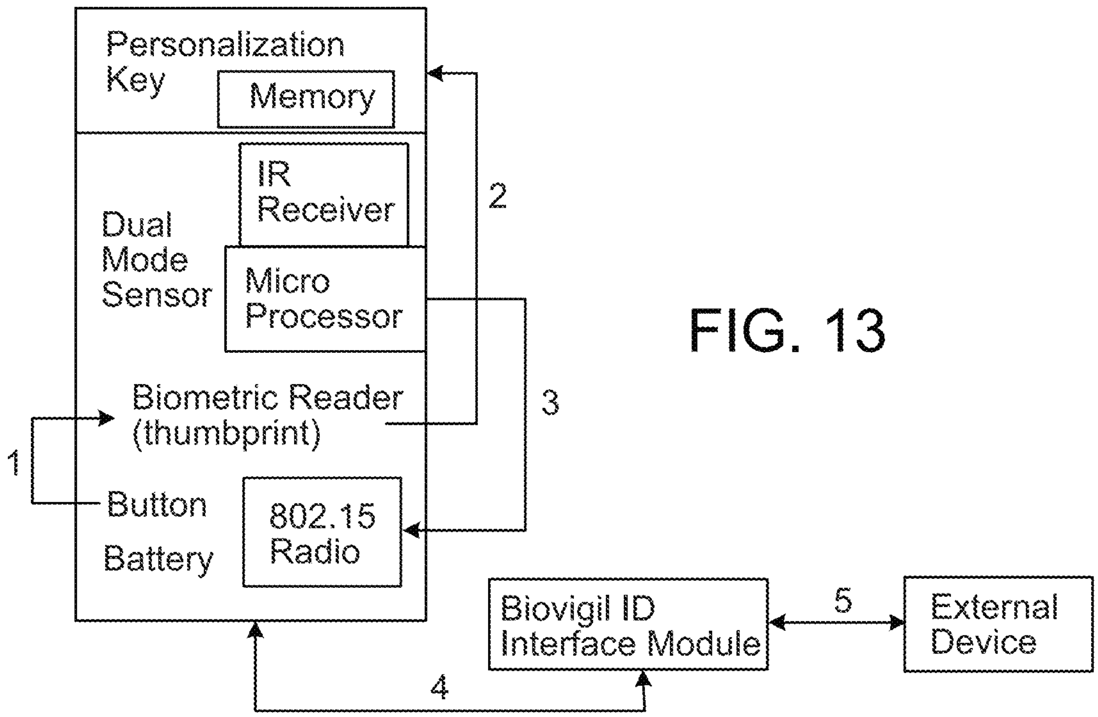
FIG. 13 is a schematic diagram of a two piece badge.
Figure 14:
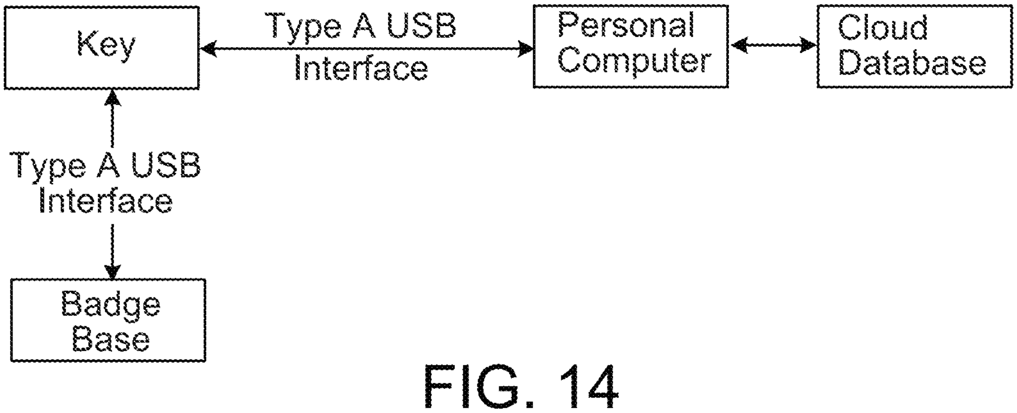
FIG. 14 is a schematic diagram of a badge connected to a monitoring network.

FIGS. 12-14 illustrate components of a two-piece badge system. As shown in FIGS. 12 and 13, the badge 10 can include a base portion 10*a* and a worker specific, personal portion 10*b*. When separated from the personal portion 10*b*, the base portion 10*a* is a generic device (i.e., not associated with a specific worker). The base portion 10*a* can include the various components and circuitry that detect disinfection, such as the cleaning agent sensor, biometric sensor, battery, microprocessor, radio controller, power button, and indication lights. The base portion includes a communication connection feature that is configured to communicate with the personal portion. The communication can use any various connection techniques that can suitably transfer information between the base portion and the personal portion. In some examples, the communication connection is a wired connection (e.g., using a USB other mechanical plug interface) or a wireless connection (e.g., IR, RFID, or 802.15 radio). When not in use, base portions 10*a* can be stored in a charging station. A workers can activate a badge by pairing his or her own personal portion with a base portion (e.g., at the start of a shift) or the workers can switch base portions, for example, if the base portion in use runs low on power.

The personal portion includes the identification information for the worker including, for example, visual information such as a photograph, a printed name, a barcode, or other identification information that should be displayed. Additionally, the personal portion can include a memory device that contains configuration variables, sound files, or personal information about the worker, such as, for example, name, ID number, security information, hand cleanliness history information, and other information specific to the worker. The personal portion also includes a communication device feature that connects with the communication device feature of the base portion. When the communication devices are connected, information can be transferred between the base portion and the personal portion.

For example, with the base portion and the personal portion in communication, a worker can detect disinfection using the sensor on the base portion, and the base portion can associate sensor test results with the worker using the badge. The base portion can also provide hand cleanliness data history to the personal portion where it can be stored (e.g., in the memory device, such as read only memory "ROM" device) for future consideration. Additionally, electrical power can be provided by the base portion via the communication connection.

The biometric sensor (e.g., a thumbprint reader) can be used to verify and validate that the user has the correct badge (e.g., the correct badge personal portion). For example, referring to FIG. 13, a user (e.g., the worker) initiates identification validation by pressing a button on the badge or an identification verification sequence can be initiated automatically when the worker comes in proximity to an external device (e.g., a base unit on a central ward station). The worker places her thumb on the thumbprint reader and the badge base portion reads the thumbprint and compares it to data stored on the badge personal portion. If the read thumbprint and the stored data sufficiently match, the badge is considered validated. If the badge meets validation criteria, the radio is scheduled to communicate to broadcast identification data and a record of the validation event is stored on the badge. The radio establishes communication with an interface module. If validation information is then accepted by the interface module, the interface module provides go/no-go signal to the external device. The badges can be programmed so that the validation automatically expires after a period of time or when the badge is moved to a certain area (e.g., outside of the hospital) so that the badge would need to be re-validated prior to continued use.

In addition to using biometric data to monitor hand cleanliness, the badge can be used to verify identity of the worker carrying the badge for other reasons. For example, if the worker attempts to use his or her badge to gain access to a secured area, such as a room that contains confidential information or regulated substances, the biometric sensor can be used to verify that the worker trying to use the badge to gain access is the correct worker. In some cases, a worker's thumbprint is read by a thumbprint reader and the reading is compared to information stored in the memory of the personal portion. If the reading matches what is it expected, the badge may permit sending a signal to an interface unit controlling a lock that limits access to the area the worker is trying to enter or access. However, if the thumbprint reader detects a thumbprint that does not match the expected thumbprint that is stored in the personal portion, the badge will not send signal to the interface unit.

In addition to refusing access to the area, the base portion may send a signal (e.g., including the biometric data of the worker fraudulently trying to access the secured area) to a system that contains and/or tracks biometric information for all workers. The system may them search to determine which other worker is fraudulently using the badge personal portion of another worker.

FIG. 14 shows the base portion and the personal portion of a two piece badge communicating with one another, and also with a computer system and cloud database for storing system information. As shown, when the personal portion is attached to personal computer, the personal portion schedules a user interface that allows a worker to program individual options such as volume, reminder tones, and other parameters that affect badge behavior. Other information, such as the personal information and biometric data can be programmed using the personal computer. Data generated by system usage resides on the badge base and is periodically offloaded to network.

Figure 15:
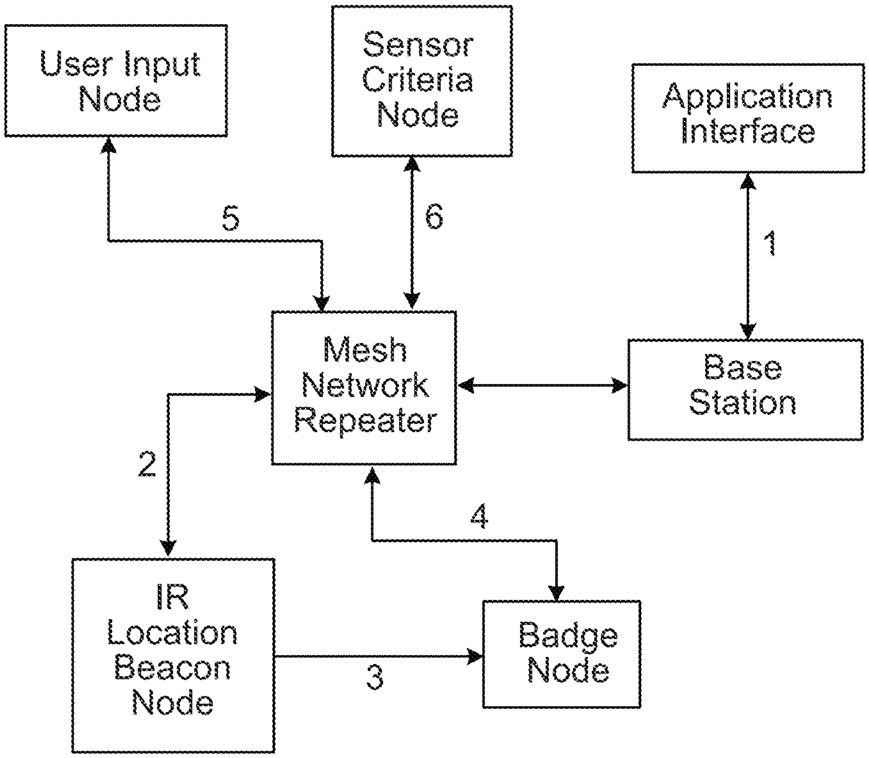
FIG. 15 is a schematic diagram of a monitoring network.

The badges could also be connected to a network to allow more in depth monitoring of the hand cleanliness of workers within a workspace. FIG. 15 shows an example network node architecture for tracking badges within a work area. An application interface can push information (e.g., administrative configuration parameter data) to the network and receives data from the network. Location beacons, such as wall mounted transmitters and receivers (e.g., IR location beacons) that can communicate with the badges periodically check in with a base station to receive parameter updates and report health status of a worker carrying a badge. The badge can receive information from the IR location beacons. Such information may be used to determine the appropriate hygiene protocol for the current location, to provide calibration parameters for the onboard sensors, and to establish the amount of time badge is in proximity to the beacon. The IR location beacon may also trigger the badge to check in with base station for transferring special messages. Special messages can be anything that is relevant to the badge and or user, typically but not necessarily associated with a location. For example, the badge could receive a "special message" for the user containing a pager message sent to the individual (displayed on the badge), a message from a nearby sink telling the badge that it recently saw a sink handwash event, or a message from the room that warns the badge wearer that there is something special about that room (e.g. high risk patient, existing infection, etc.). The badge can also directly or indirectly communicate with the base station to transmit data (e.g., offload data, report health, or send and/or receive special messages.

A special purpose input node (e.g., a wall mounted transmitter and receiver) can be accessed by workers in the environment to provide input information to the network. For example, an input node located outside of each room could allow a worker to set the room's context code (e.g., 1=a normal room, 2=a contaminated room, 3=a room in which hand washing is required, etc.). When activated by a worker, the input node contacts the base station to provide setting updates. Information can then be passed to a location beacon. Special purpose criteria sensor nodes can contact the base station to provide status updates when the special purpose criteria sensor nodes detect a relevant event (e.g., a signal input that consistent with a sink hand washing event). When a badge contacts the base station, the badge receives special messages from the special purpose criteria sensor nodes and interprets that message in accordance with its programmed state logic.

Figure 16:
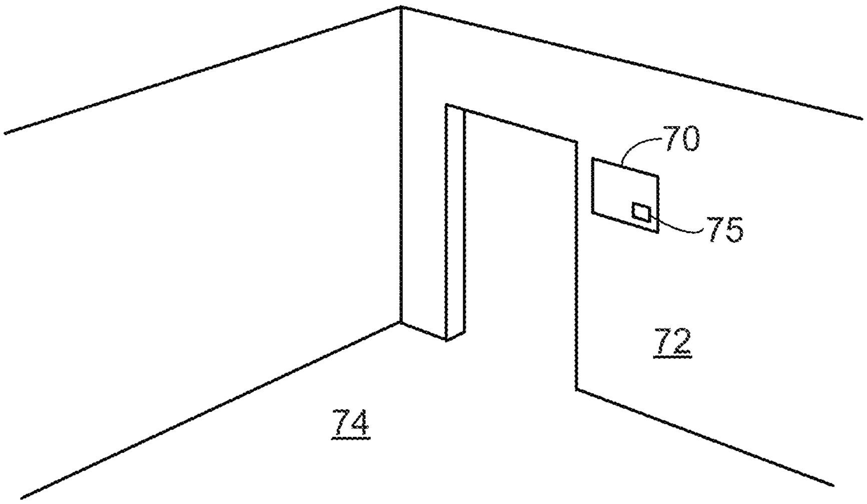
FIG. 16 is a three-dimensional view of a space.

FIG. 16 shows an exemplary monitor 70 mounted on a wall 72 of a space 74, such as a bathroom. The monitor could contain a radio frequency transceiver 75 that would cooperate with radio frequency identification (RFID) elements contained in badges of users. Using RFID technology, when a person wearing a badge passes near to the monitor, the monitor could use RF communication to determine that the person is present and to fetch information from the badge about the person's identity (and other information as discussed later). The monitor could also send an instruction to the badge to cause the badge to reset itself to the not disinfected state. Communication technologies other than RFID could also be used to detect the presence of the user and to communicate information between the monitor and the badge or other elements worn by the user. The element worn by the user could be one that identifies the user or one that does not identify the user.

When the person wearing the badge enters the bathroom, or any other monitored space such as a patient room, or a surgical theater, the triggering device sends a signal to the badge that causes the badge to enter the not disinfected state and light the lamp that indicates that state. This triggering will encourage the user to disinfect his hands before leaving the bathroom or before proceeding further into the monitored space in order to avoid the social disapproval associated with leaving the bathroom with the red light on. In these examples, the badge's state could be forced to change to the not disinfected state regardless of how much time has passed since the most recent successful test using the badge sensor. The user's status can be reset to the disinfected state by the user cleaning his hands and testing them.

Figure 17:
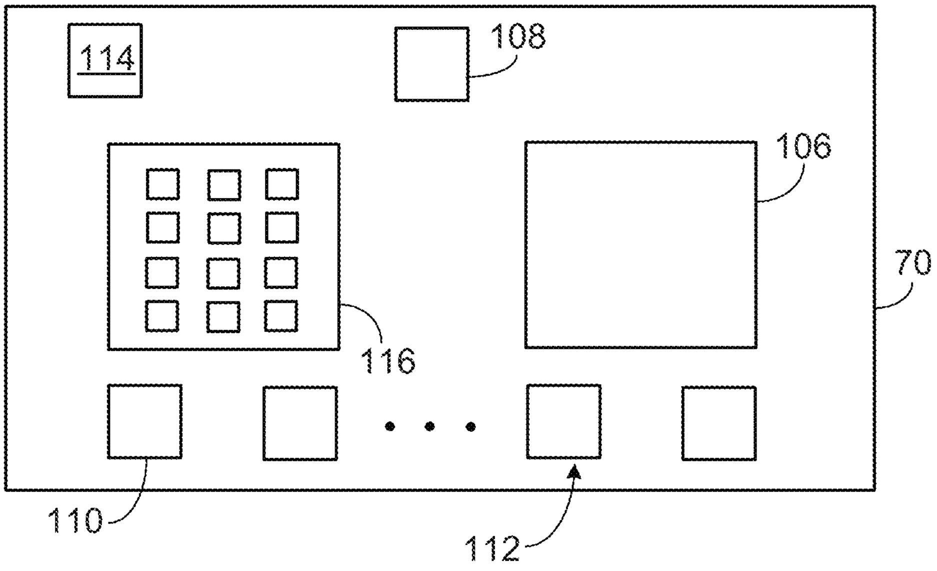
FIG. 17 shows a monitor.

As shown in FIG. 17, a hand cleanliness monitor 70 could include not only an ethanol or other sensor 106 but also a presence detector 108 and one or more indicators 110 of hand cleanliness with respect to one or more people who have entered the space. One of the indicators 112, which could be broadly visible to people in the space (for example, if it is placed on an interior wall of a room) or people outside the space (for example, if it is placed on an interior wall of a room) or both, could turn from green (indicating that all people in the space are believed to have disinfected hands) to red when a person is detected as entering the space. In that case, the red light would indicate to viewers that a person whose hand cleanliness state is unknown and assumed to be not disinfected has entered the space.

The person entering the room could cause the light to turn from red back to green by touching the sensor (assuming his hands bear enough ethanol to imply a disinfected condition) or by first cleaning his hands and then touching the sensor.

In some examples, the monitor could be placed on in interior wall of a patient's room. Whenever anyone enters the room, including health care workers, the patient, or guests, the monitor would indicate a possibly not disinfected condition until someone touches the sensor and causes the red light to turn green. Social pressure of people in the room, who would observe the red light would help to enforce good cleanliness habits on every person entering the room.

The parts of the monitor need not be included in a single integrated wall unit. For example, a portion of the monitor that detects that a person has entered or left a space could be a separate system, including an existing system, that would exchange the information with the monitor as needed. The indicators could also be located separately from the monitor to make the lights visible to many people even though the monitor is located near an entrance to or exit from a monitored space. The sensor, too, could be located separately from the monitor. For example, the badge sensors could provide the re-test information to the monitor.

In some examples, an entire building could be monitored by providing monitors on the walls at all entrances to the building. In addition to the social pressure associated with public display of the not disinfected condition, an employee or automated gate at each entrance could require that the person entering either prove that his hands are disinfected by using the sensor either upon entry or after using a disinfectant available at the entrance.

A variety of spaces could be monitored, including bathrooms (or other locations where disinfecting is especially important) and changing areas in hospitals or food processing facilities, for example.

In some examples, the monitor could include circuitry that would detect, in other ways than described above) a presence of one or more people within a space (whether or not the people have entered or left the space), would determine a cleanliness state of hands of the people detected as present, would include circuitry to report the cleanliness state.

A publicly viewable monitor used to indicate the disinfected condition for people within a space can facilitate social pressure being applied by people in a room to people who enter the room even without the monitor having any information about the identity of a person entering the room. In addition, the monitor may include or be part of a system that includes devices to determine who has entered a space and to correlate that information with a person who then uses the sensor to indicate that his hands have been disinfected.

For example, the person entering the room may carry a badge (of the kind issued by a health care facility) that uniquely identifies him and includes a bar code, a magnetic stripe, an RFID element, or another device that can be read by a reader 114 (for example, the RF transceiver 75 in FIG. 16) that is on the monitor or mounted separately on the wall. Depending on the technology, the user's badge could be read from a distance or be swiped on a reader. When the person enters the room, his presence and identity are detected. At the time when he successfully completes a measurement by the sensor indicating that his hands have been disinfected, his identity is read again and compared with the identities of people who have entered the room and not been determined to have passed a measurement for disinfected hands. Only when all of the people who have entered the room have passed the test will the red light be switched to green.

An enterprise could issue temporary identification cards to every person who enters a building or other space and does not already have an identification badge for use with the system.

A variety of other techniques could be used to identify the person entering a space, including detection of biometric information (such as a voice print or a finger print or a facial print) or requiring a person to enter an identification code on a keypad 116 on the monitor. The person could enter the identification both upon entering the room (in some cases as a trigger for a locked door or other entry gate) and upon passing a disinfection test using the monitor. In some implementations, it may be possible to identify a person using a fingerprint detection technique at the same location on the monitor and at the same time as the disinfection test is performed. Other techniques could also be used to assure that a successful test is accurately correlated to an identifiable person.

The monitor can also include circuitry that keeps track of how many people are in the space (for example, by also detecting when someone has left the space). When the oldest successful disinfection test (among tests that number as many as there are people still in the room) occurred more than a predetermined period (say 2 hours) earlier, the monitor can time out and change the green light to red until someone in the room successfully tests his hands again.

In these examples, and others, it is possible for people to deceive the monitor, for example, by having one person in the room repeatedly test his hands positively on behalf of other people in the room. However, as indicated earlier, at least in some examples, the social pressure associated with the public display of the disinfection state of the space and the shifting of green to red in certain situations, may be sufficient to significantly improve the frequency and quality of hand cleaning among people in the space.

Other arrangements could be used to reduce the degree and nature of the deception that may be possible and to increase the ability of a monitoring system to track and report the performance of identified people or groups of people in maintaining hand cleanliness. Some such arrangements would use the unique identifiers associated with different people to track their performance.

For example, the wall monitor could include a processor and software to track individuals who enter and leave a room based on their unique identifiers and correlate the identities with tests that are performed successfully. The monitor could then control the red light and green light based on the successful testing of hand cleanliness by each individual in the space at least as often as some pre-specified time period (say every two hours). By including a small display 120 on the face of the monitor, the person whose hand cleanliness requires re-testing can be identified by name or identifier or some other indicator. In this way, each of the people in the space can be alerted from time to time of the need to re-clean, and re-test and everyone in the space can know who needs to do so.

Such a monitor could be used in conjunction and cooperation with worn badges, for example, of the kind discussed earlier. For example, using RFID or wireless or other kinds of communication capability in the monitor and at least some badges, the monitor and the badge could communicate, exchange information, control actions, and make reports, all in a wide variety of ways.

In a simple example, the monitor could cause the light on a badge to switch from red to green at the same time (or different times) as the lights are switched on the monitor, to indicate to others in the space which person in the space needs to re-clean and re-test. A successful test performed on the badge can be reported to the monitor for use, for example, in the same way that a test on the monitor would be used. Conversely, the monitor can report to a badge a successful (or unsuccessful test) performed on the monitor by the owner of the badge. More generally, the badges and monitors in one or more spaces can continually be synchronized to store common information about tests by the owner of the badge and to cause common indications of the cleanliness state of the badge owner to be given by both the monitor and the badge.

As a person moves around in a building that has more than one monitored space, the monitors and the badges will together in that way maintain current information and provide current indications of the cleanliness state of the badge owner.

Figure 18:
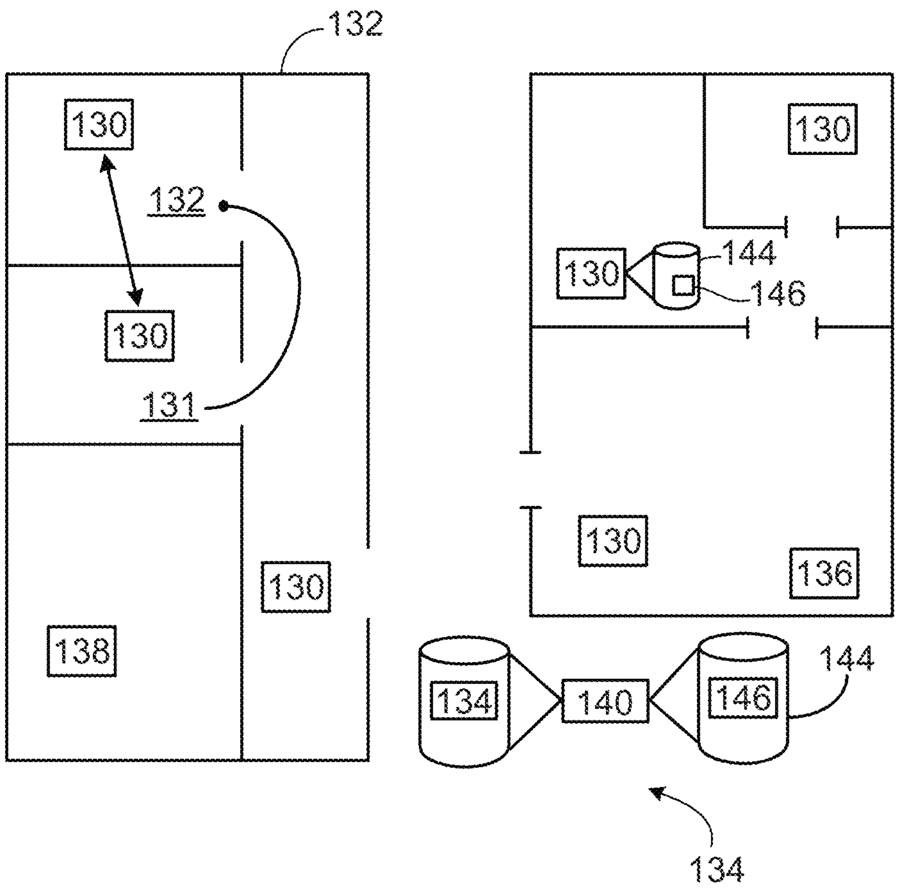
FIG. 18 is a schematic view of a campus of buildings.

As shown in FIG. 18, although this co-operative maintenance of information and reporting can be done informally and by ad hoc action of different pairs of badges and monitors over time through a building, additional functions and better performance may be achieved by arranging for a portion or all of the monitors 130 in a building 132 or campus of buildings 134 to be interconnected by a wired or wireless communication network on a peer-to-peer basis or with the co-operation or control of a central server 136 or a distributed set of central servers 136, 138, 140. The central server or servers may be servers already used for a facility to provide communication and manage the control of other kinds of devices scattered throughout the facility or the reporting of information from other kinds of devices.

The monitors, the badges, and/or the central server or servers may include memory or mass storage 144 that contains a database 146 or other organized information about the permanently or temporarily registered people who have access to a building or space. The database can store information that is associated with individuals and information that is statistically related to groups and subgroups of the individuals.

In some implementations, an individual badge can maintain a small database of information about a complete history of an individual's cleanliness testing beginning at the time when the badge was first issued, or at some later time. Or a rolling set of data ending at the current time may be kept. The data may catalog every instance when the user tested the cleanliness of his hands, the result, the time of the test, and the parameter values that were produced by the sensor in the testing. When the badge is able to communicate with monitors in different spaces or subspaces, the badge database may also track the places in which each of the tests was performed, which other people were present in the space when the tests were performed, and other information. Information in the badge database can be uploaded to one or more monitors using the communication links to the monitors, or may be uploaded from the badges directly to a central server using special badge readers located in one or more places in the facility.

Each monitor can maintain a database of information using information from badges of people with whom the monitor has interacted and information from other monitors in other spaces (for example, contiguous spaces). The database of a monitor could track every time a person has entered a monitored space and every time she has left the space. The data could include the time of entry, the time of exit, the space in which the user was most recently monitored, the time between entry into the space and when a re-test was performed, the results of the re-test, the number of re-tests performed in the room, the identities of other people in the room at the time of re-test, and a wide variety of other information.

If a person leaves a monitored space 131 and enters a monitored space 132, the monitors in the two spaces could be arranged to communicate so that the monitor in space 132 need not require a re-test if a re-test had been done in space 131 within a pre-specified earlier period.

When the monitors and/or badges are networked with a central server, the central server can use information provided from the monitors and/or badges to track the overall cleanliness testing activity of all of the monitored people in all spaces that are networked.

The central server could maintain a database 134 that could include detailed historical information and statistical summaries of information. The information could track every time any of the monitored people enters or leaves a monitored space, the number of times and the times at which re-testing has been done, the results of each re-test, the routes of the people moving through the building or campus, whether the people are wearing their badges, whether they used their badges or the wall monitors to re-test cleanliness, and a wide variety of other information.

The central server can use software 140 running on the server or servers to analyze information stored in the central database or the databases of one or more of the badges or the monitors. The analyses can address the performance of different groups on cleanliness, the correlation of cleanliness to location, the correlation of demographics (age, gender, geographic location) with cleanliness, the impact of training, monitoring, and other actions on the cleanliness performance, and time dependent changes by individuals, groups, and subgroups of cleanliness performance.

In addition to monitoring and analyzing information about cleanliness performance the central service can provide reports that are useful to or required by the party that operates the building or campus, other institutions, liability carriers, and governmental bodies that regulate certain aspects of the performance of the party and the individuals employed by the party. For example, governmental agencies may require hospitals to assure that hospital employees are disinfecting their hands more often than a certain number of times a day and to report failures to meet that requirement. Reports may also be given to individuals being monitored to groups of individuals, to their supervisors, and to others. Reporting to individuals can be done by email. For example, a doctor who is not disinfecting his hands often enough would periodically be sent an automatic email urging him to improve his cleanliness practices.

The physical housing used for the monitor could be much smaller than the badge shown in earlier examples and could be used in other environments. For example, a badge in the form of a ring could be used for a nanny. At the end of the day, when the parents of the nanny's charge return home, the ring would immediately indicate whether the nanny had washed her hands at least every two hours during the day. In another example, the printed circuit board used to implement a badge can be a stacked printed circuit board to provide a more compact form.

Figure 19A:
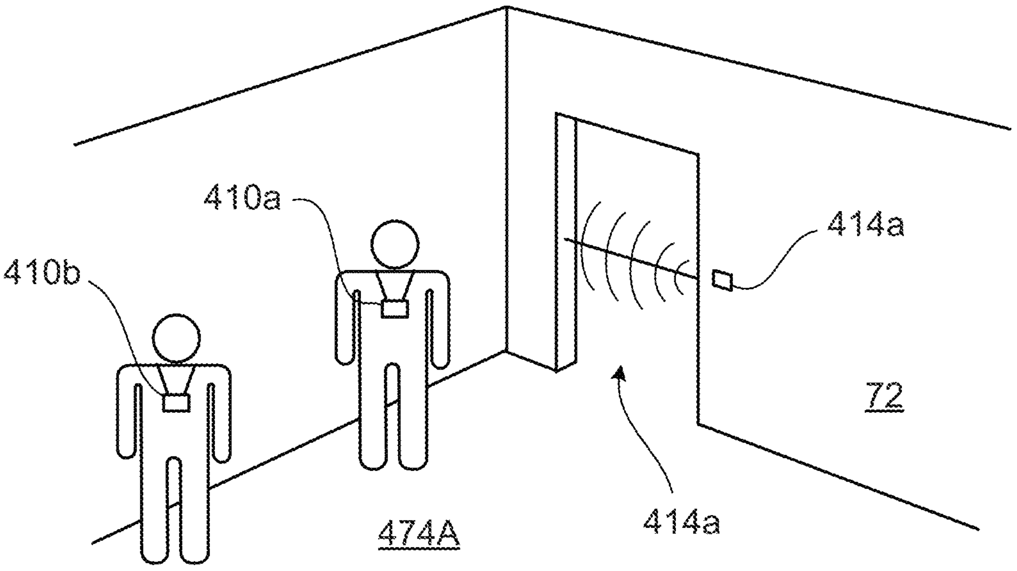
FIGS. 19A and 19B are schematic views of a cleanliness monitoring system.
Figure 19B:
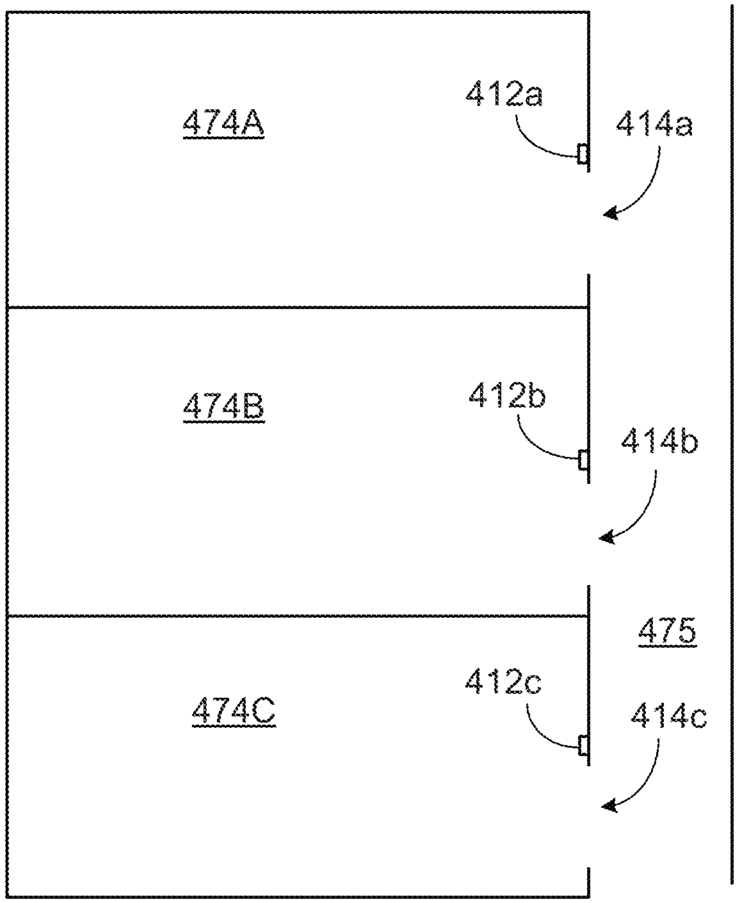

In some implementations as illustrated in FIGS. 19A and 19B, a system 400 including badges 410 and monitors 412 can be configured to prompt individuals (e.g., health-care providers) to sanitize their hands both on entering and exiting a specific space (e.g., a patient's room).

The monitors 412 can be located near doorways 414 or other thresholds (between spaces) to be monitored. In response to motion in a doorway 414, the monitor 412 placed near that doorway 414 sends a signal including information identifying the transmitting monitor 412. The monitors 412 are positioned inside the room adjacent to the doorway so that the signal is primarily within the room and is strongest near the doorway 414.

As is discussed in more detail below, each monitor 412 is configured and placed to preferentially interact with badges near the doorway within the room where the monitor 412 is mounted. As part of this configuration, the transmission power levels of the transceiver 464 can be controlled by a PLC chip of the monitor 412. For example, it has been found that monitors 412 mounted about 3-5 feet above the ground with transceivers transmitting at a power level of less than about 1 milliwatts produce a signal of sufficient strength to trigger most or all badges 410 within about 3 feet of the doorway where the monitor 412 is mounted while having sufficient signal loss to have low or no signal transmission outside the room where the monitor is mounted and to have sufficient signal loss that relative signal strength can be used as an indicator of when a badge 410 is passing though the doorway being monitored. In some instances, the monitors can be mounted above the doorway.

In some embodiments, the signal strength can be increased or decreased in order to account for factors such as, for example, larger room or boundary dimensions. For example, the PLC chip can be programmed to actuate the transceiver to transmit with a signal strength of between about 0.25 and 5 milliwatts (e.g., about 0.5 milliwatts, about 0.75 milliwatts, about 1.5 milliwatts, about 2.5 milliwatts).

In the illustrated embodiment, the transceiver transmits on a wavelength of about 2.4 GHz.

Figure 20A:
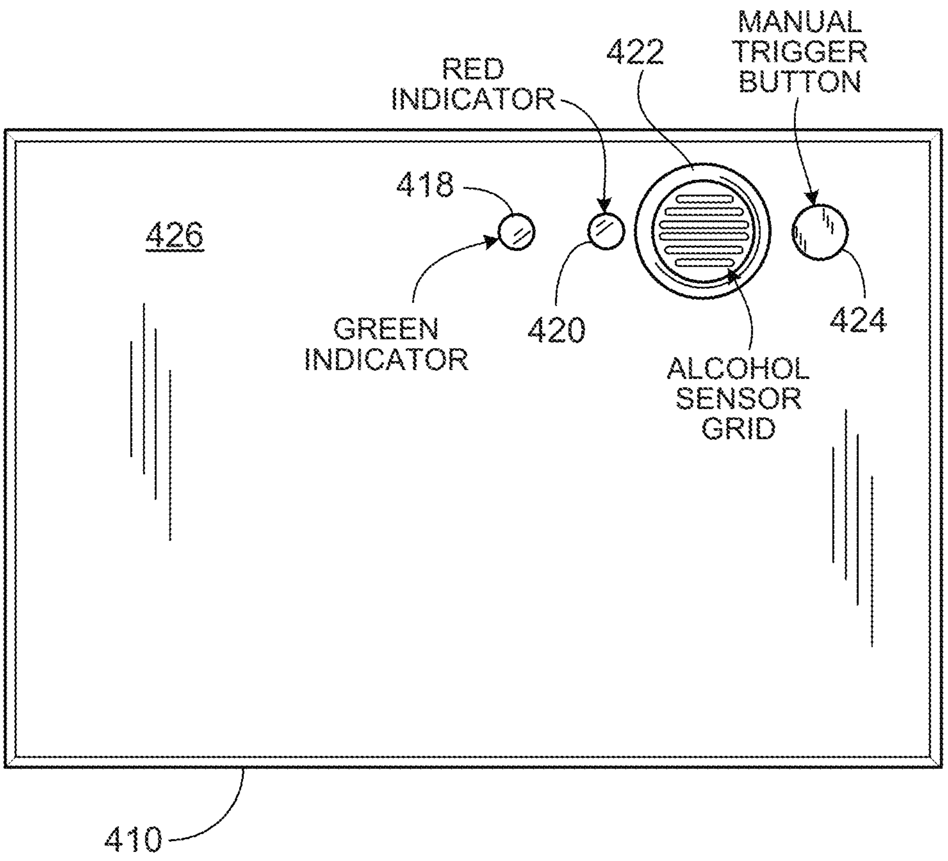
FIGS. 20A through 20C show a front view of a badge, a front view of a badge board, and an enlarged view of a badge board, respectively.
Figure 20B:
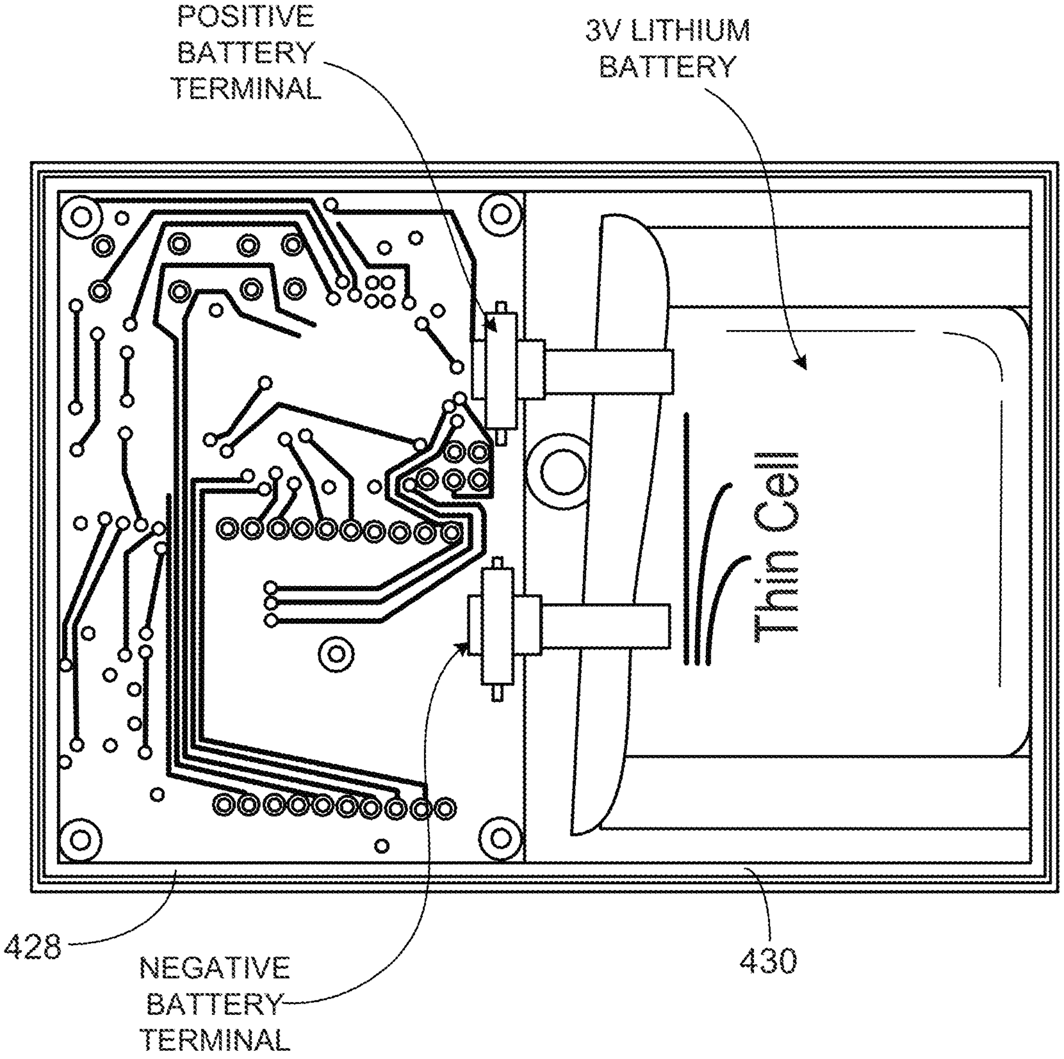
Figure 20C:
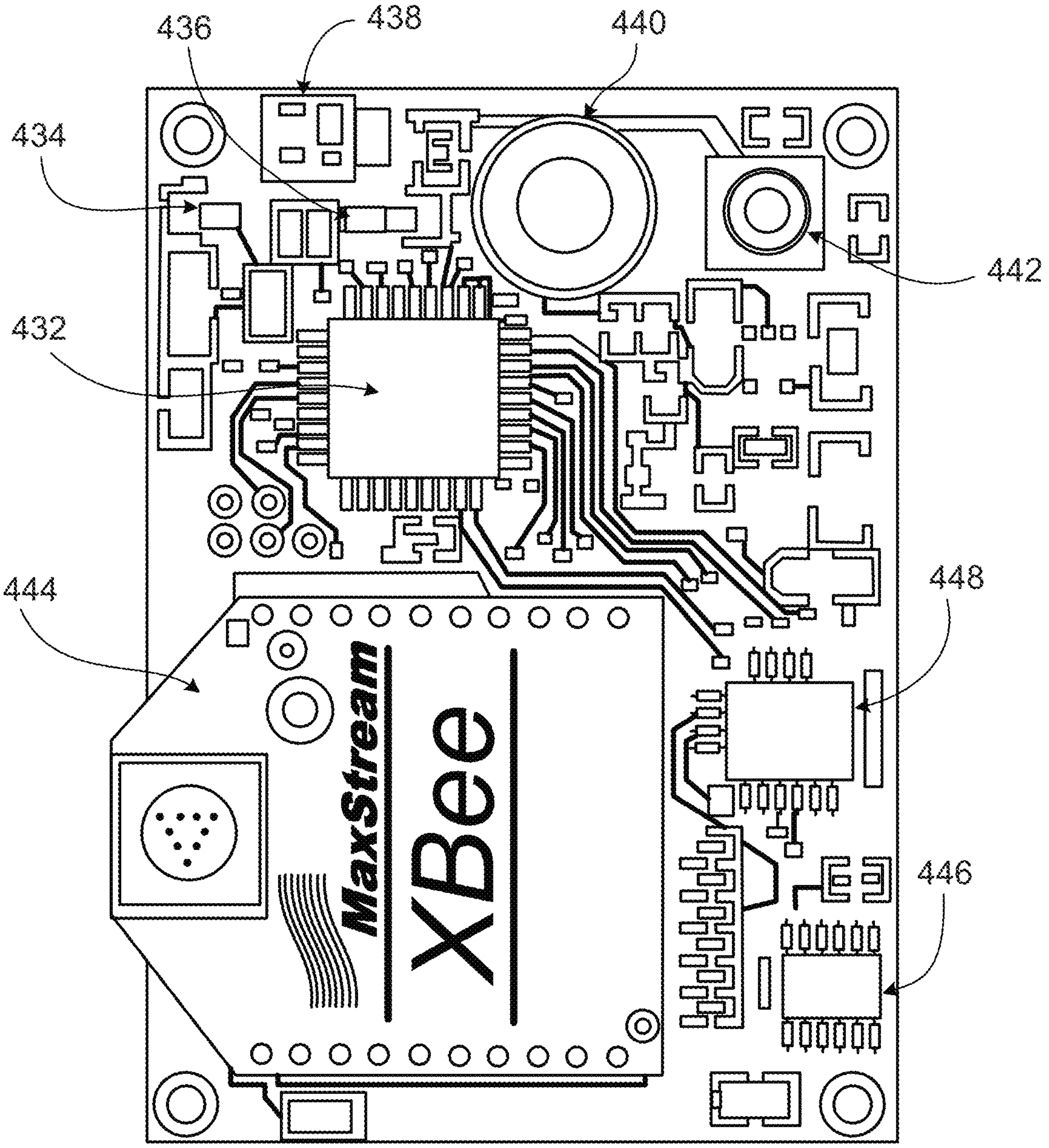

As shown in FIG. 20A, an exemplary badge 410 can include a green indicator 418, a red indicator 420, an alcohol sensor grid 422, and a manual triggering button 424 on its outer casing 426. As shown in FIGS. 20B and 20C, the badge 410 can include a badge board 428 powered by a battery 430 (e.g., a 3V lithium battery), both held within the outer casing 426. The badge board 428 includes a programmable logic controller (PLC) chip 432 coupled to a green LED 434, a red LED 436, a speaker 438, an alcohol sensor 440, and a transponder 444 which function in substantially similar fashion to the corresponding elements of the previously described badge 200. The badge 410 also includes a manual triggering switch 442, a real-time clock 446, and an accelerometer 448 coupled to the PLC chip 432. The manual triggering switch 442 is used to manually trigger a test cycle is as described in more detail below. The real-time clock 446 is used to establish the time at which various log events such as, for example, test cycles occur.

The PLC chip 432 is configured to implement a state-control logic to encourage users to follow proper sanitation protocols. For example, the state-control logic can be configured to activate a hand sanitation check both on entry to and exit from a monitored room. An exemplary state-control logic is described in more detail below.

The badge can have a sanitized state indicated by activation of the green LED 434 and an un-sanitized state indicated by activation of the red LED 436. When the badge is initially activated, the PLC chip 432 sets the badge 410 in its un-sanitized state. When the badge 410 is in an un-sanitized state, the PLC chip 432 activates the red LED 436 and shuts down other components including, for example, the alcohol sensor 440. Pressing the manual triggering button 442 can trigger a cleanliness test cycle. After a successful cleanliness check is performed, the PLC chip 432 sets the badge 410 in its sanitized state. When the badge 410 is in its sanitized state, badge components including the alcohol sensor 440 and the red LED 436 are turned off, the PLC chip 432 is in a listening mode, and the green LED 434 is turned on.

In the embodiment described above, the PLC chip 432 uses the transponder 444 to broadcast its badge identification signal upon receipt of a location signal from a monitor 412. In some embodiments, badges 410 are configured to continually broadcast their badge identification signals or are configured to broadcast their badge identification signals at preset intervals as well as upon receipt of the location signal from a monitor 412.

The battery 430 powering the badge 410 can be a disposable battery or a rechargeable battery. In the illustrated embodiment, the battery 430 is disposable battery. In some embodiments, the badge 410 can be stored in a charger when not in use to recharge the battery 430. In some embodiments, the badge 410 includes photovoltaic cells instead of or in addition to the battery 430. For example, the badge 410 can be configured to operate using photovoltaic cells for power when sufficient ambient light is available and the battery 430 as a supplementary or replacement power source when the photovoltaic cells do not provide enough power.

The accelerometer 448 (e.g., a three-axis accelerometer such the MMA7260Q Three Axis Low-g Micromachined Accelerometer commercially available from Freescale Semiconductor of Chandler, Arizona) sends a signal to the PLC chip 432 indicating whether the badge 410 is in motion. The PLC chip 432 can be programmed to shut down the badge components after a set period of time (e.g., 10 minutes, 20 minutes, 30 minutes, or 60 minutes,) passes without the accelerometer 448 indicating that the badge 410 is in motion. For example, if the badge 410 is stored in a physician's desk when she leaves the hospital, the badge 410 will shut down to conserve the battery 430 after the set period of time passes.

Figure 21:
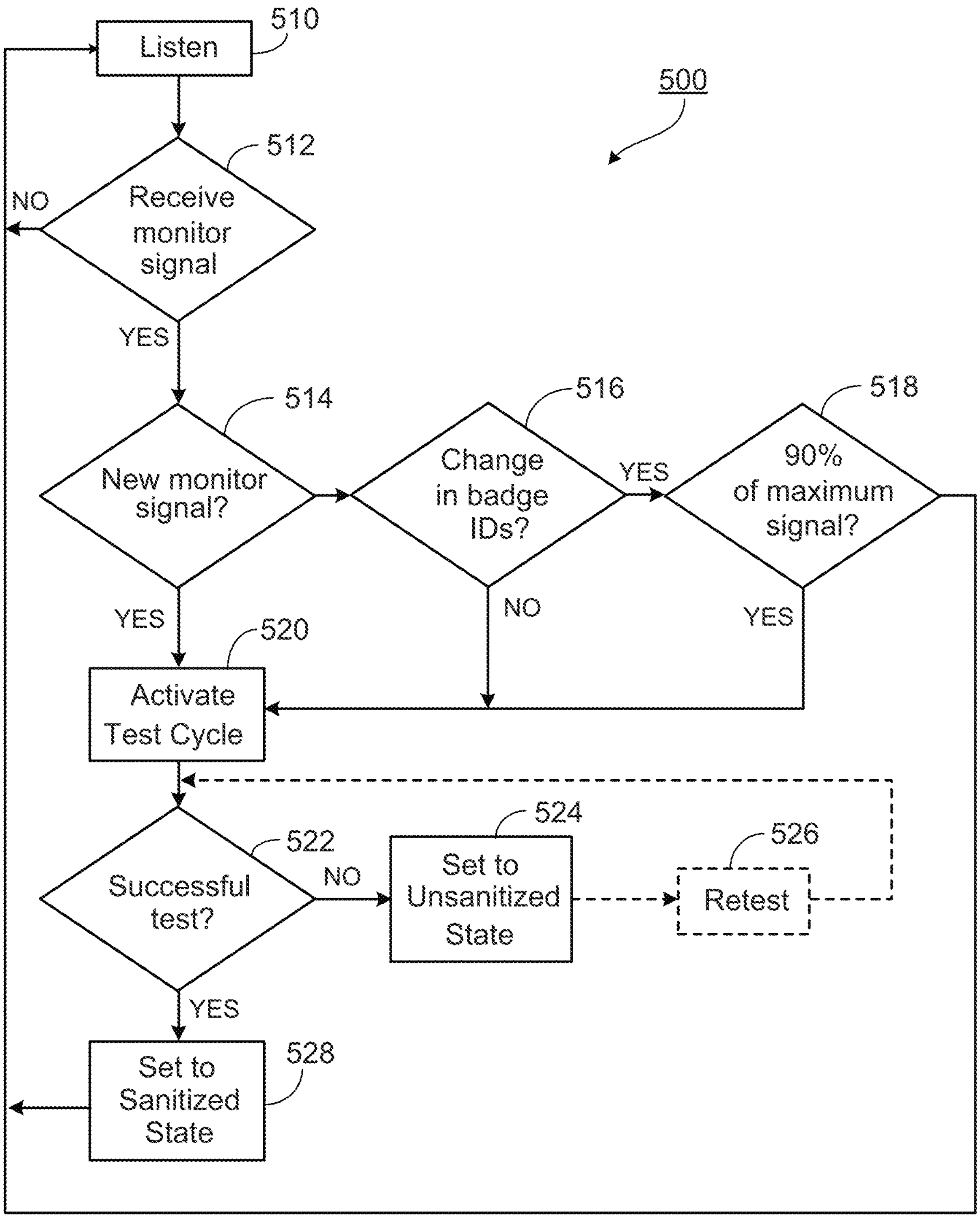
FIG. 21 is a schematic of badge logic.

FIG. 21 illustrates an exemplary state-control logic that can be implemented on PLC chips 432 of the badges 410 used as part of the system 400 illustrated in FIGS. 19A and 19B. FIG. 19B shows a system 400 with monitors 412*a*, 412*b*, 412*b* installed in patient rooms 474*a*, 474*b*, 474*c* near doorways 414*a*, 414*b*, 414*c* from hallway 475.

The badges 410 can be activated, for example, when a badge 410 is removed from a charger where it is being stored, when an accelerometer on a "hibernating" badge 410 indicates that the badge once again being moved, or when a user manually activates a badge 410. When the badge 410 in the illustrated embodiment is initially activated, the PLC chip sets the badge 410 in an un-sanitized state and a user presses the manual triggering button to start a cleanliness test cycle. In some embodiments, the PLC chip automatically starts a testing cycle when a badge 410 is activated.

Upon starting the cleanliness check cycle, the PLC chip 432 activates the alcohol sensor 440 and, while the alcohol sensor 440 is warming up, activates visual or audible indicators to indicate that the badge 410 is in a pre-test state. For example, the PLC chip 432 can turn the green and red LEDs 434, 436 on and off in an alternating sequence to indicate the badge is in a pre-test state. After the alcohol sensor 440 is ready to perform a test, the PLC chip 432 activates visual or audible indicators (e.g., turns the red LED 436 steadily on in an alternating sequence) to indicate that the user can perform a cleanliness check. In some embodiments, the PLC chip 432 sets the badge 410 in testing mode after a set period of time. In some embodiments, the PLC chip 432 monitors the temperature and/or other parameters of the alcohol sensor 440 to determine when the alcohol sensor 440 is ready to perform a test. If a successful cleanliness check is performed, the PLC chip 432 sets the badge 410 in a sanitized state. If a set period of time (e.g., 30 seconds) passes without a successful cleanliness check being performed, the PLC chip 432 sets the badge 410 in an un-sanitized state. To clear the indication that it is in an "un-sanitized" state, the user can press the manual trigger button which signals the PLC chip 432 to begin another cleanliness check cycle.

As described with reference to the other badge embodiments, during a cleanliness check cycle, a user places a portion of their hand against the alcohol sensor grid 422 of their badge 410 and the PLC chip 432 assesses whether there is sufficient alcohol on the user's hands to indicate that they are clean. After a successful cleanliness check is performed, the PLC chip 432 sets the badge 410 in its sanitized state. When the badge 410 is in its sanitized state, badge components including the alcohol sensor 440 and the red LED 436 are turned off, the PLC chip 432 is in a listening mode, and the green LED 434 is turned on.

In the exemplary system 400, the badges 410 are configured to prompt a user to wash his or her hands each time they enter or exit a patient's room. For example, after activating her badge 410*a* and performing a successful cleanliness check to set her badge 410*a* in its sanitized state, a doctor starts her rounds which include visiting patients in three rooms 474*a*, 474*b*, 474*c* shown on FIG. 19B.

As the doctor passes through the doorway 414*a* into a first room 474*a*, the motion detector 416 signals the PLC chip 452 in the monitor 412*a* that there has been motion in the doorway 414*a*. In response, the PLC chip 452 operates the transceiver 464 to send a wireless signal including identification information (e.g., a serial number) of the monitor 412*a*. In this embodiment, each monitor 412 includes a detector 416 (e.g., an infrared motion detector) which indicates when someone passes through doorway 414. The monitor 412 can be configured to transmit a signal only when the detector 416 indicates that someone is passing through the doorway 414. In some embodiments, the monitors 412 can be configured to transmit signals continuously.

In operation, the state of badges 410 are controlled by the state control logic 500 illustrated in FIG. 21. The state control logic 500 is designed to trigger a cleanliness test cycle when a badge 410 crosses a monitored threshold 414 (e.g., entering or exiting a patient's room) which is generally indicated by receipt of a signal from a monitor 412. The state control is also designed to assess whether a signal received from a monitor 412 was transmitted in response to someone else crossing the monitored threshold 414. It may be undesirable for the badges 410 of people already in a space who have cleaned their hands to be triggered by the entry of another person into the space.

In its sanitized state, the badge 410 displays a green light and listens for signals from monitors 412 (step 510). Until a signal is received from a monitor 412, the badge remains in listening mode. In listening mode, a cleanliness test cycle can be triggered by passage of time and/or by an override signal from a central controller as described with respect to the other embodiments. When the badge 410 receives the signal transmitted by a monitor 412 (step 512), the PLC chip 432 on the badge 410 checks whether this is a new monitor signal (step 514). For example, the PLC chip 432 can compare the received signal with a previously stored signal (e.g., the most recently stored signal in a time-ordered queue 409 of monitor signals stored in onboard memory of the badge 410). If the previously stored location signal is different than the currently received location signal, the badge 410 activates a cleanliness check cycle (step 520) based on the assumption that the person wearing the badge 410 has entered a new monitored room. The PLC chip 432 also stores information about the new signal (e.g., the identification of the transmitting monitor and the signal strength) in the time-ordered queue of monitor signals stored in onboard memory of the badge 410.

The movement of people or objects other than the person wearing a badge 410 through a doorway can cause a monitor at that doorway to transmit a monitor signal. In some embodiments, the badge 410 monitors the presence of other badges in a room to avoid being set to an un-sanitized state when this occurs. For example, if the monitor signal has the same source as a previously received signal (e.g., the same source as in the most recently stored signal information 411 in the time-ordered queue of monitor signals stored in onboard memory of the badge 410), this may imply that the person wearing the badge 410 may be remaining in a room whose monitor has transmitted a monitor signal in response to being triggered. In some embodiments, if the monitor signal has the same source as a previously received signal, the PLC chip 432 returns the badge to listening mode. In the illustrated embodiment, the PLC chip 432 is configured to receive identification signals transmitted by other badges 410 to track which badges are within a specified distance (e.g., within the same room) (step 516). In this embodiment, the PLC chip 432 can be configured to activate the cleanliness check cycle (step 520) if there has not been a change in the badges present when the monitor signal is the same as for the previously stored signal. Other approaches can also be used to identify and track the population of badges in a room and use that information is a basis for avoiding the triggering of the badges of people already in a room due to the passage of other people through the entrance of the room.

In some embodiments, if there has been a change in the badges present, indicating that another person has entered or left a space being monitored, the PLC chip 432 returns the badge to listening mode. In the illustrated embodiment, the PLC chip 432 is configured to monitor the strength of signals received. In this embodiment, the PLC chip 432 returns the badge to listening mode if the received signal strength of a monitor signal that is the same as the previously stored monitor signal is less than a certain percentage (e.g., 90%, 80%, or 70%) of the maximum signal strength recorded for a signal from that monitor (step 518). Otherwise, the PLC chip 432 can the person wearing the badge 410 is passing through a doorway and therefore activate the cleanliness check cycle (step 520). This approach assumes that the maximum signal strength for a monitor is recorded as a health care worker wearing a badge walks through the adjacent doorway.

If the cleanliness check cycle is activated (step 520), the user can operate the badge as described above to check that sufficient alcohol vapor is present to indicate that the user's hands are sanitized. If the test is successful (step 522), the PLC chip 432 can reset the badge to its sanitized state (step 528) and return to the listening mode (step 510).

Figure 22:
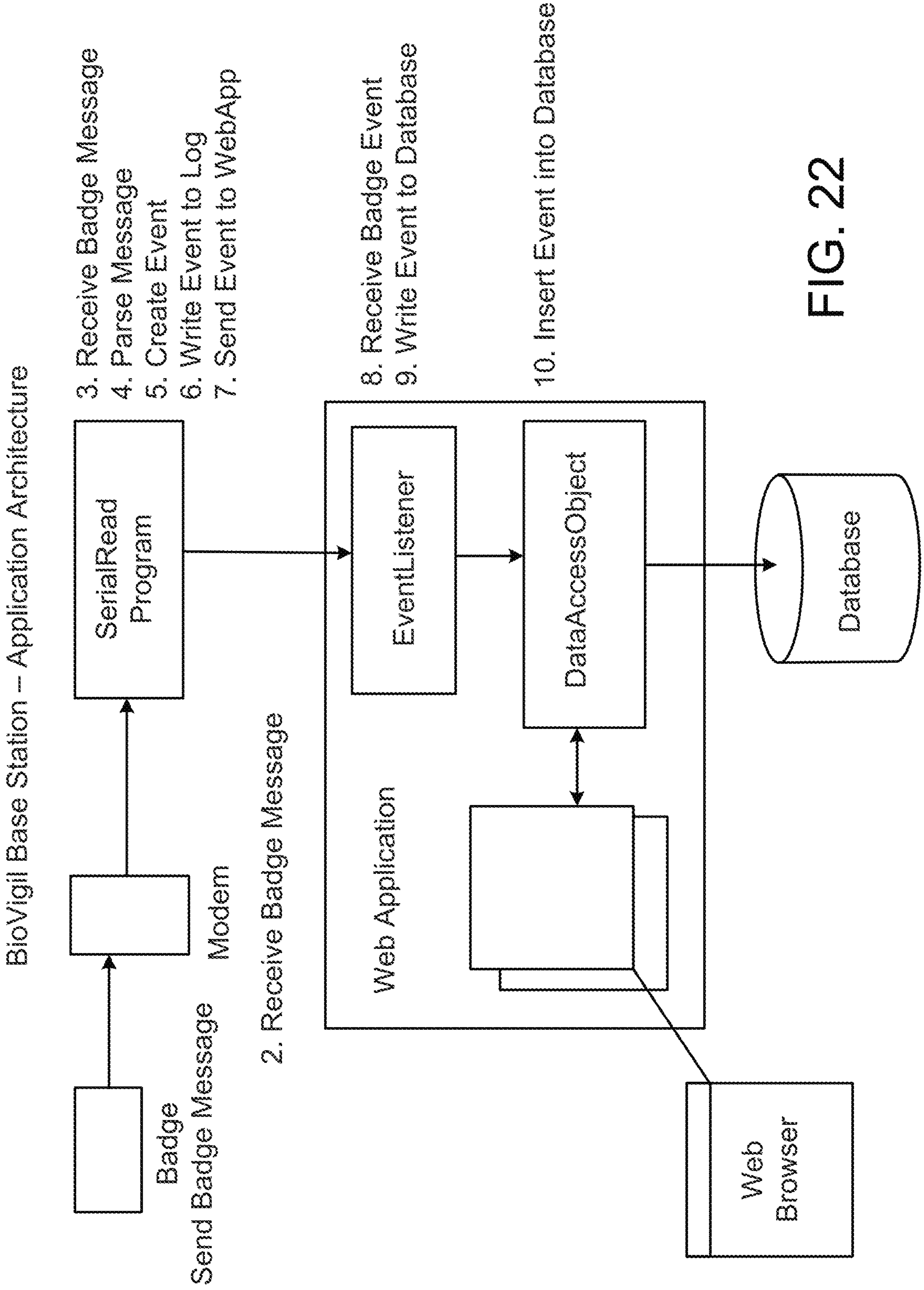
FIG. 22 shows base station application architecture.

As discussed with respect to other embodiments, the badges 410 can store cleanliness test results in onboard memory. The test results and associated data can be periodically downloaded to a base station 523. FIG. 22 illustrates the application architecture for an embodiment of the base station which receives data from the badges 410, stores the data in a database, and provides access to the data (e.g., web-based access). FIG. 23 illustrates a portion of a graphical user interface that can be used to access the data.

In some implementations, monitors 412 can be configured to continuously send badge-switching signals across a doorway or threshold 414. For example, the monitors 412 can include shielding which localizes the badge switching signal being transmitted to the doorway 414 or other threshold being monitored. The badges 410 can be programmed to switch to a non-sanitized state whenever a badge-switching signal is received based on the assumption that whenever a badge-switching signal is received the wearer is entering or exiting a room by crossing a monitored threshold.

This approach can result in "false positives" in which the system mistakenly triggers a cleanliness check cycle for person who merely passes by (rather than crosses) a threshold.

In some implementations, the monitors 412 can continuously send badge-switching signals throughout the room in which the monitors 412 are installed. The associated badges 410 switch to a non-sanitized state upon first receiving a badge-switching signal from a specific monitor 412. After the person wearing the badge 410 has cleared the non-sanitized state by running a successful test cycle, the badge 410 will ignore the badge-switching signal transmitted by the specific monitor which triggered the test cycle as long as the badge 410 remains in communication with that specific monitor. The badge interprets a loss of communication with that specific monitor as indicating that the wearer has exited the monitored space and switches to a non-sanitized state upon loss of communication. This approach does not require the monitor to include a detector but can sometimes result in the badge 410 unnecessarily switching to a non-sanitized state. For example, if a technician wearing a badge 410 moves behind a badge that blocks the signal from the monitor 412, the badge could be switched to a non-sanitized state. The badges 410 can be configured with a time-delay before the signal loss switches the badge state as a method of reducing such unnecessary switching.

As illustrated in FIGS. 24A-24D, some embodiments of a system 600 configured to prompt individuals 601 (e.g., health-care workers, only one shown) to sanitize their hands 603 on entering or exiting a specific space (e.g., a patient's room) include badges 610 (only one shown in FIG. 24A), a monitor or monitors 612*a*, 612*b* that provide dual signals at a threshold of the space, such as a doorway 605, and a base station 614. In these embodiments, the wearable badges 610 can prompt a user to clean his or her hands, verify that his or her hands have been cleaned (e.g., sense the presence of alcohol hand sanitizer), and record the activities of the wearer. The monitors 612*a*, 612*b* can be mounted above an entrance 613 (an example of a threshold) to a space (e.g., above a doorway leading into a patient's room) emitting at least two signal beams 615, 617 downward as a way to trigger a hand-cleaning process. As explained in more detail below, the badges 610 are configured to recognize that they have crossed a boundary based on rapid transitions in the receipt at the badge of different signal beams. This dual signal beam approach can reduce the likelihood of that badges 610 will unnecessarily switch to a non-sanitized state.

The base station 614 (see FIG. 24B) can collect data from multiple badges and provide an overview of hand-cleaning events.

The monitors 612*a*, 612*b* can be mounted above the doorway of a room each to emit a signal-carrying beam 615, 617 (e.g., infrared light) in a downward direction 619. In some embodiments, the monitors 612*a*, 612*b* can be adhesively attached to a door frame or wall. In some embodiments, the monitors can be mechanically attached to the door frame or wall.

Figure 24A:
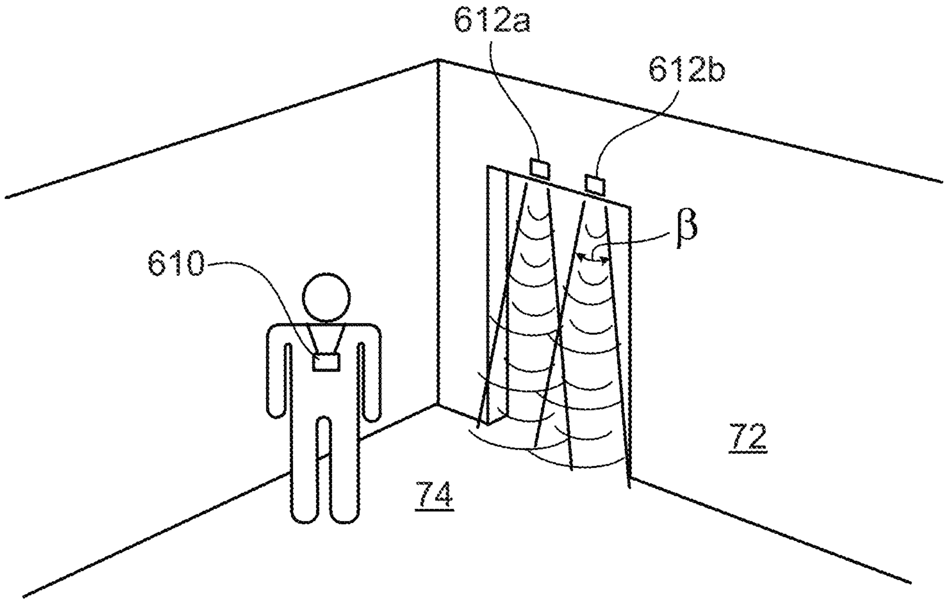
FIGS. 24A-24E are schematic views of a cleanliness monitoring system.
Figure 24B:
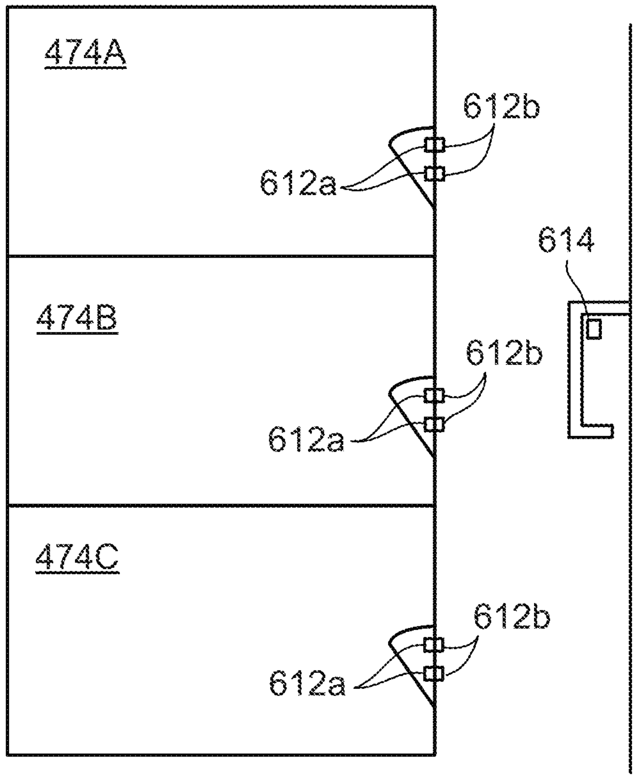
Figure 24C:
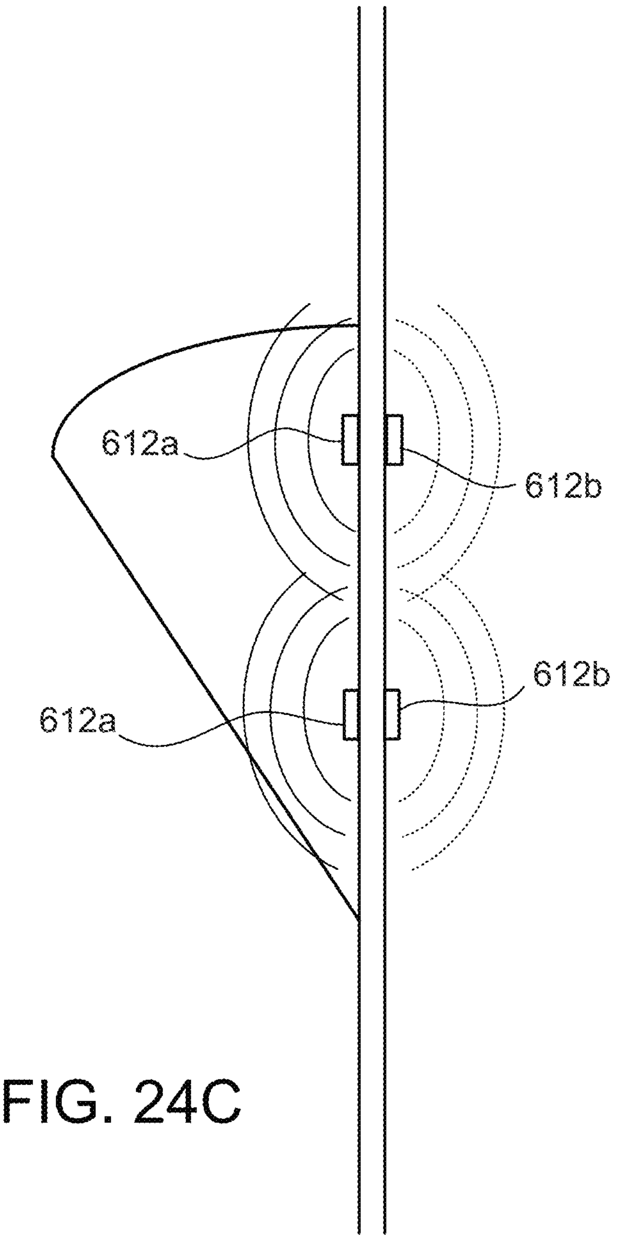
Figure 24D:
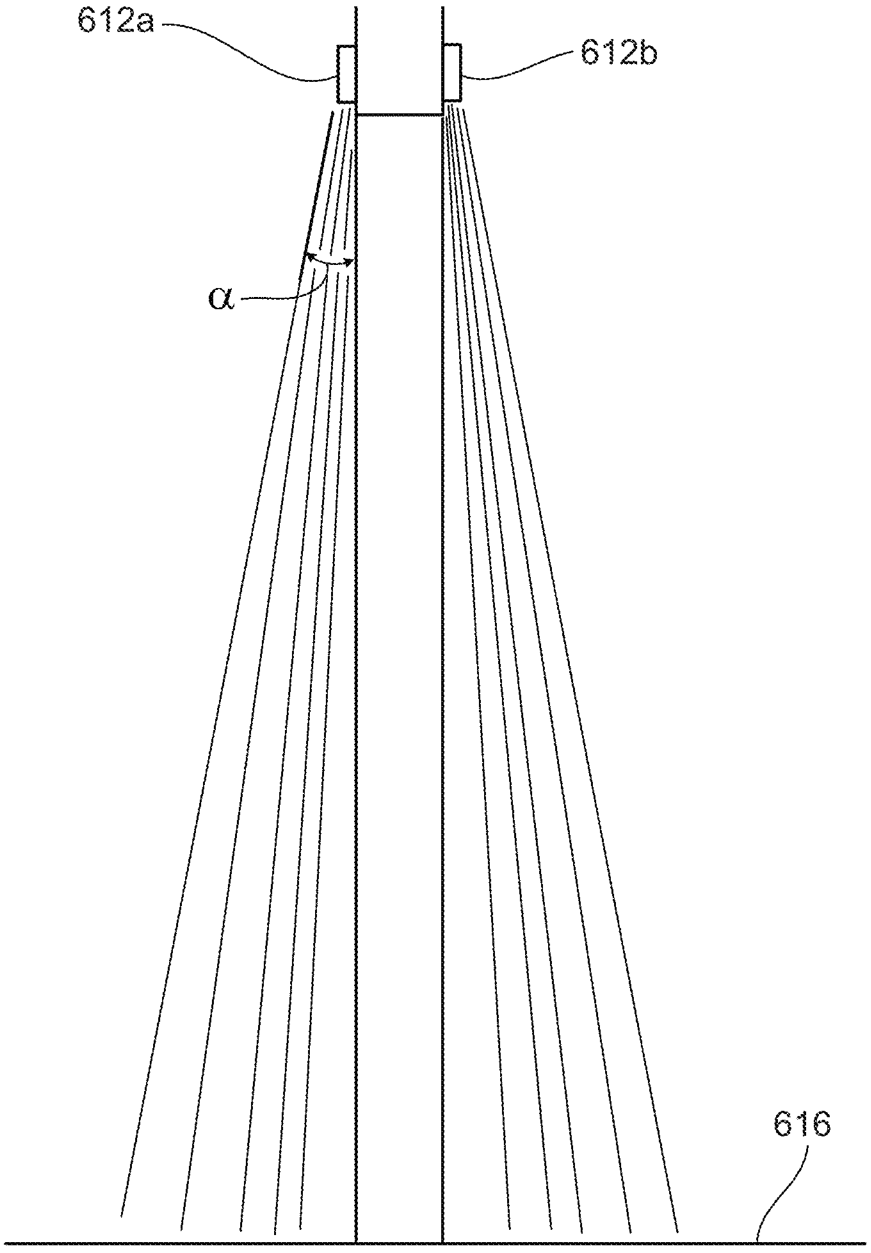

The monitors can be mounted with first monitors 612*a* inside the doorway and second monitors 612*b* outside the doorway. For example, in some implementations, the monitors 612*a*, 612*b* can include infrared light emitting diodes (LEDs) which continuously emit infrared light downwards towards a floor 616 in the form of a conical infrared light beam 623 an angle of dispersion a (FIG. 24D) substantially perpendicular to the plane 625 of the doorway of about 60 degrees (e.g., between about 50 and 70 degrees) and at an angle of dispersion R (FIG. 24A) substantially parallel to the plane of the doorway of about 60 degrees (e.g., between about 50 and 70 degrees). As can be seen in FIGS. 24C and 24D, this configuration can provide a signal field 627 that is localized in the vicinity of the threshold 629 being monitored. This configuration can provide lateral overlap between the signal beams from adjacent inside monitors in order to provide uninterrupted coverage and between the signals from adjacent outer monitors with limited or no overlap between the signal beams of inside monitors and the signal beams of outside monitors.

Figure 24E:
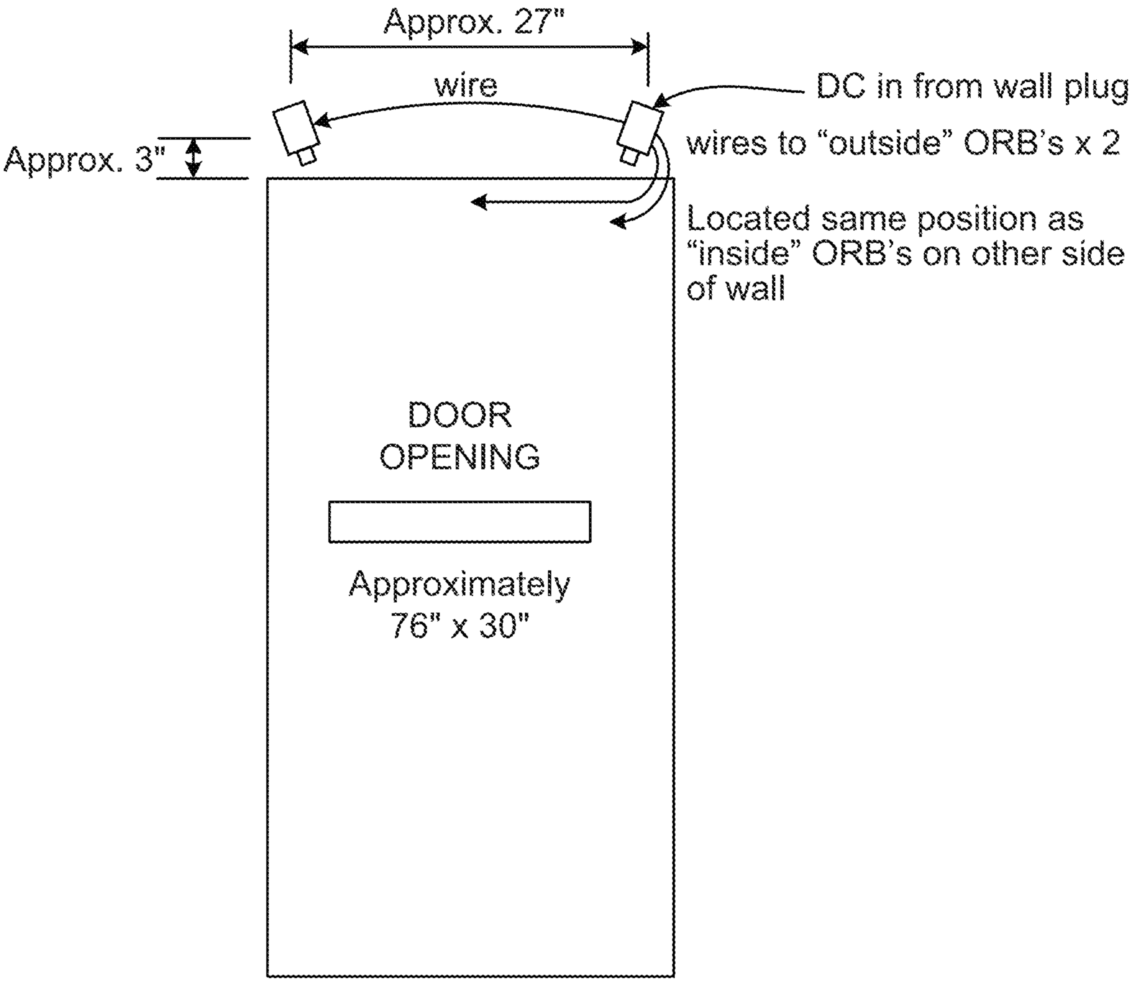

In a test of the illustrated embodiment, the monitors used were mounted as illustrated in FIG. 24E. Two inside monitors 612*a* were mounted about 24 inches apart (e.g., about 12 inches from the doorway centerline) on the inner upper frames of 30 inch doorways and two outside monitors 612*b* were mounted at corresponding locations on the outer upper frames of the doorways. The alpha and beta angles of dispersion were about 60 degrees and 60 degrees respectively. This configuration provided lateral overlap between the signals from adjacent inside monitors and between the signals from adjacent outer monitors with limited or no overlap between the signals of inside monitors and the signals of outside monitors.

Figure 29A:
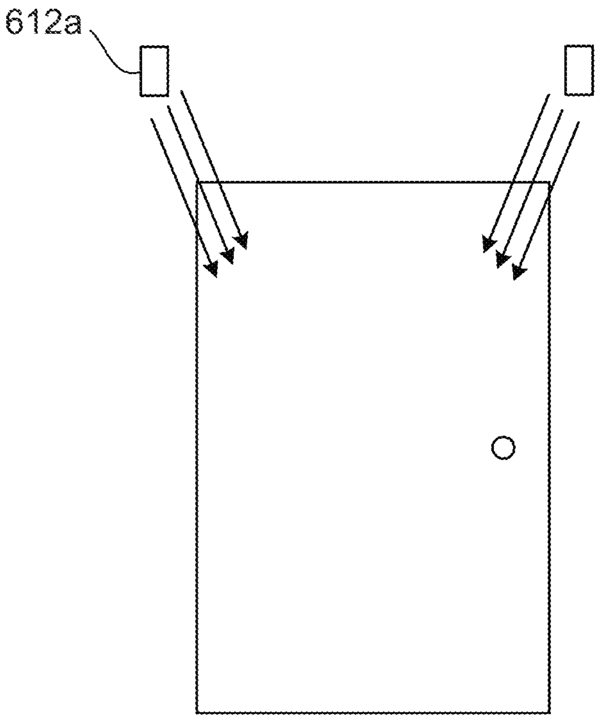
FIGS. 29A-29B are schematic views of the monitors of a cleanliness monitoring system.
Figure 29B:
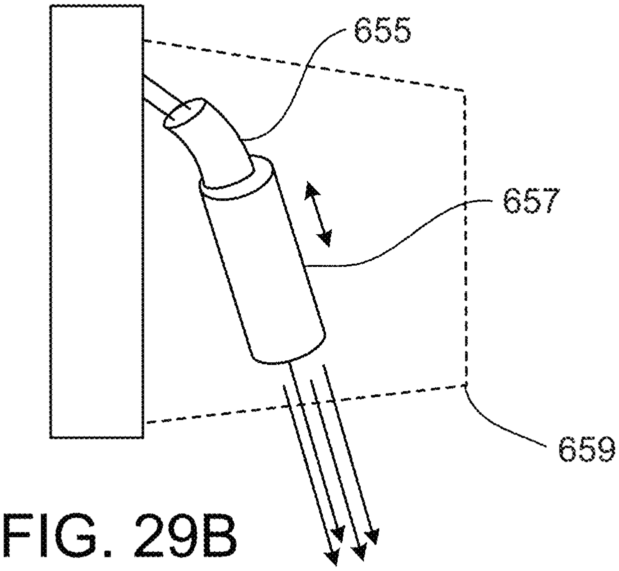

FIGS. 29A-29B illustrate an approach to mounting the monitors 612*a*. In this approach, the pairs of monitors 612*a* are mounted above or slightly outside the side edges of the door frame. Each of the monitors 612*a* can include an infrared light emitting diode 655 disposed in a plastic sleeve 657 (e.g., a cylindrical plastic sleeve) to confine and direct the infrared light. Each of the monitors 612*a* can also include a cover 659 (e.g., a plastic cover opaque to visible light and translucent to infrared light) that is on the side of the monitor facing the room or hallway. This implementation of monitors 612*a* can improve the focus and directivity of the infrared light beam, inside and outside of doorways.

Figure 30A:
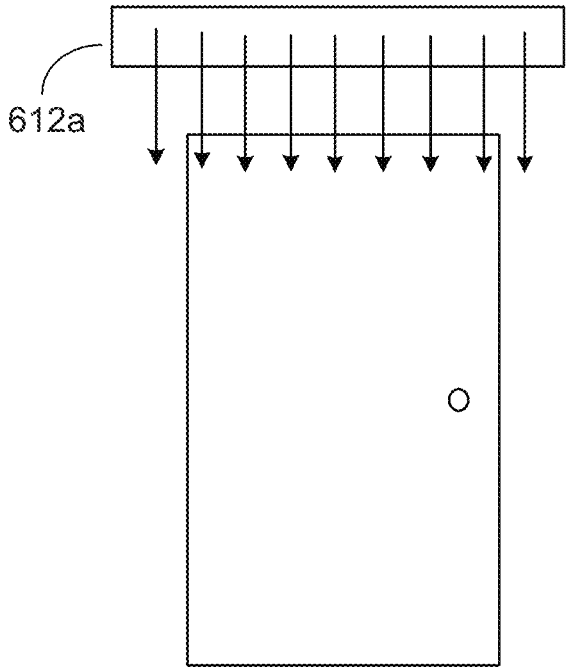
FIGS. 30A-30C are schematic views of the monitors of a cleanliness monitoring system.
Figure 30B:
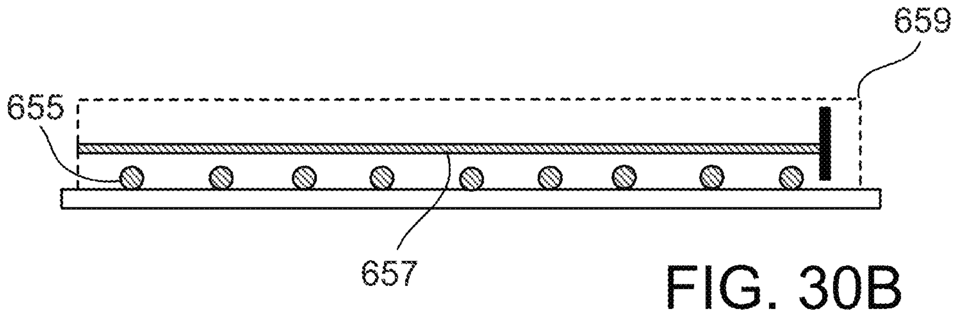
Figure 30C:
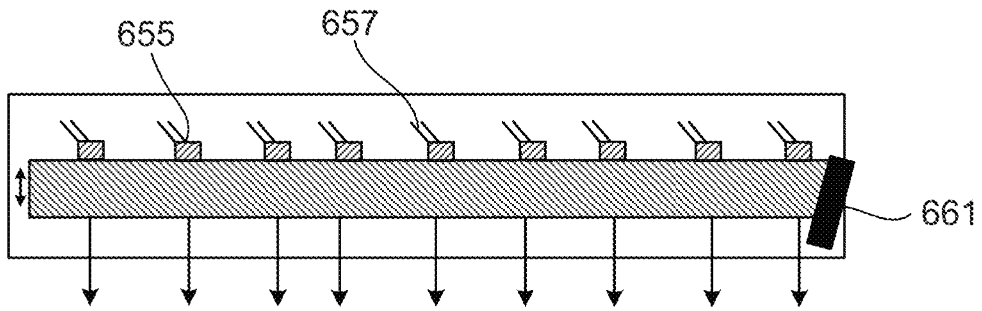
Figure 31:
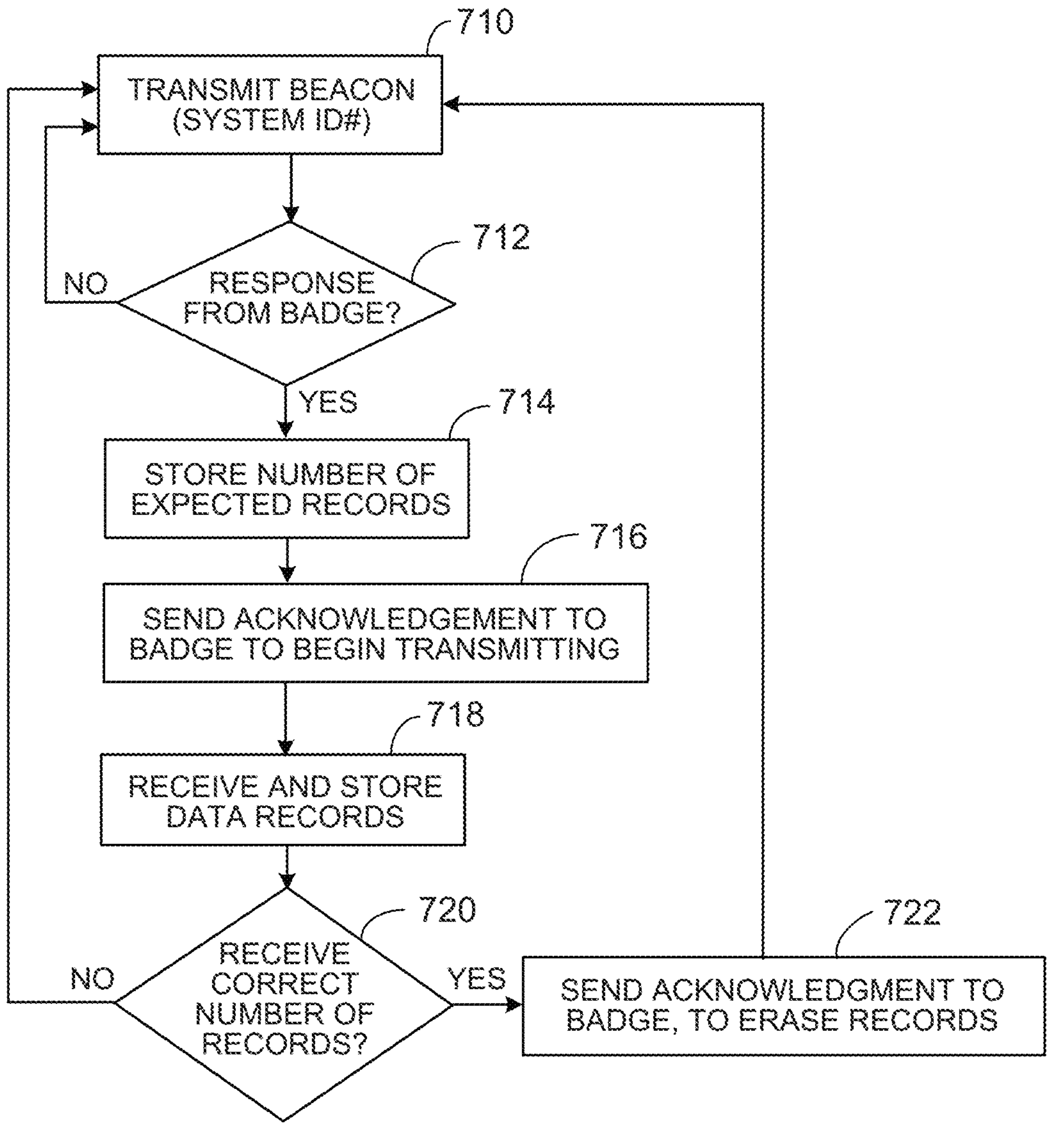
FIG. 31 is a schematic of base station logic.

FIGS. 30A-30C illustrate a monitor 612*a* implemented as a "light curtain." The monitor 612*a* can include multiple infrared light emitting diodes 655 arranged in a light strip within a cover 659 (e.g., a plastic cover opaque to visible light and translucent to infrared light). A plastic sleeve 657 (e.g., a rectangular shroud on the side of the monitor facing the room or hallway) extends over the multiple infrared light emitting diodes 655 to confine the infrared light emitted by the monitor to the vicinity of the doorway, that is, to confine the infrared light to a space that is typically no more than 36 inches into the room or hallway relative to the door. The sleeve can be attached to a mechanism (e.g., a lever, an adjustable screw mount) operable to control the position of the plastic sleeve relative to the light emitting diodes 655 and, thus, the configuration of the infrared beam emitted by the monitor 612*a*.

Monitors are available that have a variety of emitter coverage patterns. The system 600 can be designed using monitors that have different emitter coverage patterns and/or different configurations of monitors. For example, larger boundaries (e.g., the threshold between the central aisle and bed spaces of an open bay ward or large double doorways) can be covered by more monitors and/or by monitors with wider emitter coverage patterns arranged to provide the rapid transition between inner and outer signals used to identify the boundary location. For example, in some embodiments, a badge can identify a boundary if the transition between signals occurs in less than 2 seconds (e.g., less than 1 second or less than 0.5 seconds). In some embodiments, a single monitor can be configured to provide both inner and outer signals with limited or no overlap between the inner signals and the outer signals.

The terms "inside," "inner," "outside," and "outer" are used for ease of describing the locations relative to the hallway-room building plan shown in the Figures. Such monitors could be used to identify boundary locations in other settings including, for example, an outdoor boundary line where none of the monitors used are inside a building or a shape defined by the boundary.

The first monitors 612*a* mounted inside the doorway and second monitors 612*b* mounted outside the doorway emit different signals (e.g., the infrared beams of different monitors can be modulated to carry different identification signals). As is discussed in more detail below, the badges 610 can identify when the user crosses the threshold being monitored and the user's direction of travel based on the different signals emitted by the first monitors 612*a* and the second monitors 612*b*. In some embodiments, each monitor 612 emits a unique signal (e.g., a serial or identification number). In these embodiments, the locations of individual monitors 612 can be pre-stored in a database on the badges 610 and/or at a central monitoring station. In some embodiments, the first monitors 612*a* emit a first common signal and the second monitors 612B emit a second common signal, for example, a signal that indicates that a given monitor is either an inside monitor or an outside monitor.

Figure 25:
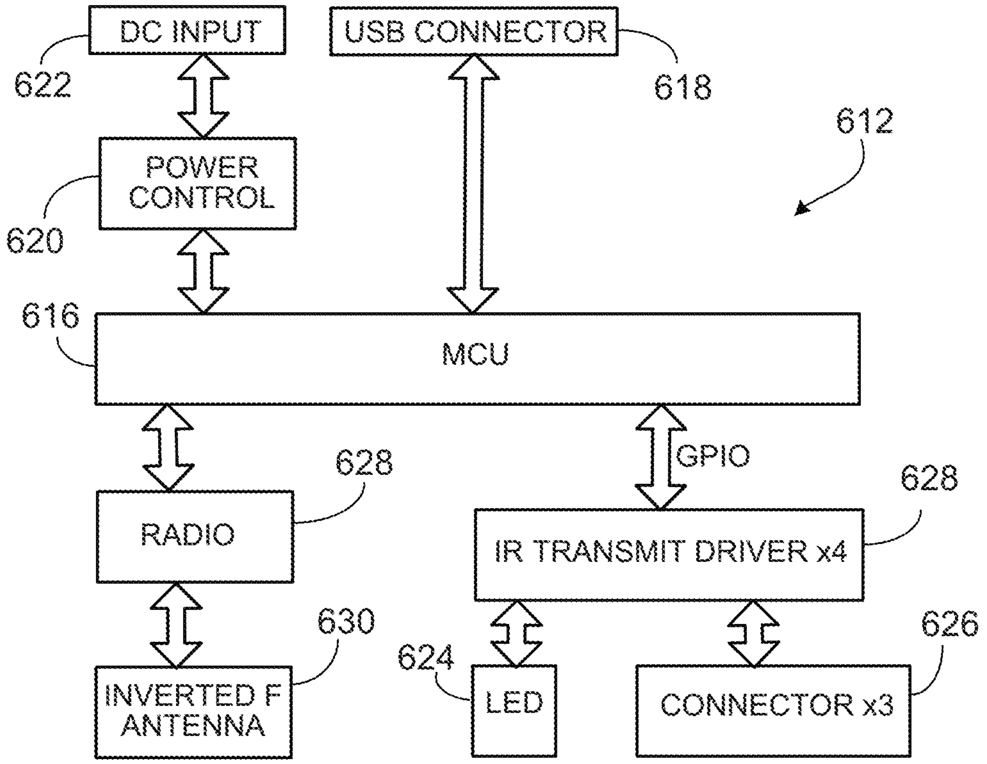
FIG. 25 is a schematic diagram view of a monitor.

In a test of the illustrated embodiment, the monitors 612 were configured to continuously emit a beam of infrared radiation modulated to carry identification signals that were received by any badge within range (e.g., passing through a monitored doorway). As illustrated in FIG. 25, each of the monitors 612 included a PLC chip as a microcontroller unit (MCU) 616 and a USB connector 618 to provide operator access to the MCU (e.g., to set the signal being emitted by the monitor 612). A power control 620 connects the MCU to a power input 622. In the test, the monitors 612 were powered by wall plugs. In some embodiments, the monitors 612 can be powered by other means including, for example, photovoltaic cells and/or batteries. The MCU 616 controlled the infrared signal emitted by infrared a light emitting diode 624 through an infrared transmit driver 626. Connections 626 available for up to three other light emitting diodes were not used.

In this embodiment, the monitors 612 did not utilize any sensors or radiofrequency communications, but acted simply as a trigger to cause badges to record events corresponding to entering or exiting a room. The monitors 612 used in the test included radiofrequency transceivers 628 with antennas 630 to provide additional communication links for radiofrequency communication as needed. Such radiofrequency transceivers can provide high rate data transmission.

Figure 26:
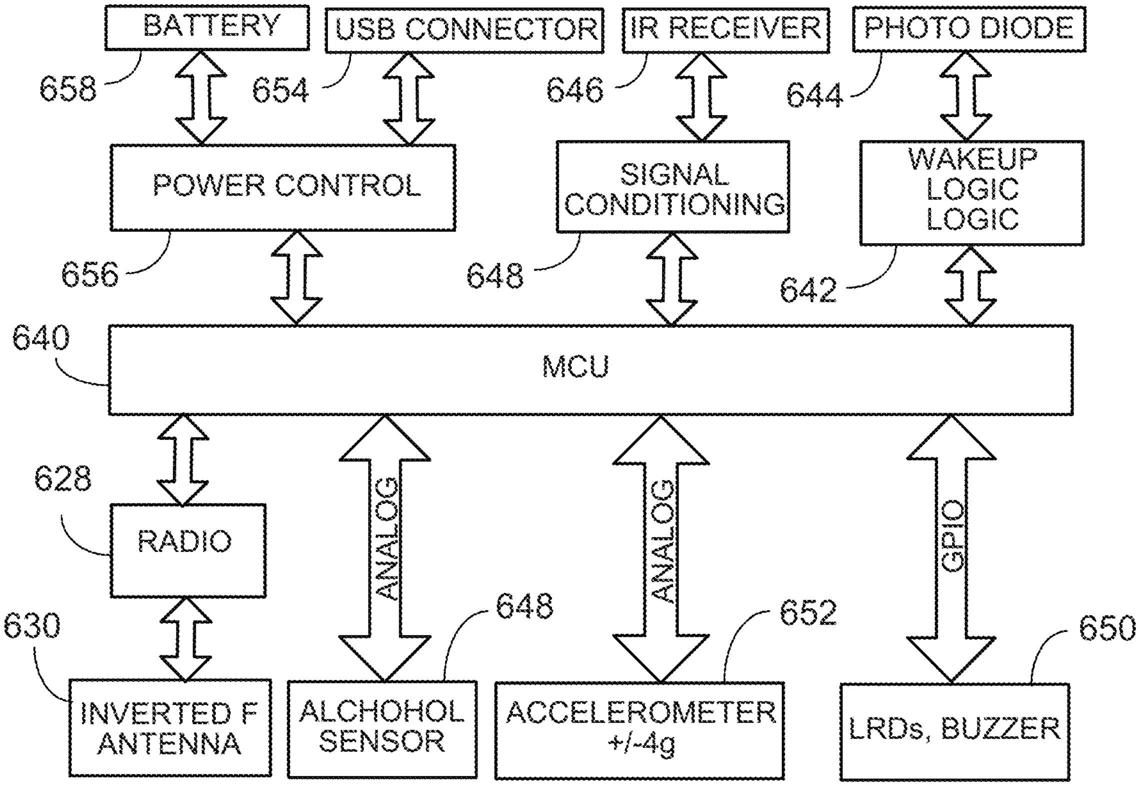
FIG. 26 is a schematic diagram view of a badge.
Figure 27:
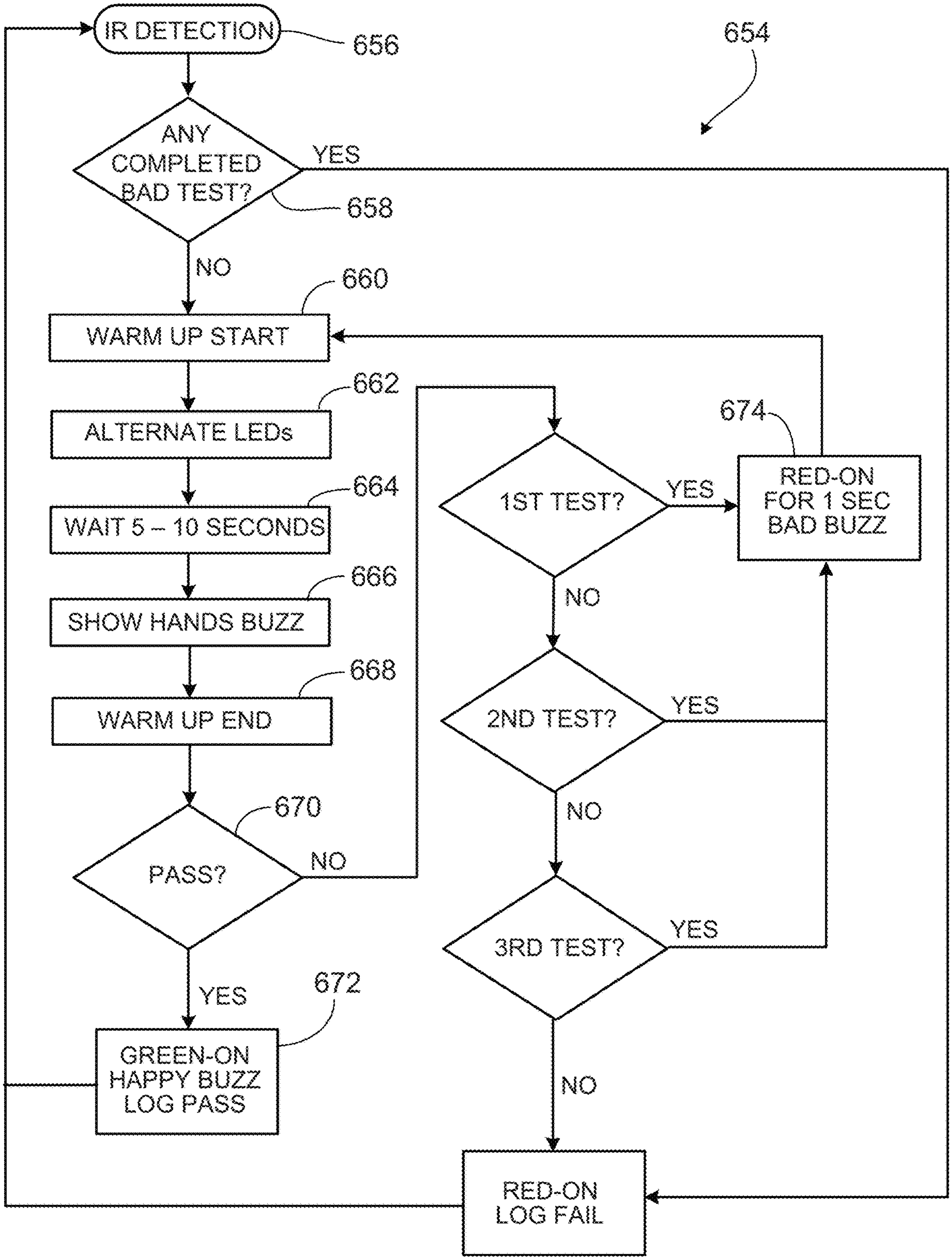
FIG. 27 is a schematic of badge logic.
Figure 28A:
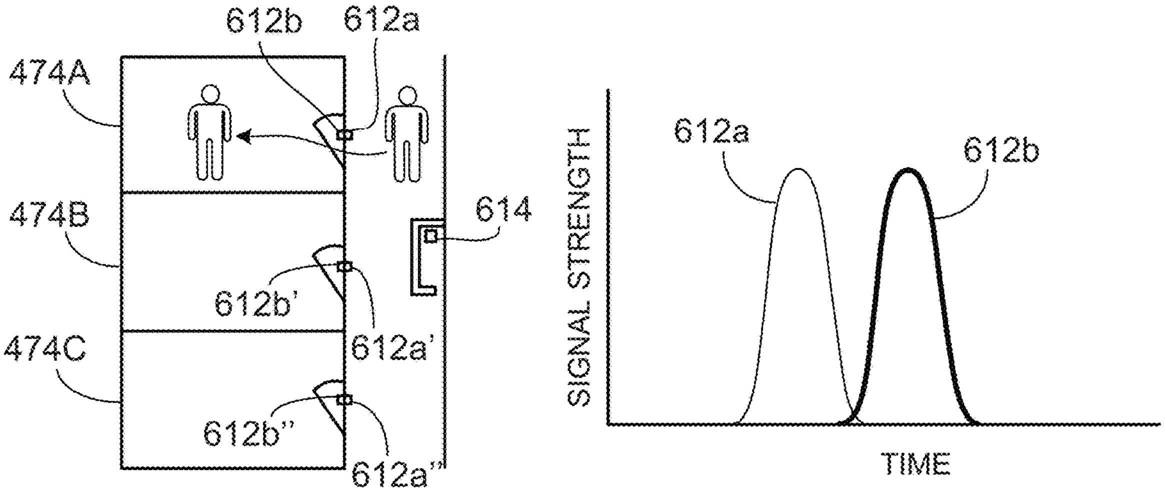
FIGS. 28A-28D illustrate operation of a cleanliness monitoring system.
Figure 28B:
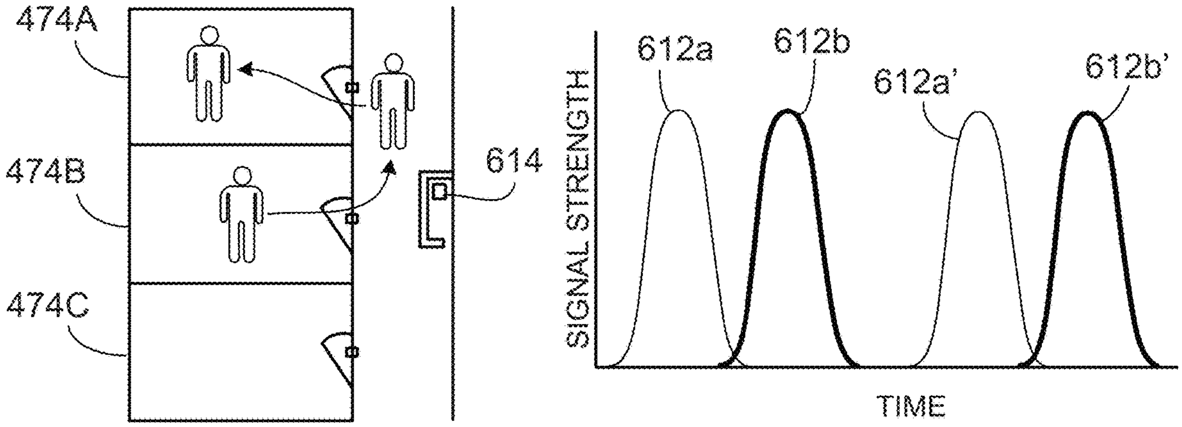
Figure 28C:
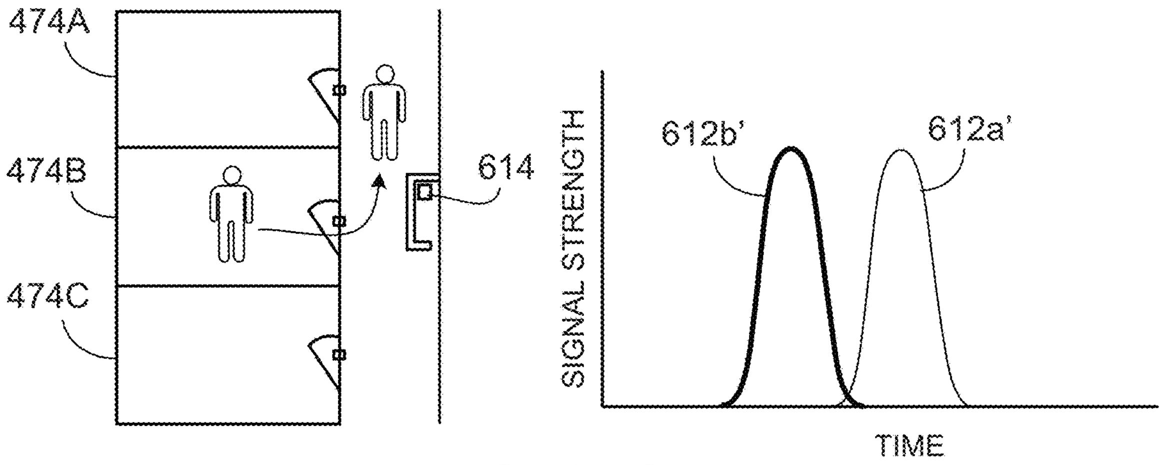
Figure 28D:
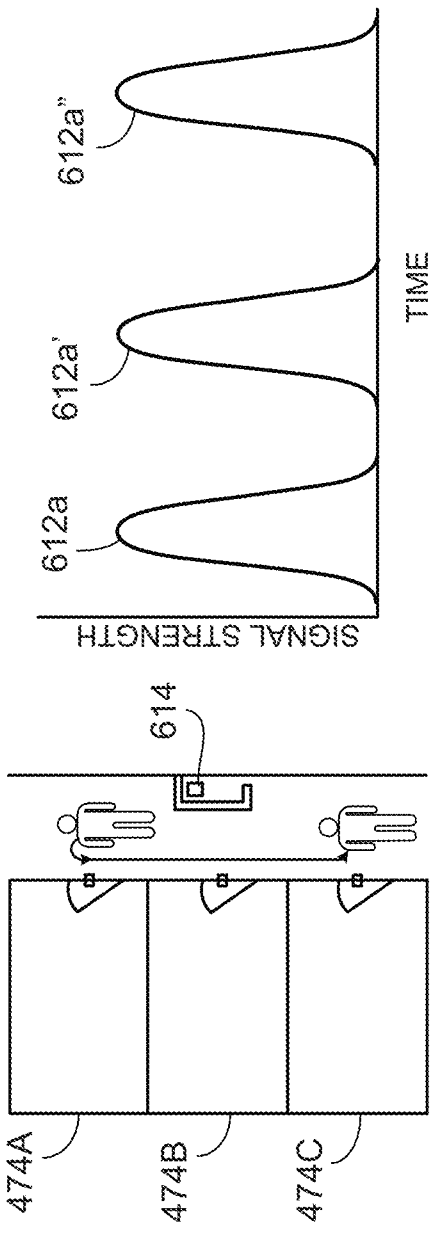

As illustrated in FIGS. 26, the badges 610 used in the test had multiple functions that were controlled by a microcontroller unit 640 (e.g., a PLC chip and associated software). The badges 610 were generally similar to the badges 410 but did not include a manual triggering button. A wakeup logic application 642 monitored signals from a photodiode 644 activated by infrared light. The badges 610 were configured to continuously monitor their environments using the photodiode, and were activated by the infrared light of the monitors 612. Once activated, the MCU 640 received the infrared-carried signals from the monitor 612 using an infrared receiver 646 and associated signal processing application 648 to determine and store the monitor identification and then initiated a cleanliness test cycle. In the test, the location of the monitor 612 was correlated with its location in a database stored on a central server. In some embodiments, the location database can be stored in onboard memory of the badge 610 rather than or in addition to on the central server.

When the cleanliness test cycle was initiated 7, the badge 610 prompted the user to clean his/her hands, warmed up an onboard alcohol sensor 648, then prompted the user again to place his/her hands near the alcohol sensor 648 using light emitting diodes and/or a speaker 650. At this point, the sensor 648 tested for the presence of alcohol by measuring the increase or decrease in voltage level from a metal oxide alcohol sensor.

The badge 610 communicated the success/failure of the alcohol test to the user via light emitting diodes 650 and sounds, and stored a record of the time, location, and status of the alcohol test in memory capable of holding data about hundreds of testing events. The data was downloaded into the base station reader 614 periodically. The badges used in the test downloaded data using a USB interface port 654 (and associated cable) connected to the MCU 640 through a power control module 656. A battery 658 (e.g., a rechargeable battery) was also connected to the power control module 656.

Although the badges 610 used in the test did not include radio frequency transceivers, some badges include radiofrequency transceivers 628 with antennas 630 to provide an additional communication link in case of any potential need for radiofrequency communication including, for example, when downloading data from the badges. Such radiofrequency transceivers can provide high rate data transmission. In some embodiments, the badges are configured to use an automated wireless download rather than the USB port/cable. In automated wireless download embodiments, when a health care worker passes, for example, a base station 614, his/her badge 610 is triggered to transmit stored test data to the base station 614.

Similarly, although the badges 610 used in the test did not include accelerometers, some badges include accelerometers 652 which can provide the MCU with input for battery saving shutdown scheme.

FIGS. 27, 28A-28D, and 31 illustrate the sequence of events that occurs when the un-sanitized mode of a badge 610 is triggered by passage through a doorway or other monitored boundary. Upon powering up, the badge 610 enables its IR detector and the badge microprocessor monitors the badge IR detector, to detect patterns of IR light (sequences of off/on light bursts) which indicate the presence of a monitor. When a monitor is detected, the badge 610 registers the Orb #, System ID #, and the "indoor" or "outdoor" status of the monitor. When the badge detects another monitor and registers the same Orb #/System ID #with the opposite "indoor/outdoor" designation, the badge 610 recognizes a transition event.

A doctor standing in the hall passes through the doorway 475 into room 474A passing under monitor(s) 612*a* and 612*a*' on the outside 477 of the door frame 479 and then under monitor(s) 612*b* and 612*b*' on the inside 481 of the door frame 479. The doctor's badge 610 is activated from its listening mode when photodiode 644 (see FIG. 26) receives infrared light from monitor(s) 612*a*. As the doctor passes through the doorway, the infrared receiver 646 of the badge 610 receives an identification signal from monitor(s) 612*a* and then from monitor(s) 612*b*. As monitor 612*a* and monitor 612*b* have the same Orb #/System ID #with the opposite indoor/outdoor designations, the badge 610 recognizes a transition event.

The receipt of sequential infrared signals triggers a hand cleanliness test cycle 654. The badge 610 starts the process of warming up the alcohol sensor 660 and indicates that a test is required (e.g., by alternately flashing the red and green light emitting diodes) 662 and/or by emitting an audible signal (e.g., one or more audible beeps). The microprocessor monitors the voltage output of the tin-oxide sensor to establish a baseline of output for "clean" air, then emits a series of beeps to signal its readiness for an alcohol test to the user. The "test required" signaling continues 664 for about 8 seconds (e.g., between 5-10 seconds) which allows the doctor to wash her hands with, for example, an alcohol based cleaner. The badge 610 then signals 666 (e.g., by a soft buzzing sound and/or a blinking red light emitting diode) that the doctor should apply one of her fingers to or near the alcohol sensor and the warm up cycle ends 668. The MCU then executes a cleanliness check as described above with respect to other embodiments. If there is sufficient alcohol vapor present for a successful test, the badge signals a successful test 672 by, for example, turning off the red light emitting diode, turning on the green light emitting diode, and making a pleasing sound. The badge then resets to listening mode. If there is not sufficient alcohol vapor present for a successful test, the badge signals an unsuccessful test 672 by, for example, flashing the red light emitting diode and making an unpleasant sound. The badge can then return to the start of the warm up cycle 660 for a retest sequence.

Multiple (e.g., up to 3, up to 4, or up to 5) retest sequences are repeated until the badge discontinues testing and the red light emitting diode on the badge is turned on, a failed test is recorded, and the badge returns to listening mode. If, during the initial check 658, the MCU found that a complete failed or bad test had occurred since the badge was activated by passage through the doorway, the red light emitting diode on the badge is turned on, a failed test is recorded, and the badge returns to listening mode without activating the alert signals discussed above (e.g., flashing lights, sounds, vibration). This bypass allows the badge to be silenced without operator intervention or a successful hand washing check under circumstances when other activities are more important than hand washing. For example, if the doctor had entered room 474A during rounds to make a routine check on a patient, her badge would prompt her to wash hands using the signals described above. After she washed her hands and completed a successful cleanliness check, her badge 610 would be set to its sanitized state and would display, for example, a steady green light. However, if the doctor had entered room 474A because the patient had suffered a heart attack, multiple health care workers would likely be entering room 474A in close succession and all of their badges would be triggered to signal the need for hand washing. However, under these circumstances, the need for urgent medical intervention might preempt hand washing. After three tests which would be unsuccessful because the health care workers would not be applying their fingers to or near their badges 610, the badges would stop the possibly distracting signaling.

In either case, when the doctor left room 474A and entered room 474B, her badge would be triggered when she entered the hallway and retriggered when she entered room 474B. After she washed her hands and completed a successful cleanliness check, her badge 610 would be set to its sanitized state and would display, for example, a steady green light. If the doctor entered room 474B without washing her hands and completing a successful cleanliness check in the hall, her badge would record passing through the hallway as a failed cleanliness check.

After the doctor left room 474B and went to a central desk station, her badge would be triggered as she passed through the doorway. Her badge would prompt her to wash hands using the signals described above and, after she washed her hands and completed a successful cleanliness check, her badge 610 would be set to its sanitized state and would display, for example, a steady green light.

Base station 614 could be located at the central desk station. Health care workers such as the doctor could periodically (e.g., at the end of each shift) download data from their badges 610 to the base station (see FIG. 31).

In some embodiments, the badges 610 include an onboard emitter (e.g., RF transmitter) and the base station 614 includes an RF receiver which can be used to transfer data from the badges 610 to the base station 614. For example, the base station 614 can transmit a signal (e.g., an RF beacon signal (802.15.4) every 750 milliseconds or continuously transmit an IR signal) identifying the base station and system ID # (step 710).

The onboard emitters on the badges 610 can be switched from a default inactive state to an active state to transmit information upon receipt of the signal identifying the base station and system ID # (or other external receiving equipment). Badges 610 whose onboard emitters are activated by the base station 614 can respond, for example, by transmitting an acknowledgement signal using 802.15.4 wireless signal protocols. When the base station 614 receives an acknowledgement signal from a badge 610 (step 712), the base station 614 can respond to the badge 610 that the base station 614 is ready to receive data. The badge 610 can authenticate that the base station 614 has the appropriate System ID, then transmit its records.

The base station 614 receives a message indicating the number of records to be transmitted by the badge 610 (step 714), receives data records from the badge 610, and translates the records received from the badge 610 into a format which can be stored (step 718), for example, on a local PC in a text-delimited data file. The base station compares the number of records received to the expected number of records (step 720). If the number of records match, the base station 614 can transmit an acknowledgement to the badge 610 to indicate accurate receipt of data and can return to its beacon mode (step 722). In some embodiments, separate software on the PC is used to pass the data file through network connections to a storage database, either online or within the hospital server network.

The badge 610 can disable its onboard emitter (e.g., RF transmitter), erase its memory, and return to the passive monitoring state after receiving confirmation from the base station 614 that the downloaded number of records have been received.

This approach can limit emissions (e.g., radio frequency emissions) from the badges 610 except when devices are triggered to download information to the external receiving equipment. For example, it can be desirable to limit emissions in the patient care portion of a hospital room.

After downloading her badge 610 (e.g., by USB connection to the base station 614 or RF transmission of data while passing the base station 614), the doctor walks down the hall. Her badge receives signals 612*a*, 612*a*', 612*a*" from monitors on the outside of the doorways of rooms 474A, 474B, 474C. Because the received signals 612*a*, 612*a*', 612*a*" are all "outside" signals, the badge 610 determines that it has not crossed a monitored boundary and does not activate a cleanliness check cycle.

Similar approaches can be used to promote good sanitary practices in other spaces (e.g., open bay wards and nurseries) in which it is desirable that individuals sanitize their hands both on entering and/or exiting the specific space. More generally, similar systems can be used to prompt good hygiene in a healthcare environment, and may also be used in restaurants, cruise ships, and other environments where good hygiene is important.

The hand washing routines described above can be implemented based on badges identifying hand cleanliness by the presence of alcohol vapors on a user's hands. However, similar logic could be used to trigger hand wash signals for badges which are reset to a sanitized state by other means including, for example, registering the operation of equipment such as a faucet and soap dispenser or by monitoring the time spent in front of a soap-and-water sink with a successful hand-cleaning event determined after a prescribed period of time is spent at the sink.

Some badge embodiments include other battery life extension features. For example, an IR detector on the badge can be disabled during a charging cycle. Onboard emitters (e.g., an RF transceiver) can be disabled until a sensor on the badge detects a "Base Station Orb". The cleanliness sensor (e.g., alcohol sensor) can be disabled until the badge detects a "Room Transition", then the tin-oxide sensor is warmed up with electrical current. The light emitting diodes can be used in "blinking" mode instead of constantly on. When triggered, cleanliness tests are repeated a limited number of times (e.g., four times) in response to failures before being discontinued to save power.

The badges described can also be used in conjunction with other monitoring and feedback systems.

Figure 32:
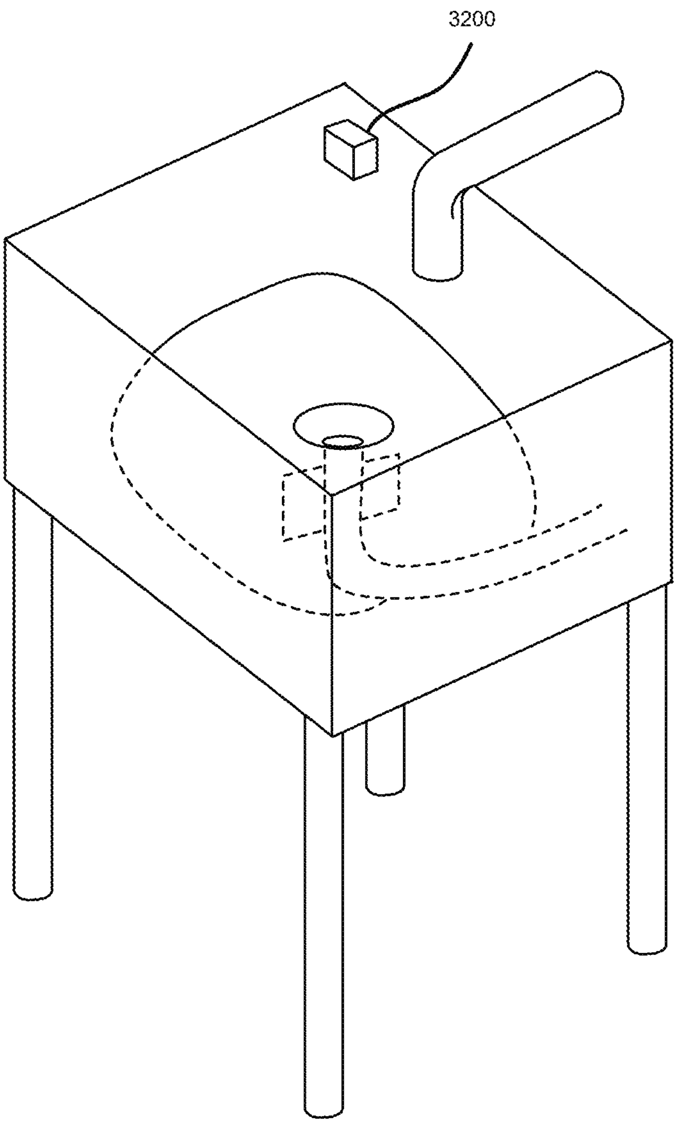
FIG. 32 is a perspective view of a sink having hand wash sensors.

FIG. 32 shows that hand washing stations (e.g., sinks) can include sensors and systems 3200 to communicate with the badges to provide cleanliness information. Using the sensors and systems, the sinks can observe and monitor various activities to determine when a worker is washing his or her hands, and then send a signal to the badge indicating that the worker has washed their hands. Alternatively, the badge could be used only to identify the worker at the sink, and the hand wash information can be sent to the network. To detect hand washing, the sensors could detect various signal attributes indicative of a person washing their hands in the sink. Such signals could include a particular amount of soap in water that exits the sink's drain, a certain range of 'sudsiness' of the soapy water passing through the drain, a particular flow pattern of water passing through the drain, or other indicators. These indicators can be determined empirically or by analysis and estimation.

Figure 33:
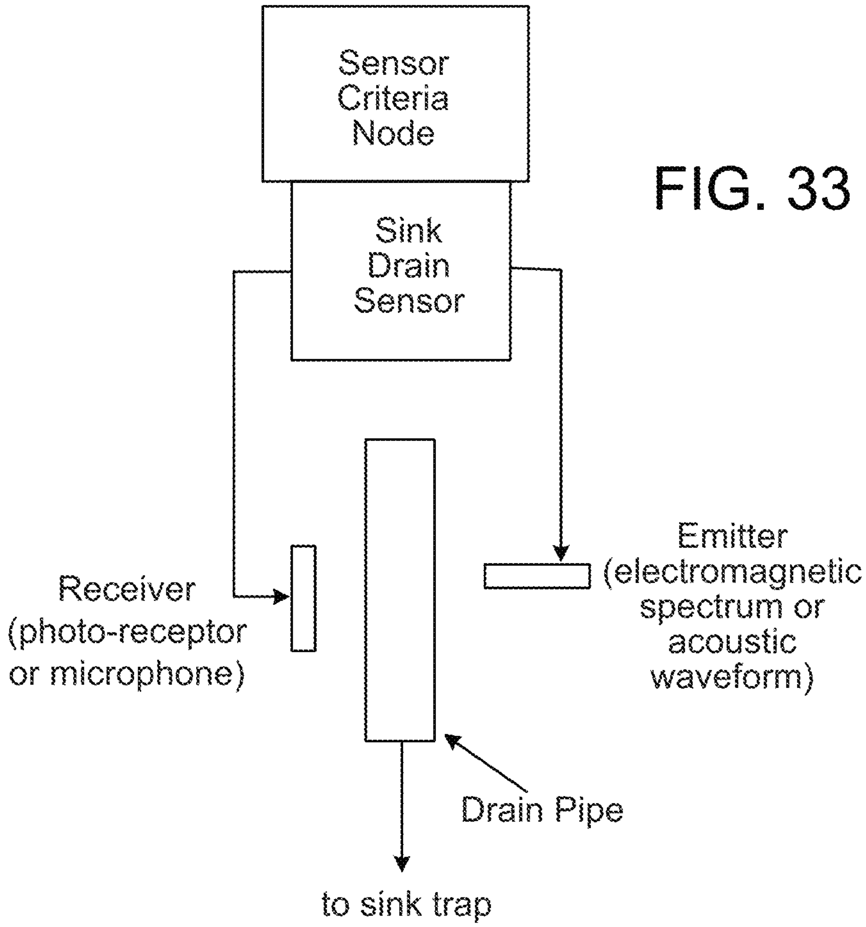
FIG. 33 is a schematic diagram of a sensor arranged in the proximity of sink drain pipe.

In one example, as shown in FIG. 33, when a sensor detects activity at sink, an emitter is activated to broadcast wavelengths of energy in the electromagnetic or acoustic spectrum across the drainpipe of the sink (e.g., between the drain and the sink trap) to be received by a receiver. The sensor processes signals from the receiver for the purpose of looking for signal attributes that are consistent with a hand wash event (e.g., the presence of soap, an appropriate water temperature, an appropriate movement of water within the drain, or other similar attributes). The signal processing method can be based on absorption bands or acoustic waveform signatures. If sensor detects a signature consistent with the targeted event (e.g., to indicate a hand wash event), the sensor criteria node can contact a base station and provide an update that the hand wash event has been detected. Alternatively or additionally, the sensor criteria node can send a signal (e.g., an update that the hand wash event has been detected) to the badge worn by the worker in proximity of the sink. In some cases, the signal sent to the badge causes the worker's badge to indicate the cleanliness state of the worker's hands. Time and location information about the event can also be provided.

Figure 34:
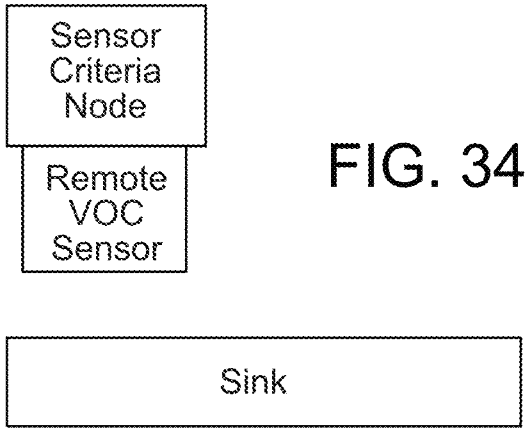
FIG. 34 is a schematic diagram of a sensor arranged near an upper portion of a sink.

In another example, as shown in FIG. 34, hand wash events are detecting by monitoring the air in the sink instead of the water flowing in the drain. Using similar technology as the onboard VOC sensor that can be located on the badge (as discussed above), a sensor module can be placed in proximity to a sink where a hand wash event may occur. The sensor module is calibrated to detect volatile substances that are present in soap that are likely to be released during hand wash event. The sensor module could be placed on a back surface of the sink or along a surrounding wall or cabinet. Alternative, a VOC sensor on a badge could be calibrated to detect a hand wash event at a sink, thereby eliminating the need for an additional sensing unit at the sink. If the sensor is separate from the badge and detects a volatile substance that is consistent with the targeted hand wash event, the sensor node can contact a base station and provide an update that the hand wash event has been detected. Alternatively or additionally, the sensor criteria node can send a signal (e.g., an update that the hand wash event has been detected) to the badge worn by the worker in proximity of the sink. In some cases, the signal sent to the badge causes the worker's badge to indicate the cleanliness state of the worker's hands. Time and location information about the event can also be provided.

In another example, the acoustic signature of water running in the sink can be monitored. In order to qualify for a sink hygiene "credit", a user must be at a sink for a minimum amount of time and utilize a sufficient amount of water to clean their hands. The detection of the acoustic signature associated with this activity is a non-contact method that does not require any physical attachment to the sink or pipes. An electronic module containing a microphone is placed in proximity to the sink and the signal from the microphone is analyzed to detect the sound of the running water using one or more learning algorithms that have been developed for this purpose since each sink has its own signature. The module may also detect the presence of a person in proximity to the sink, identity of the user, and/or provide feedback to the user regarding the status of the hand hygiene event (for example, the amount of time that the user has been in proximity to the sink and whether the water has been running for the required amount of time). Information from the module regarding the likely hand hygiene event is transferred (e.g., wirelessly) to other devices in the area (e.g., the user's hygiene badge) or directly to the network.

Figure 39:
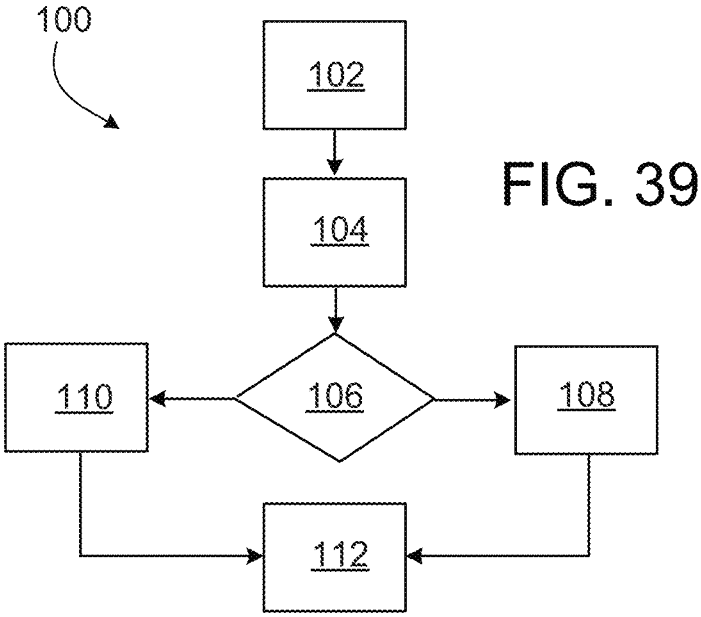
FIG. 39 is flow chart describing a method for using the system shown in FIG. 36.

FIG. 39 shows a system 700 that can be implemented without requiring the use of badges or other identification carried by the people (e.g. workers in restaurants) whose hand hygiene behavior is being observed. The system 700 relies on techniques such as facial recognition or voice recognition to identify an employee 708 at a sink 710. The system 700 includes sensor unit 712 located near the sink 710. In the system 700, the sensor unit 712 is a wall mounted detection unit that includes a camera placed to acquire an image of a person in front of the sink 712 when the sink 712 is operated. Operation of the sink can be identified, for example, using the techniques discussed above with respect to FIGS. 32-34. In some systems, the sensor unit 712 include the other sensors discussed above with respect to FIGS. 32-34.

The image captured by the sensor unit 710 is transferred to a network for processing to identify the employee via facial recognition using a stored database. In some systems, voice recognition or other techniques are used instead of or in addition to the facial recognition. Optionally, information regarding the hand hygiene event and the employee is transferred back to local facility (e.g., for use by managers in counseling and training personnel or for display).

Figure 35:
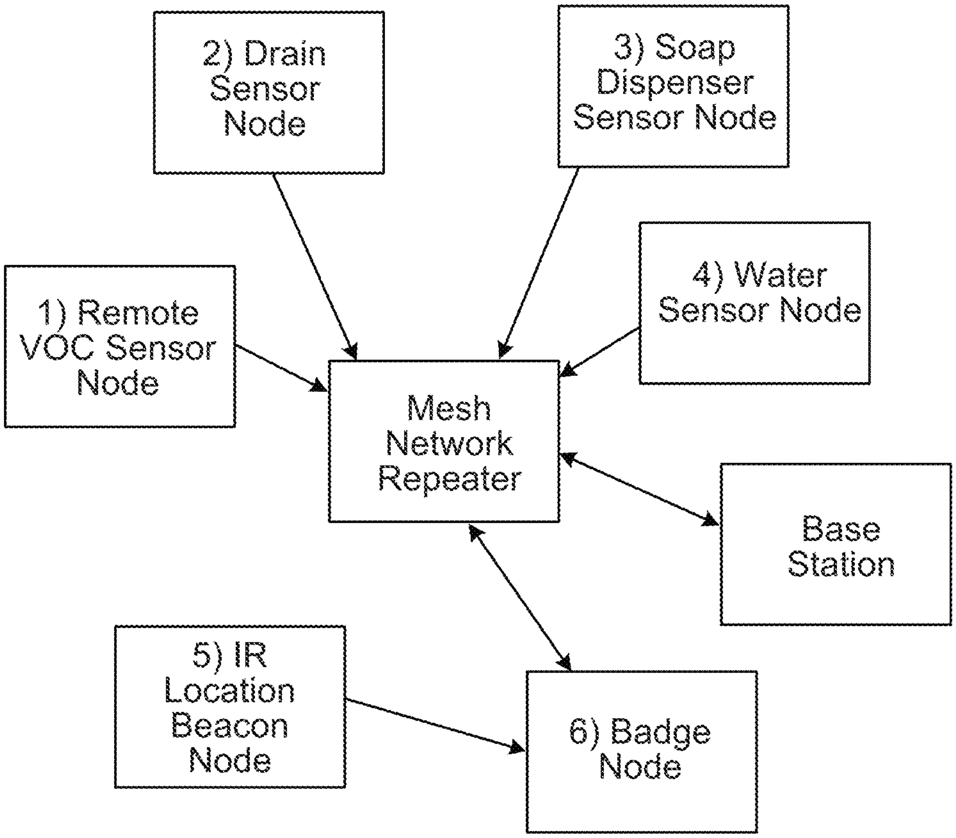
FIG. 35 is a schematic diagram of a hand wash monitoring network.

FIG. 35 is a schematic illustration of an example hand wash detection system architecture. In the example shown, when a remote VOC sensor detects an input signature consistent with a hand wash event, a special message is sent to the base station indicating the occurrence of such an event. Similarly, when a remote drain sensor detects an input signature consistent with a hand wash event, a special message is sent to the base station indicating the occurrence of such an event. A soap dispenser sensor can detect when soap is dispensed (e.g., to a person washing their hands). When the soap dispenser detects an input signature consistent with the dispensing of soap, a special message is sent to the base station indicating the occurrence of such an event. A water sensor node can monitor the flow and temperature characteristics of the water in the sink. When the water sensor node detects an input signature associated with a hand wash event (e.g., a particular amount of time that the water has been running and temperature of the water), a special message is sent to the base station indicating the occurrence of such an event. An IR location beacon can monitor the proximity of a badge in relation to the sink. When the worker and badge are within a certain distance of the sink, IR location beacon informs badge that it is in proximity to a sink and triggers the badge to look for special messages from base station.

The badge tracks the amount of time that it is in proximity to the sink via observation of the location beacon. The badge can monitor its onboard VOC sensor (if the badge contains a VOC sensor) for signals that indicate a hand wash event. By knowing that it is in proximity to the sink, the badge checks in with the base station to look for special messages from other sensors near its location. The badge can then use a combination of proximity, special messages, and onboard sensors to determine if a hand wash signature event has been detected in accordance with the defined state logic. The badge can use some or all of the monitored criteria discussed above to determine if a hand wash event has occurred. Not all of the criteria must be implemented in a particular installation. Due to the variety of criteria that can be monitored, the badge may value certain criteria as more indicative than others.

Figure 36:
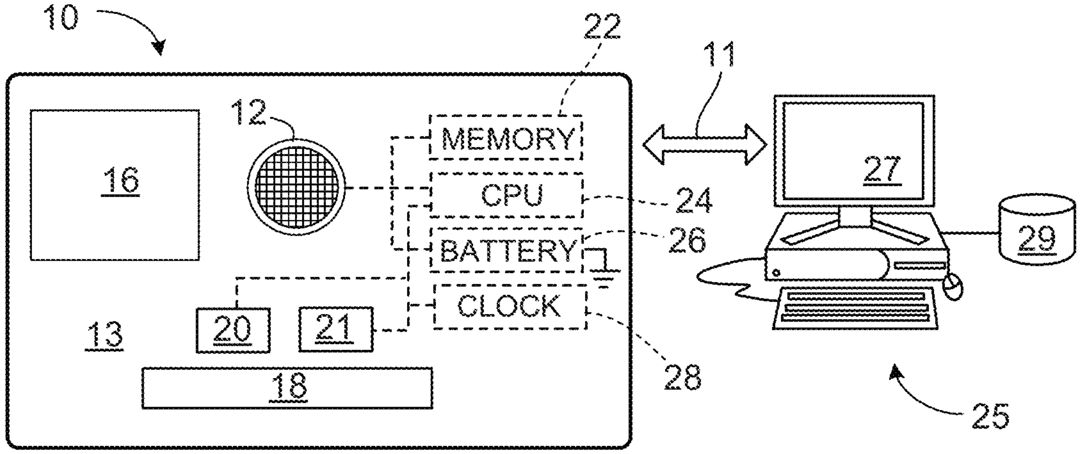
FIG. 36 is a schematic illustration of an example system for verifying hand cleanliness.

While the badges and monitoring systems have been described as using sensors to detect chemicals (e.g., airborne chemical), other types of sensors can be used. For example, visual markers dispensed on a user's hands or on gloves can be detected using sensors. FIG. 36 illustrates an exemplary 10 configured for verifying the cleanliness of a user's hand 50 (see FIG. 38) based on visual markers. The system 10 can be used to confirm a given user's compliance with a hand-sanitizing procedure, for instance the required use of an alcohol-based sanitizing gel or other volatile hand sanitizing agent, or the use of a specially encoded glove in an alternative embodiment. The system 10 operates by detecting a marking compound or marker which is distributed on the skin of the user's hands during the hand sanitizing process or which is present on the glove as provided by the manufacturer.

The system 10 includes a circuit assembly 13. In some embodiments the circuit assembly 13 may be placed in wireless communication with a server 25, with the two-way communication represented in FIG. 36 by arrow 11. The server 25 may include a database 29 and a display 27 to facilitate recording and presentation of historical tracking and compliance data related to the circuit assembly 13, as well as to assist in the enforcement of proper hand-sanitizing procedures as explained herein. Information collected by the circuit assembly 23 may be transmitted to the server 25 for optional data logging and reporting, potentially including corresponding user information identifying the particular user of the circuit assembly 23.

The circuit assembly 13 may be optionally configured as or positioned on or within a badge, a tag, or any other wearable device. As such, the circuit assembly 13 may include a photo identifier 16 such as a photograph of the badge owner, and a corresponding text block 18 displaying information such as the user's name, department, and title. The position and size of the photo identifier 16 and text block 18 may vary with the design. Additional user and/or facility information may be present. In another embodiment, the circuit assembly 13 may be mounted to a wall. A wall-mounted design may be substantially larger than a badge design, and thus may have expanded functionality, albeit with a possible trade off in areas such as flexibility of use as noted above.

Figure 38:
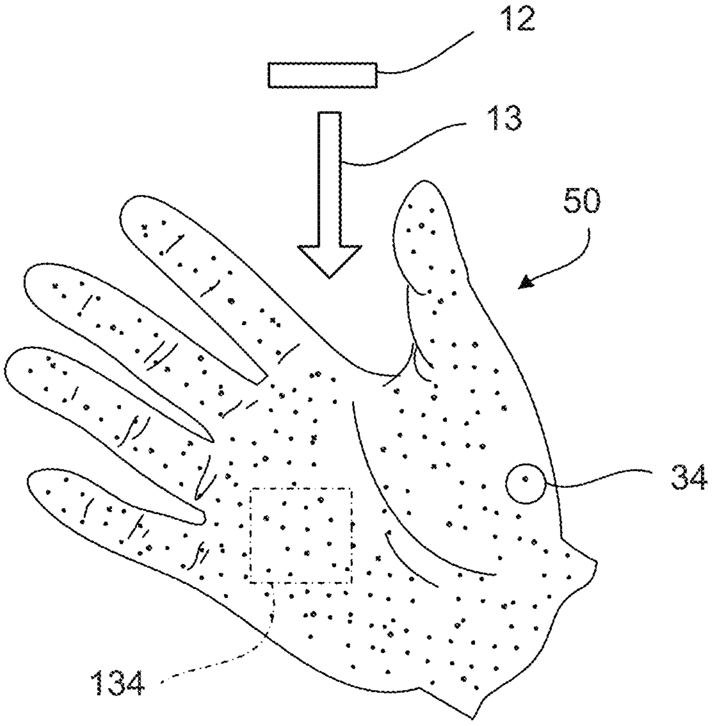
FIG. 38 is a schematic illustration of the detection of the marker on the skin of a user's hand or on a glove worn on the user's hand.
Figure 40:
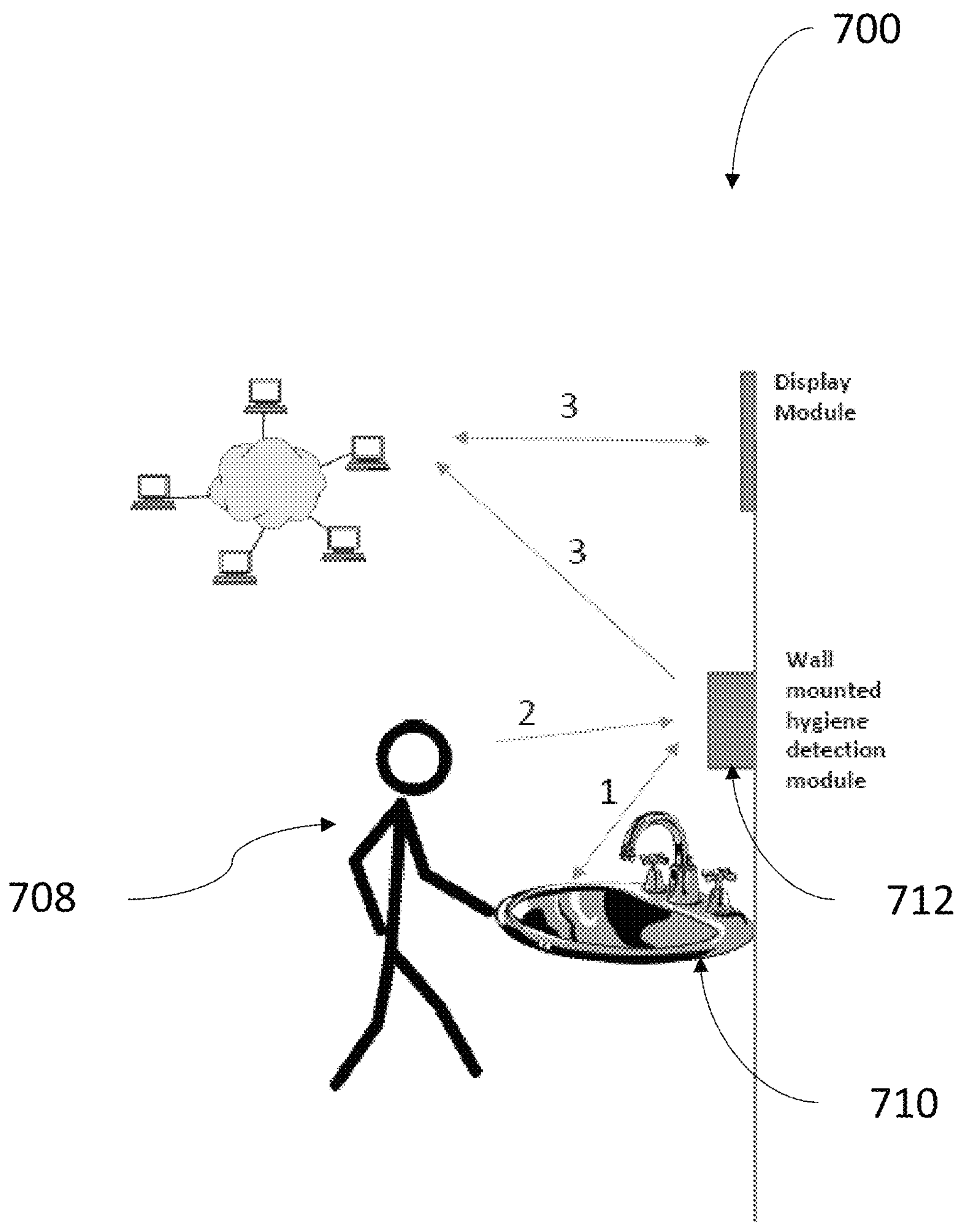
FIG. 40 is a perspective view of a sink having hand wash sensors.

The circuit assembly 13 of FIG. 36 includes a sensor 12 powered by a battery 26. The sensor 12 electro-optically detects either spectral data within a calibrated frequency/wavelength range of the electromagnetic spectrum or a pattern presented by a marker 34, 134 (see FIG. 38), depending on the embodiment. Electromagnetic radiation within the electromagnetic spectrum is classified according to frequency/wavelength. In order of increasing frequency and decreasing wavelength, the spectrum includes radio waves, microwaves, infrared (IR) radiation, visible light, ultraviolet (UV) radiation, X-rays, and gamma rays. The sensor 12 may be tuned to detect frequencies falling within one of these spectral ranges, e.g., IR, visible light, or UV. When the marker 134 of FIG. 38 is used on a glove, the ink may be invisible to the naked eye and readable by the sensor 12, for instance in the UV range of wavelengths.

The frequency range may be separated within sensor 12 by filters or other instruments which are uniquely sensitive to the particular frequencies/wavelengths being sought by the sensor 12. Spectral imaging by the sensor 12 and subsequent analysis by a central processing unit (CPU) 24 contained within the circuit assembly 13 can enable precise extraction of spectral signature information that, in at least some embodiments, would be imperceptible to the human eye. In this manner, tiny non-volatile markers or compounds left behind on the skin of a user's hand may be detected, with the results indicated to the user or patient in the user's vicinity via corresponding indicators 20 and 21, e.g., red and green LEDs in one example embodiment. A clock 28 may be used to time/date stamp each result for optimal data tracking.

In a particular embodiment, the sensor 12 shown in FIG. 36 may be configured to detect the visible color of the marker. For instance, iodine and other disinfectants are known to discolor the skin and provide visible evidence of use. Similarly, disappearing dyes similar to those used in some lines of children's sun block lotions allow a user to temporarily see where the lotion was applied. Other dyes mutate when exposed to UV light so that the color is visible only for a short time, slowly disappearing under UV light as the volatile agent dries and dissipates from the skin. The dye color may be detected optically using the sensor 12, including after the color is no longer readily visible to the naked eye. An example light sensitive dye is the sodium salt of zinc phthalocyanine tetrasulfonic acid.

The sensor 12 may operate similarly to sensors commonly used in multi-spectral imaging devices. The electromagnetic spectrum is divided into many bands as noted above. Within the sensor 12, one or more radiometers may be used to measure the radiant flux of any received electromagnetic radiation, with each radiometer acquiring a single digital image in a limited band of the electromagnetic spectrum. Such bands may range from approximately 0.7 μm to 0.4 μm, i.e., the Red-Green-Blue (RGB) visible spectrum, and/or through the UV wavelengths, IR wavelengths, etc. The sensor 12 may also use image spectroscopy to acquire many different spectral bands. A Silicon Carbide (SiC) UV photodiode or other photodiode may be used. Examples of such devices are offered commercially, e.g., by International Radiation Detectors, Inc. (RDI) of Torrence, CA.

Figure 37:
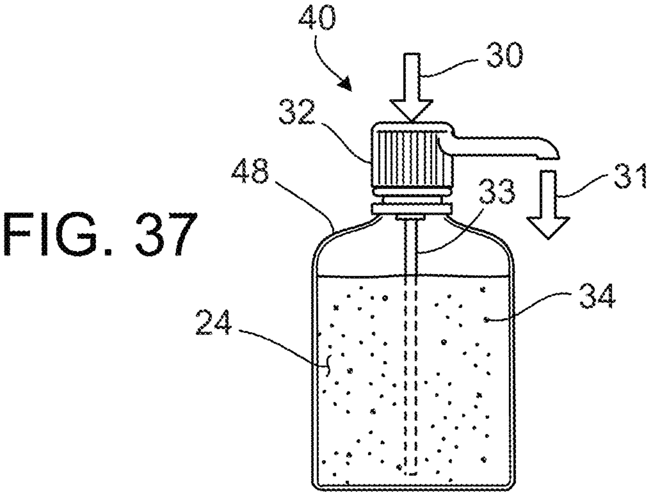
FIG. 37 is a schematic illustration of an example canister of a volatile hand sanitizing agent containing a detectable marking compound or marker.

Referring to FIG. 37, in one embodiment, the marker 34 may be distributed to a user's hands via a dispenser 40. The dispenser 40 may include a shell 48 containing a mixture of volatile hand-sanitizing agent 24, e.g., alcohol, and the marker 34. Pressure from a user in the direction of arrow 30 onto a cap 32 may cause a mixture of the volatile hand-sanitizing agent 24 and the marker 34 to be drawn up through a tube 33 and to the cap 32, after which the mixture is dispensed in the direction of arrow 31 onto a user's hands. The cap 32 may be optionally equipped with a transmitter (not shown) which activates the sensor 12, for instance via an RF signal, when the cap 32 is depressed in the direction of arrow 30. In such an embodiment, the sensor 12 can turn itself off again after a calibrated interval, thus ensuring the user performs the detection routine within a reasonable amount of time after sanitizing.

The marker 34 may be, in some embodiments, suspended pieces or particles of a suitable phosphor. As understood in the art, a phosphor is a transition metal, rare earth compound, or other substance that emits light when irradiated by UV light from the atmosphere or from a targeted UV bulb. Alternatively, the marker 34 could be a disappearing dye, or an inert material which can be detected by the sensor 12 to determine if the user has properly used the dispenser 40.

Glycerine (glycerol) and some polyglycols have exothermic properties as they absorb moisture, and therefore substances of this nature may be used to increase heat on the hands, with the heat detected as an IR signature by the sensor 12 in another possible approach. The actual mix of volatile hand-sanitizing agent 24 and marker 34 may be unique to a given facility in another example embodiment, or the marker 134 of FIG. 38 may be uniquely coded for a particular facility or manufacturer, which may allow for closer control and customization hand sanitizing techniques.

Referring to FIG. 38, in a particular embodiment, once a user has applied a sufficient volume of the volatile hand-sanitizing agent 24 shown in FIG. 37, the user rubs her hand 50 until the hand-sanitizing agent 24 is sufficiently absorbed or dissipated. At this point, the marker 34 remains behind on the skin, either as visible color or in a form that is largely invisible to the human eye. The user's hand is placed within a scanning beam (arrow 13) of the sensor 12 as shown, and the sensor 12 then detects the presence of the marker 34 on the skin of the hand 50.

In another embodiment, the user may put on a pair of gloves (indicated by the shading in FIG. 38) which are specially encoded with a unique marker 134, e.g., on the wrist and/or palm of the glove. The ink of the marker 134 may be invisible, such as ink readable only in the UV spectrum, so that the gloves do not have unsightly markings on them that might appear dirty to a patient. The marker 134 may be periodic so that only a portion of the marker 134 has to be read by the sensor 12 to get a correct reading. Various examples include bar codes, periodically repeating series of dots or shapes, or other suitable patterns having sufficient periodicity. As noted below, in this embodiment the presence of the marker 134 is detected, along with performing a check of previously scanned markers 134 for that particular user to determine that the user's gloves were replaced.

The glove could thus be imprinted, e.g., with invisible ink or other suitable materials, at the time of manufacture with a randomized barcode, pattern, or similar identifier for the marker 134. The marker 134 is detectable via the sensor 12, for instance a photo receptor. The randomization of the code forming the marker 134 would make it highly unlikely that a given user would ever pick up two pair of gloves in succession having identical markers 134. The absence of the marker 134 would also be detectable by virtue of its absence. Hence, the system 10 in this configuration could determine when a given user was gloved or not, when the user changed gloves, etc.

Referring to FIG. 39, an example method 100 is shown for verifying a user's hand cleanliness using the system 10 of FIG. 36. At step 102, one of two things occurs: (1) a mixture of the volatile hand sanitizing agent 24 and marker 34 is provided, e.g., by a supplier packaging and selling the mixture in the example dispenser 40 shown in FIG. 37 or in any other package, or (2) gloves are provided having the marker 134 shown in FIG. 38.

In the first embodiment, the user dispenses the mixture as explained above, such as by pressing on the cap 32 shown in FIG. 38 until a sufficient volume of the mixture is dispensed on the user's hand. In the second embodiment, the user simply pulls on the gloves. Step 102 is complete when the marker 34 or 134 is in place on the user's hands.

At step 104, the sensor 12 of FIGS. 36 and 38 detects the marker 34 or 134 of FIG. 38. Step 104 may entail detecting the spectral signature from the user's hand, including detecting the spectral signature of the marker 34. Alternatively, step 104 entails detecting the marker 134 and temporarily recording the detected pattern of marker 134 in memory 22 of the circuit assembly 13.

At step 106, the CPU 24 shown in FIG. 36 determines in conjunction with the sensor 12 whether the detected pattern or spectral signature sufficiently matches an expected result, or falls within a calibrated range thereof. For example, when detecting a spectral signature of marker 34 the CPU 24 may determine if the detected spectral signature sufficiently matches a calibrated signature of a hand having a particular amount of the marker 34.

Alternatively, when detecting a pattern of the marker 134, step 106 may entail relaying the detected pattern and the user's identifying information as signals (arrow 11) to the server 25, and then using the server 25 to compare the pattern to previously recorded patterns recorded in the database 29. In this manner the server 25 can verify whether the same user has used gloves bearing the same pattern within a calibrated window of time, thus preventing reuse of gloves.

The method 100 proceeds to step 108 when the detected pattern or signature of the respective marker 34 or 134 matches the expected result. If such a match is not found, the method 100 proceeds to step 110.

At step 108, the CPU 24 of FIG. 36 may activate the indicator 20, such as by illuminating a green LED to show that the user's hands are properly sanitized or gloved. The method 100 then proceeds to step 112. Indicator 20 may also include sound, whether alone or in conjunction with light, so as to audibly convey to a patient in proximity to the user that the user's hands are properly sanitized or gloved.

At step 110, the CPU 24 of FIG. 36 may activate the indicator 21, such as by illuminating a red LED to show that the user's hands are improperly sanitized or gloved. As with step 108, the indicator 21 may include sound, such as a particular tone, whether alone or in conjunction with light, to audibly convey to a patient in proximity to the user that the user's hands are insufficiently sanitized or gloved. This prompts the user to repeat the sanitizing procedure or change gloves depending on the embodiment. The method 100 then proceeds to step 112.

At step 112, the circuit assembly 13 of FIG. 38 may relay the collected information and verification results to the server 25 for long term data logging and analysis of compliance history, whether for individual users or floors or departments of the facility.

Further systems and methods of monitoring cleanliness using tracer substances are discussed in U.S. Patent Pub. No. 2008/0031838 which is incorporated herein by reference in its entirety.

The invention claimed is:

1. A system comprising:

a first sensor configured to detect operation of a sink;

a monitor in communication with the first sensor, the monitor operable to generate a sink hygiene credit after the person has been at the sink for a minimum amount of time and/or utilizes a sufficient amount of water to clean their hands, wherein the first sensor processes acoustic signatures that are consistent with a hand wash event; and a second sensor configured to detect personal characteristics of a person operating the sink.

2. The system of claim 1, wherein the first sensor comprises a microphone.

3. The system of claim 2, comprising an electronic module incorporating the microphone, the electronic module configured to analyze a signal from the microphone to detect the sound of the running water.

4. The system of claim 3, wherein the electronic module incorporates a learning algorithm operable to collect data on acoustic signatures of specific sinks.

5. The system of claim 1, further comprising a transmitter coupled to the first sensor, the transmitter operable to transmit a signal to a badge worn by the person indicating that the person has washed their hands.

6. The system of claim 1, wherein the second sensor comprises a receiver operable to detect an identification signal from a badge worn by the person.

7. The system of claim 1, wherein the electronic module detects the presence of a person in proximity to the sink and the person's identity.

8. The system of claim 7, wherein the electronic module provides feedback to the user regarding the status of the hand hygiene event.

9. The system of claim 8, wherein the feedback comprises the amount of time that the user has been in proximity to the sink and whether the water has been running for a required amount of time.

10. The system of claim 1, wherein the first sensor is operable to detect various signal attributes indicative of the person washing their hands in the sink.

11. The system of claim 10, wherein the signal comprises a particular amount of soap in water that exits the sink's drain or a particular flow pattern of water passing through the drain.

12. The system of claim 11, further comprising an emitter is activated to broadcast wavelengths of energy in the electromagnetic or acoustic spectrum across the drainpipe of the sink to be received by a receiver.

13. The system of claim 11, wherein the electronic module is operable to process signals from the receiver to identify the signal attributes, wherein the signal attributes are consistent with a hand wash event.

14. The system of claim 13, wherein the signal attributes further comprise at least one of signal representative of a presence of soap or an appropriate movement of water within the drain.

15. The system of claim 14, wherein the electronic module is operable to process signals based on absorption bands or acoustic waveform signatures.

16. The system of claim 1, further comprising a sensor module placed in proximity to the sink wherein the sensor module is calibrated to detect volatile substances present in soap that are likely to be released during a hand wash event.

17. The system of claim 16, wherein the sensor module is placed on a back surface of the sink or along a surrounding wall or cabinet.

18. The system of claim 16, wherein the sensor module is a VOC sensor on a badge calibrated to detect the hand wash event at the sink.

* * * * *